US009245278B2

(12) United States Patent
Orsini et al.

(10) Patent No.: US 9,245,278 B2
(45) Date of Patent: *Jan. 26, 2016

(54) SYSTEMS AND METHODS FOR CORRECTING TRANSLATIONS IN MULTI-USER MULTI-LINGUAL COMMUNICATIONS

(71) Applicant: Machine Zone, Inc., Palo Alto, CA (US)

(72) Inventors: Francois Orsini, San Francisco, CA (US); Nikhil Bojja, Mountain View, CA (US); Arun Nedunchezhian, Mountain View, CA (US)

(73) Assignee: Machine Zone, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,243

(22) Filed: Mar. 27, 2015

(65) Prior Publication Data
US 2015/0262209 A1 Sep. 17, 2015

Related U.S. Application Data

(63) Continuation of application No. 14/294,668, filed on Jun. 3, 2014, now Pat. No. 8,996,352, which is a continuation-in-part of application No. 13/908,979, filed on Jun. 3, 2013, which is a continuation-in-part of application No. 13/763,565, filed on Feb. 8, 2013.

(60) Provisional application No. 61/778,282, filed on Mar. 12, 2013.

(51) Int. Cl.
*G06F 17/28* (2006.01)
*G06Q 30/02* (2012.01)
(Continued)

(52) U.S. Cl.
CPC .......... *G06Q 30/0208* (2013.01); *G06F 17/289* (2013.01); *G06F 17/2854* (2013.01); *G06Q 10/107* (2013.01); *G06Q 30/0217* (2013.01); *G06Q 50/01* (2013.01)

(58) Field of Classification Search
CPC .......................... G06F 17/289; G06F 17/2854
USPC ....................................................... 704/1–10
See application file for complete search history.

(56) References Cited

U.S. PATENT DOCUMENTS 4,460,973 A  7/1984  Tanimoto et al.
4,502,128 A  2/1985  Okajima et al.
(Continued)

OTHER PUBLICATIONS

Papineni, Kishore, et al. "BLEU: a method for automatic evaluation of machine translation." Proceedings of the 40th annual meeting on association for computational linguistics. Association for Computational Linguistics, 2002.*

(Continued)

*Primary Examiner* — Shaun Roberts
(74) *Attorney, Agent, or Firm* — Goodwin Procter LLP

(57) ABSTRACT

Various embodiments described herein facilitate multi-lingual communications. The systems and methods of some embodiments enable multi-lingual communications through different modes of communication including, for example, Internet-based chat, e-mail, text-based mobile phone communications, postings to online forums, postings to online social media services, and the like. Certain embodiments implement communication systems and methods that translate text between two or more languages. Users of the systems and methods may be incentivized to submit corrections for inaccurate or erroneous translations, and may receive a reward for these submissions. Systems and methods for assessing the accuracy of translations are described.

58 Claims, 44 Drawing Sheets

(51) Int. Cl.
  *G06Q 10/10* (2012.01)
  *G06Q 50/00* (2012.01)

(56) References Cited

U.S. PATENT DOCUMENTS

| | | |
|---|---|---|
| 4,706,212 A | 11/1987 | Toma |
| 5,313,534 A | 5/1994 | Burel |
| 5,526,259 A | 6/1996 | Kaji |
| 5,884,246 A | 3/1999 | Boucher et al. |
| 6,125,362 A | 9/2000 | Elworthy |
| 6,182,029 B1 | 1/2001 | Friedman |
| 6,269,189 B1 | 7/2001 | Chanod |
| 6,285,978 B1 | 9/2001 | Bernth et al. |
| 6,722,989 B1 | 4/2004 | Hayashi |
| 6,799,303 B2 | 9/2004 | Blumberg |
| 6,801,190 B1 | 10/2004 | Robinson et al. |
| 6,848,080 B1 | 1/2005 | Lee et al. |
| 6,996,520 B2 | 2/2006 | Levin |
| 7,165,019 B1 | 1/2007 | Lee et al. |
| 7,174,289 B2 | 2/2007 | Sukehiro |
| 7,451,188 B2 | 11/2008 | Cheung et al. |
| 7,478,033 B2 | 1/2009 | Wu et al. |
| 7,539,619 B1 | 5/2009 | Seligman et al. |
| 7,895,576 B2 | 2/2011 | Chang et al. |
| 8,010,338 B2 | 8/2011 | Thorn |
| 8,027,438 B2 | 9/2011 | Daigle et al. |
| 8,112,497 B1 | 2/2012 | Gougousis et al. |
| 8,145,472 B2 | 3/2012 | Shore et al. |
| 8,170,868 B2 | 5/2012 | Gamon et al. |
| 8,244,567 B2 | 8/2012 | Estill |
| 8,270,606 B2 | 9/2012 | Caskey et al. |
| 8,326,601 B2 | 12/2012 | Ribeiro et al. |
| 8,380,488 B1 | 2/2013 | Liu et al. |
| 8,392,173 B2 | 3/2013 | Davis et al. |
| 8,468,149 B1 | 6/2013 | Lung et al. |
| 8,473,555 B2 | 6/2013 | Lai et al. |
| 8,543,374 B2 | 9/2013 | Dymetman |
| 8,566,306 B2 | 10/2013 | Jones |
| 8,606,800 B2 | 12/2013 | Lagad et al. |
| 8,626,486 B2 | 1/2014 | Och et al. |
| 8,655,644 B2 | 2/2014 | Kanevsky et al. |
| 8,671,019 B1 | 3/2014 | Barclay et al. |
| 8,688,433 B2 | 4/2014 | Davis et al. |
| 8,688,451 B2 | 4/2014 | Grost et al. |
| 8,738,355 B2 | 5/2014 | Gupta et al. |
| 8,818,791 B2 | 8/2014 | Xiao et al. |
| 8,825,467 B1 | 9/2014 | Chen et al. |
| 8,825,469 B1 | 9/2014 | Duddu et al. |
| 8,832,204 B1 | 9/2014 | Gailloux |
| 8,838,437 B1 | 9/2014 | Buryak et al. |
| 8,914,395 B2 | 12/2014 | Jiang |
| 8,918,308 B2 | 12/2014 | Caskey et al. |
| 8,935,147 B2 | 1/2015 | Stern et al. |
| 8,990,064 B2 | 3/2015 | Marcu et al. |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,031,829 B2 | 5/2015 | Leydon et al. |
| 2001/0020225 A1 | 9/2001 | Zerber |
| 2001/0029455 A1 | 10/2001 | Chin et al. |
| 2002/0029146 A1 | 3/2002 | Nir |
| 2002/0037767 A1 | 3/2002 | Ebin |
| 2002/0169592 A1 | 11/2002 | Aityan |
| 2003/0009320 A1 | 1/2003 | Furuta |
| 2003/0033152 A1 | 2/2003 | Cameron |
| 2003/0046350 A1 | 3/2003 | Chintalapati et al. |
| 2003/0101044 A1 | 5/2003 | Krasnov |
| 2003/0125927 A1 | 7/2003 | Seme |
| 2003/0176995 A1 | 9/2003 | Sukehiro |
| 2004/0030750 A1 | 2/2004 | Moore et al. |
| 2004/0030781 A1 | 2/2004 | Etesse et al. |
| 2004/0044517 A1 | 3/2004 | Palmquist |
| 2004/0093567 A1 | 5/2004 | Schabes et al. |
| 2004/0102201 A1 | 5/2004 | Levin |
| 2004/0102956 A1 | 5/2004 | Levin |
| 2004/0102957 A1 | 5/2004 | Levin |
| 2004/0158471 A1 | 8/2004 | Davis et al. |
| 2004/0205671 A1 | 10/2004 | Sukehiro et al. |
| 2004/0210443 A1 | 10/2004 | Kuhn et al. |
| 2004/0267527 A1 | 12/2004 | Creamer et al. |
| 2005/0076240 A1 | 4/2005 | Appleman |
| 2005/0102130 A1 | 5/2005 | Quirk et al. |
| 2005/0160075 A1 | 7/2005 | Nagahara |
| 2005/0165642 A1 | 7/2005 | Brouze et al. |
| 2005/0171758 A1 | 8/2005 | Palmquist |
| 2005/0197829 A1 | 9/2005 | Okumura |
| 2005/0209844 A1 | 9/2005 | Wu et al. |
| 2005/0234702 A1 | 10/2005 | Komiya |
| 2005/0251384 A1 | 11/2005 | Yang |
| 2005/0283540 A1 | 12/2005 | Fux |
| 2006/0015812 A1 | 1/2006 | Cunningham et al. |
| 2006/0053203 A1 | 3/2006 | Mijatovic |
| 2006/0101021 A1 | 5/2006 | Davis et al. |
| 2006/0133585 A1 | 6/2006 | Daigle et al. |
| 2006/0136223 A1 | 6/2006 | Brun et al. |
| 2006/0167992 A1 | 7/2006 | Cheung et al. |
| 2006/0173839 A1 | 8/2006 | Knepper et al. |
| 2006/0206309 A1 | 9/2006 | Curry et al. |
| 2006/0271352 A1 | 11/2006 | Nikitin et al. |
| 2007/0016399 A1 | 1/2007 | Gao et al. |
| 2007/0077975 A1 | 4/2007 | Warda |
| 2007/0088793 A1 | 4/2007 | Landsman |
| 2007/0124202 A1 | 5/2007 | Simons |
| 2007/0143410 A1 | 6/2007 | Kraft et al. |
| 2007/0168450 A1 | 7/2007 | Prajapat et al. |
| 2007/0218997 A1 | 9/2007 | Cho |
| 2007/0219776 A1 | 9/2007 | Gamon et al. |
| 2007/0276814 A1 | 11/2007 | Williams |
| 2007/0294076 A1 | 12/2007 | Shore et al. |
| 2008/0005319 A1 | 1/2008 | Anderholm et al. |
| 2008/0052289 A1 | 2/2008 | Kolo et al. |
| 2008/0097745 A1 | 4/2008 | Bagnato et al. |
| 2008/0126077 A1 | 5/2008 | Thorn |
| 2008/0147408 A1 | 6/2008 | Da Palma et al. |
| 2008/0176655 A1 | 7/2008 | James et al. |
| 2008/0177528 A1 | 7/2008 | Drewes |
| 2008/0183459 A1 | 7/2008 | Simonsen et al. |
| 2008/0243834 A1 | 10/2008 | Rieman et al. |
| 2008/0249760 A1 | 10/2008 | Marcu et al. |
| 2008/0274694 A1 | 11/2008 | Castell et al. |
| 2008/0281577 A1 | 11/2008 | Suzuki |
| 2008/0313534 A1 | 12/2008 | Cheung et al. |
| 2008/0320086 A1 | 12/2008 | Callanan et al. |
| 2009/0011829 A1 | 1/2009 | Yang |
| 2009/0068984 A1 | 3/2009 | Burnett |
| 2009/0100141 A1 | 4/2009 | Kirkland et al. |
| 2009/0106695 A1 | 4/2009 | Perry et al. |
| 2009/0125477 A1 | 5/2009 | Lu et al. |
| 2009/0204400 A1 | 8/2009 | Shields et al. |
| 2009/0221372 A1 | 9/2009 | Casey et al. |
| 2010/0015581 A1 | 1/2010 | DeLaurentis |
| 2010/0099444 A1 | 4/2010 | Coulter |
| 2010/0138210 A1 | 6/2010 | Seo et al. |
| 2010/0145900 A1 | 6/2010 | Zheng et al. |
| 2010/0180199 A1 | 7/2010 | Wu et al. |
| 2010/0204981 A1 | 8/2010 | Ribeiro et al. |
| 2010/0241482 A1 | 9/2010 | Knyphausen et al. |
| 2010/0268730 A1 | 10/2010 | Kazeoka |
| 2010/0293230 A1 | 11/2010 | Lai et al. |
| 2010/0324894 A1 | 12/2010 | Potkonjak |
| 2011/0066421 A1 | 3/2011 | Lee et al. |
| 2011/0071817 A1 | 3/2011 | Siivola |
| 2011/0077933 A1 | 3/2011 | Miyamoto et al. |
| 2011/0077934 A1 | 3/2011 | Kanevsky et al. |
| 2011/0082683 A1 | 4/2011 | Soricut et al. |
| 2011/0082684 A1 | 4/2011 | Soricut et al. |
| 2011/0098117 A1 | 4/2011 | Tanaka |
| 2011/0191096 A1 | 8/2011 | Sarikaya et al. |
| 2011/0219084 A1 | 9/2011 | Borra et al. |
| 2011/0238406 A1 | 9/2011 | Chen et al. |
| 2011/0238411 A1 | 9/2011 | Suzuki |
| 2011/0246881 A1 | 10/2011 | Kushman et al. |
| 2011/0307356 A1 | 12/2011 | Wiesinger et al. |

(56) References Cited

U.S. PATENT DOCUMENTS

| | | |
|---|---|---|
| 2011/0307495 A1 | 12/2011 | Shoshan |
| 2011/0320019 A1 | 12/2011 | Lanciani et al. |
| 2012/0109631 A1 | 5/2012 | Gopal et al. |
| 2012/0156668 A1 | 6/2012 | Zelin |
| 2012/0173502 A1 | 7/2012 | Kumar et al. |
| 2012/0179451 A1 | 7/2012 | Miyamoto et al. |
| 2012/0209852 A1 | 8/2012 | Dasgupta et al. |
| 2012/0226491 A1 | 9/2012 | Yamazaki et al. |
| 2012/0240039 A1 | 9/2012 | Walker et al. |
| 2012/0246564 A1 | 9/2012 | Kolo |
| 2012/0262296 A1 | 10/2012 | Bezar |
| 2012/0265518 A1 | 10/2012 | Lauder |
| 2013/0084976 A1 | 4/2013 | Kumaran et al. |
| 2013/0085747 A1 | 4/2013 | Li et al. |
| 2013/0091429 A1 | 4/2013 | Weng et al. |
| 2013/0130792 A1 | 5/2013 | Crocker et al. |
| 2013/0138428 A1 | 5/2013 | Chandramouli et al. |
| 2013/0144599 A1 | 6/2013 | Davis et al. |
| 2013/0173247 A1 | 7/2013 | Hodson |
| 2013/0197896 A1 | 8/2013 | Chalabi et al. |
| 2013/0211821 A1 | 8/2013 | Tseng et al. |
| 2014/0006003 A1 | 1/2014 | Soricut et al. |
| 2014/0058807 A1 | 2/2014 | Altberg et al. |
| 2014/0142917 A1 | 5/2014 | D'Penha |
| 2014/0188453 A1 | 7/2014 | Marcu et al. |
| 2014/0199975 A1 | 7/2014 | Lou et al. |
| 2014/0200878 A1 | 7/2014 | Mylonakis et al. |
| 2014/0208367 A1 | 7/2014 | DeWeese et al. |
| 2014/0229154 A1 | 8/2014 | Leydon et al. |
| 2014/0303961 A1 | 10/2014 | Leydon et al. |
| 2014/0330760 A1 | 11/2014 | Meier et al. |
| 2014/0337989 A1 | 11/2014 | Orsini et al. |
| 2015/0006148 A1 | 1/2015 | Goldszmit et al. |

OTHER PUBLICATIONS

Ahmed, et al., "Language Identification from Text Using n-gram Based Cumulative Frequency Addition," In Proceedings of Student/Faculty Research Day, CSIS, Pace University; pp. 12.1-12.8; May 2004.

Baldwin, T. and Lui, M., "Language identification: The Long and the Short of the Matter," In Proceedings of NAACL-HLT; pp. 229-237; Jun. 2010.

Bergsma, et al., "Language Identification for Creating Language-specific Twitter Collections," In Proceedings of the Second Workshop on Language in Social Media; pp. 65-74; Jun. 2012.

Carter, et al., "Microblog Language Identification: Overcoming the Limitations of Short, Unedited and Idiomatic Text," Language Resources and Evaluation; 47(1): 195-215; Mar. 2013.

Cavnar, W. and Trenkle, J., "N-gram-based Text Categorization," In Proceedings of the Third Symposium on Document Analysis and Information Retrieval; Apr. 1994, 14pgs.

Ceylan, H. and Kim, Y., "Language Identification of Search Engine Queries," In Proceedings of ACL-IJCNLP; 2:1066-1074; Aug. 2009.

Chang, C. and Lin, C., "LIBSVM: A Library for Support Vector Machines," ACM Transactions on Intelligent Systems and Technology, 2(27):1-39; Apr. 2011.

Dunning, "Statistical Identification of Language," Computing Research Laboratory, New Mexico State University; Mar. 1994, 31pgs.

Fan, et al., "LIBLINEAR: A Library for Large Linear Classification," Journal of Machine Learning Research; 9:1871-1874; Aug. 2008.

Foster, et al., "#hardtoparse: POS Tagging and Pursing the Twitterverse," In Proceedings of the AAAI Workshop on Analyzing Microtext; Aug. 2011, 7pgs.

Gottron, T. and Lipka, N., "A Comparison of Language Identification Approaches on Short, Query-style Texts," In Advances in Information Retrieval; pp. 611-614; Mar. 2010.

Grothe, et al., "A Comparative Study on Language Identification Methods," In Proceedings of LREC; pp. 980-985; May 2008.

Hughes, et al., "Reconsidering Language Identification for Written Language Resources," In Proceedings of LREC; pp. 485-488; May 2006.

Hulin et al., "Applications of Item Response Theory to Analysis of Attitude Scale Translations," American Psychological Association; vol. 67(6); Dec. 1982; 51pgs.

Int'l Search Report and Written Opinion of the ISA/US in PCT/US2014/061141; Jun. 16, 2015; 13pgs.

Liu, et al., "A Broad-coverage Normalization System for Social Media Language," In Proceedings of ACL; pp. 1035-1044; Jul. 2012.

Liu, et al., "Recognizing Named Entities in Tweets," In Proceedings of ACL-HLT; 1:359-367; Jun. 2011.

Lui, M. and Baldwin, T., "Accurate Language Identification of Twitter Messages," Proceedings of the 5$^{th}$ Workshop on Language Analysis for Social Media (LASM)@ EACL 2014; pp. 17-25; Apr. 26-30, 2014.

Lui, et al., "Automatic Detection and Language Identification of Multilingual Documents," Transactions of the Association for Computational Linguistics, 2:27-40; Feb. 2014.

Lui, M. and Baldwin, T., "Cross-domain Feature Selection for Language Identification," Proceedings of the 5$^{th}$ International Joint Conference on Natural Language Processing; pp. 553-561; Nov. 8-13, 2011.

Lui, M. and Baldwin, T., "langid.py: An Off-the-shelf Language Identification Tool," Proceedings of the 50$^{th}$ Annual Meeting of the Association for Computational Linguistics; pp. 25-30; Jul. 8-14, 2012.

Monteith, et al., "Turning Bayesian Model Averaging Into Bayesian Model Combination," Proceedings of the International Joint Conference on Neural Networks IJCNN'11; Jul. 31-Aug. 5, 2011; 7pgs.

Qureshi et al., Collusion Detection and Prevention with FIRE+ Trust and Reputation Model, 2010, IEEE, Computer and Information Technology (CIT), 2010 IEEE 10th International Conference, pp. 2548-2555; Jun. 2010.

Ritter, et al., "Named Entity Recognition in Tweets: An Experimental Study," In Proceedings of EMNLP;pp. 1524-1534; Jul. 2011.

Rouse, M., "Parallel Processing," Search Data Center.com; Mar. 27, 2007; 2pgs.

Tromp, E. and Pechenizkiy, M., "Graph-based n-gram Language Identification on Short Texts," In Proceedings of the 20th Machine Learning Conference of Belgium and the Netherlands; May 2011; 8pgs.

Vatanen, et al., "Language Identification of Short Text Segments with n-gram Models," In Proceedings of LREC; pp. 3423-3430; May 2010.

Vogel, J. and Tresner-Kirsch, D., "Robust Language Identification in Short, Noisy Texts: Improvements to LIGA," In Proceedings of the 3rd International Workshop on Mining Ubiquitous and Social Environments; pp. 1-9; Jul. 2012.

Xia, F. and Lewis, W.D., "Applying NLP Technologies to the Collection and Enrichment of Language Data on the Web to Aid Linguistic Research," Proc. of the EACL 2009 Workshop on Language Tech. and Resources for Cultural Heritage, Social Sciences, Humanities, and Education-LaTech—SHELT&R 2009; pp. 51-59; Mar. 2009.

"Arabic script in Unicode," downloaded Dec. 22, 2014, from <http://en.wikipedia.org/wiki/Arabic_script_in_Unicode>; 18pgs.

"Chromium-compact-language-detector," downloaded Dec. 22, 2014, from <https://code.googie.com/p/chromium-compact-language-detector/>; 1pg.

"CJK Unified Ideographs (Unicode block)," downloaded Dec. 22, 2014, from <http://en.wikipedia.org/wiki/CJK_Unified_Ideographs_(Unicode block)>; 1pg.

"CJK Unified Ideographs," downloaded Dec. 22, 2014, from <http://en.wikipedia.org/wiki/CJK_Unified_Ideographs>; 11 pgs.

"cld2," downloaded Dec. 22, 2014, from <https://code.google.com/p/cld2/>; 2pgs.

"Cyrillic script in Unicode," downloaded Dec. 22, 2014, from <http://en.wikipedia.org/wiki/Cyrillic_script_in_Unicode>; 22pgs.

"Detect Method," downloaded Dec. 22, 2014, from <http://msdn.microsoft.com/enus/library/ff512411.aspx>; 5pgs.

"GitHub," downloaded Dec. 22, 2014, from <https://github.com/feedbackmine/language_detector>; 1pg.

(56) References Cited

OTHER PUBLICATIONS

"Google Translate API," downloaded Dec. 22, 2014, from <https://cloud.qooqle.com/translate/v2/using_rest>; 12pgs.
"ldig (Language Detection with Infinity Gram)," downloaded Dec. 22, 2014, from <https://github.com/shuyo/ldig>; 3pgs.
"Language identification," downloaded Dec. 22, 2014, from <http://en.wikipedia.org/wiki/Language_identification>; 5pgs.
"Languages and Scripts, CLDR Charts," downloaded Dec. 22, 2014, from <http://www.unicode.org/cldr/charts/latest/supplemental/languages_and_scripts.html>; 23 pgs.
"Latin Script in Unicode," downloaded Dec. 22, 2014, from <http://en.wikipedia.org/wiki/Latin_script_in_Unicode>; 5 pgs.
"Mimer SQL Unicode Collation Charts," downloaded Dec. 22, 2014, from <http://developer.mimer.com/charts/index.html>; 2 pgs.
"Multi Core and Parallel Processing," downloaded on Jun. 30, 2015 from stackoverflow.com/questions/1922465/multi-core-and-parallel-processing, published Dec. 17, 2009; 2pgs.
"Scripts and Languages," downloaded Dec. 22, 2014, from <http://www.unicode.org/cldr/charts/latest/supplemental/scripts_and_languages.html>; 23 pgs.
"Supported Script," downloaded Dec. 22, 2014, from <http://www.unicode.org/standard/supported.html>; 3 pgs.
"Unicode Character Ranges," downloaded Dec. 22, 2014, from <http://jrgraphix.net/research/unicode_blocks.php>; 1 pg.
"Uscript.h File Reference," downloaded Dec. 22, 2014, from <http://icuproject.org/apiref/icu4c/uscript_8h.html>; 34 pgs.
Aikawa et al., "The Impact of Crowdsourcing Post-editing with the Collaborative Translation Framework," JapTAL 2012, LNAI 7614, pp. 1-10. Springer-Verlag Berlin Heidelberg 2012.
Ambati et al., "Collaborative Workflow for Crowdsourcing Translation," Proceedings of the ACM 2012 conference on Computer Supported Cooperative Work, ACM, 2012.
Callison-Burch, Chris, "Fast, Cheap, and Creative: Evaluating Translation Quality Using Amazon's Mechanical Turk," Proceedings of the 2009 Conference on Empirical Methods in Natural Language Processing, pp. 286-295, Singapore, Aug. 6-7, 2009.
Callison-Burch et al., "Creating Speech and Language Data With Amazon's Mechanical Turk," Proceedings of the NAACL HLT 2010 Workshop on Creating Speech and Language Data with Amazon's Mechanical Turk, pp. 1-12, 2010.
Communication Relating to the Results of the Partial International Search, for International Application No. PCT/US2014/040676, mailed Feb. 17, 2015, 5 pages.
International Application No. PCT/US2014/015632, International Search Report and Written Opinion mailed Jul. 8, 2014, 8 pages.
International Application No. PCT/US2014/040676 International Search Report and Written Opinion mailed May 6, 2015, 16 pages.
Little, "Turkit: Tools for Iterative Tasks on Mechanical Turk," Visual Languages and Human-Centric Computing, XPO31551118, IEEE, Sep. 20, 2009, pp. 252-253.
Popovic, Maja et al., "Syntax-oriented evaluation measures for machine translation output," Proceedings of the Fourth Workshop on Statistical Machine Translation, pp. 29-32, Athens, Greece, Mar. 30-31, 2009.
Shieber, S.M., and Nelken R.; "Abbreviated Text Input Using Language Modeling," Natural Language Eng; 13(2):165-183; Jun. 2007.
Zaidan, Omar F. et al., "Crowdsourcing Translation: Professional Quality from Non-Professionals," Proceedings of the 49th Annual Meeting of the Association for Computational Linguistics, pp. 1220-1229, Portland, Oregon, Jun. 19-24, 2011.

* cited by examiner

US 9,245,278 B2

SYSTEMS AND METHODS FOR CORRECTING TRANSLATIONS IN MULTI-USER MULTI-LINGUAL COMMUNICATIONS

CROSS-REFERENCE TO RELATED APPLICATIONS

This application is a continuation of and claims priority from U.S. patent application Ser. No. 14/294,668, filed Jun. 3, 2014 which is a continuation-in-part of and claims priority from U.S. patent application Ser. No. 13/908,979, filed Jun. 3, 2013, entitled "Systems and Methods for Incentivizing User Feedback for Translation Processing," which is a continuation-in-part of and claims priority from U.S. patent application Ser. No. 13/763,565, filed Feb. 8, 2013, entitled "Systems and Methods for Multi-User Multi-Lingual Communications," and claims priority from U.S. Provisional Patent Application Ser. No. 61/778,282, filed Mar. 12, 2013, entitled "Group Chat Translation Systems and Methods," each of which is incorporated herein by reference.

FIELD OF THE INVENTION

The present invention(s) generally relate to language translation and, more particularly, language translation involving multiple users and multiple languages.

BACKGROUND OF THE INVENTION

Before the advent of machine-based language translations (hereafter, "machine translations"), translation between two languages was only possible via intervention or interpretation by a person educated in both languages. In contrast, typical machine translators generally operate based on statistical/stochastic analysis of context and grammar, usually without need of human intervention/interpretation.

Typical machine translation is often error prone, particularly, where the text to be translated has a minimal context. Text having minimal context is often found in conversations, which employ brief sentence construction. Additionally, machine translations often have trouble with abbreviations, acronyms, diminutives, colloquial words/phrases, proper nouns, and common nouns, which are also commonly found in conversational text.

SUMMARY OF THE INVENTION

Various embodiments described herein provide for systems and methods that relate to multi-lingual communications between multiple users, possibly where the users are at two or more client systems. Modes of communications facilitated by embodiments may include Internet-based chat (e.g., Apple® iMessage, Windows® Live Messenger, etc.), e-mail (e.g., embedded forum messaging, Yahoo® mail, RFC 5322, etc.), text-based mobile phone communications (e.g., SMS messages or MMS messages), postings to online forums (e.g., postings to a web-based hobby forum), and postings to online social media services (e.g., Twitter®, Facebook®, etc.). For example, systems and methods may implement a multi-lingual, multi-user chat system.

For some embodiments, the method provided comprises identifying a first language and a second language, receiving an initial message in the first language from a first person at a first chat client system who communicates in the first language, and querying a data store for a first corresponding message, in the second language, that is based on the initial message in the first language. If the data store includes the first corresponding message, the method may then assist in sending the corresponding message to a second person at a second chat client system who communicates in the second language. Depending on the embodiment, the initial message may comprise test, an emotion, ASCII-based art, or other content suitable or customary for a human-readable message sent over a network. Additionally, the initial message may be part of a larger message being communicated between chat client systems (e.g., the initial message is one sentence in a multi-sentence message).

If the data store does not include the first corresponding message, the method may utilize a transformation engine to attempt to transform at least a portion of the initial message to a transformed message in the first language. Using the transformed message, the method may then query the data store for a second corresponding message, in the second language, that is based on the transformed message.

For certain embodiments, the system or method may attempt transforming the initial message using a series of transformation operations before querying the data store is queried for a second corresponding message that is based on the transformed message. Alternatively, in some embodiments, the system or method may perform the transformation and query iteratively, whereby the initial message is transformed using a subset of available transformation operations, the data store is queried for a second corresponding message based on the resulting transformed message, and if a second corresponding message is not identified, another iteration of transformation and query is performed (e.g., the resulting transformed message is further transformed using another subset available transformation operations, and the data store is queried for a second corresponding message based on the resulting transformed message). In some such embodiments, the subset of transformation operations applied in each iteration may be applied to the initial message or may be applied to the latest resulting transformed message.

Eventually, the method may assist in translating the initial message or the transformed message to a corresponding message in the second language. In some embodiments, the initial message may be translated to the corresponding message when the first corresponding message for the initial message is not in the data store, and the transformation engine does not transform at least a portion of the initial message. Additionally, in various embodiments, the transformed message may be translated to the corresponding message when: the first corresponding message for the initial message is not in the data store; the transformation engine results in a transformed message that contains the transformation of at least a portion of the initial message; and the data store does not include the second corresponding message for the transformed message.

Depending on the embodiment, transforming the portion of the initial message may comprise identifying a chatspeak word or phrase (e.g., 'lol,' 'gr8') in the initial message and replacing the chatspeak word or phrase with a non-chatspeak word or phrase, performing a spelling check on the portion of the initial message, or identifying an abbreviation in the portion of the initial message and replacing the abbreviation with a word or a phrase corresponding to (e.g., represented by) the abbreviation (e.g., 'CA' with 'California' or 'brb' to 'be right back').

In addition, transforming the portion of the initial message may comprise identifying an acronym in the portion of the initial message and replacing the acronym with a word or a phrase corresponding to (e.g., represented by) the acronym (e.g., 'USA'), or identifying a colloquial word or phrase in the portion of the initial message and replacing the colloquial word or phrase with a word or a phrase representing the colloquial word or phrase. Furthermore, transforming the portion of the initial message may comprise identifying a profane word or phrase in the portion of the initial message and replacing the profane word or phrase with a non-profane word or a phrase (e.g., that is representative of the profane word or phrase) or removing the profane word or phrase from the initial message.

For some embodiments, transforming the portion of the initial message comprises flagging the portion of the initial message to not be translated. For instance, wherein a certain portion of the initial message comprises a proper noun, a common noun, a diminutive, an abbreviation, or an acronym, the method may flag that certain portion such that it is not translated in subsequent operations.

Certain embodiments provide for a system comprising various components that are configured to perform various operations described herein. Likewise, certain embodiments provides for a computer program product comprising computer instruction codes configured to cause the computer system to perform various operations described herein.

In one aspect, the invention relates to a computer-implemented method. The method includes: selecting from a data store a word or phrase associated with a failure to translate a message containing the word or phrase from a first language to a second language; selecting a user from which to solicit user feedback for the translation failure; determining a value of an incentive to offer the user in exchange for the user feedback; sending a request for the feedback to a computing device of the user, the request including the incentive; receiving the user feedback from the computing device wherein the user feedback includes a respective word or phrase in the first or second language; determining that the user feedback is approved; and based on the approval, crediting an account of the user according to the value of the incentive.

In certain embodiments, the failure is due to an actual failure to translate the message. The failure may be identified by or may be due to a user flagging the message as potentially incorrect. Selecting the user may be based on a confidence measure of the user, a quota associated with the user, a previous credit to the account of the user, a preference of the user, or a language ability of the user. In some embodiments, the word or phrase includes chatspeak in the first language. The response may include chatspeak in the second language. In some implementations, the query includes a field configured to receive a text-based value.

In certain embodiments, the request includes a set of preselected definitions from which the user can choose a definition for the word or phrase. The set of preselected definitions may include, for example, at least one definition provided by another user in response to another request, the other request being previously generated to obtain previous user feedback for the word or phrase from the other user. The other request may include another set of preselected definitions from which the other user chose the definition. The method may also include evaluating the user feedback to determine a most popular response.

In various embodiments, the method also includes determining a competency of the user based on the user feedback. The method may also include updating a transformation or translation of the word or phrase from the first language to the second language based on the user feedback. In some embodiments, determining that the user feedback is approved may include determining that the user feedback is not fraudulent and/or determining that the user feedback is accurate. Determining that the user feedback is approved may be based on a comparison of the user feedback to at least one previous user feedback provided by another user in response to another request, the other request being previously generated to obtain feedback for the word or phrase from the other user.

In certain embodiments, the incentive includes (or is an offer for) in-game currency or an in-game item. The value of the incentive may be determined based on, for example, a complexity of the word or phrase or importance of the word or phrase. In some examples, determining the value of the incentive includes considering (i) a complexity of the word or phrase, (ii) an importance of the word or phrase, (iii) a response method employed by the user, (iv) a type of word or phrase, and/or (v) a language involved in the translation failure.

In another aspect, the invention relates to a system that includes one or more computers programmed to perform operations. The operations include selecting from a data store a word or phrase associated with a failure to translate a message containing the word or phrase from a first language to a second language; selecting a user from which to solicit user feedback for the translation failure, determining a value of an incentive to offer the user in exchange for the user feedback; sending a request for the feedback to a computing device of the user, the request including the incentive; receiving the user feedback from the computing device wherein the user feedback includes a respective word or phrase in the first or second language; determining that the user feedback is approved; and based on the approval, crediting an account of the user.

In certain embodiments, the failure is due to an actual failure to translate the message. The failure may be identified by or may be due to a user flagging the message as potentially incorrect. Selecting the user may be based on a confidence measure of the user, a quota associated with the user, a previous credit to the account of the user, a preference of the user, or a language ability of the user. In some embodiments, the word or phrase includes chatspeak in the first language. The response may include chatspeak in the second language. In some implementations, the query includes a field configured to receive a text-based value.

In certain embodiments, the request includes a set of preselected definitions from which the user can choose a definition for the word or phrase. The set of preselected definitions may include, for example, at least one definition provided by another user in response to another request, the other request being previously generated to obtain previous user feedback for the word or phrase from the other user. The other request may include another set of preselected definitions from which the other user chose the definition. The operations may also include evaluating the user feedback to determine a most popular response.

In various embodiments, the operations also include determining a competency of the user based on the user feedback. The operations may also include updating a transformation or translation of the rod or phrase from the first language to the second language based on the user feedback. In some embodiments, determining that the user feedback is approved may include determining that the user feedback is not fraudulent and/or determining that the user feedback is accurate. Determining that the user feedback is approved may be based on a comparison of the user feedback to at least one previous user feedback provided by another user in response to another request, the other request being previously generated to obtain feedback for the word or phrase from the other user.

In certain embodiments, the incentive includes (or is an offer for) in-game currency or an in-game item. The value of the incentive may be determined based on, for example, a complexity of the word or phrase or importance of the word or phrase. In some examples, determining the value of the incentive includes considering (i) a complexity of the word or phrase, (ii) an importance of the word or phrase, (iii) a response method employed by the user, (iv) a type of word or phrase, and/or (v) a language involved in the translation failure.

In another aspect, the invention relates to a computer program product stored in one or more storage media for improving language translation through incentivized feedback. The computer program product is executable by the data processing apparatus to cause the data processing apparatus to perform operations that include: selecting from a data store a word or phrase associated with a failure to translate a message containing the word or phrase from a first language to a second language; selecting a user from which to solicit user feedback for the translation failure; determining a value of an incentive to offer the user in exchange for the user feedback; sending a request for the feedback to a computing device of the user, the request including the incentive; receiving the user feedback from the computing device wherein the user feedback includes a respective word or phrase in the first or second language; determining that the user feedback is approved; and based on the approval, crediting an account of the user.

In certain embodiments, the failure is due to an actual failure to translate the message. The failure may be identified by or may be due to a user flagging the message as potentially incorrect. Selecting the user may be based on a confidence measure of the user, a quota associated with the user; a previous credit to the account of the user, a preference of the user, or a language ability of the user. In some embodiments, the word or phrase includes chatspeak in the first language. The response may include chatspeak in the second language. In some implementations, the query includes a field configured to receive a text-based value.

In certain embodiments, the request includes a set of preselected definitions from which the user can choose a definition for the word or phrase. The set of preselected definitions may include, for example, at least one definition provided by another user in response to another request, the other request being previously generated to obtain previous user feedback for the word or phrase from the other user. The other request may include another set of preselected definitions from which the other user chose the definition. The operations may also include evaluating the user feedback to determine a most popular response.

In various embodiments, the operations also include determining a competency of the user based on the user feedback. The operations may also include updating a transformation or translation of the word or phrase from the first language to the second language based on the user feedback. In some embodiments, determining that the user feedback is approved may include determining that the user feedback is not fraudulent and/or determining that the user feedback is accurate. Determining that the user feedback is approved may be based on a comparison of the user feedback to at least one previous user feedback provided by another user in response to another request, the other request being previously generated to obtain feedback for the word or phrase from the other user.

In certain embodiments, the incentive includes (or is an offer for) in-game currency or an in-game item. The value of the incentive may be determined based on, for example, a complexity of the word or phrase or importance of the word or phrase. In some examples, determining the value of the inventive includes considering (i) a complexity of the word or phrase, (ii) an importance of the word or phrase, (iii) a response method employed by the user, (iv) a type of word or phrase, and/or (v) a language involved in the translation failure.

In one aspect, the invention relates to a method implemented by a data processing apparatus. The method includes: providing a text message chat system to a plurality of users; receiving an original text message in a first language from a first user, generating an initial translation in a second language of the original text message; providing the original text message and the initial translation to a second user; receiving a translation correction from the second user to address an error in the initial translation; and at least one of: (a) identifying a most accurate translation correction from a plurality of translation corrections, the plurality of translation corrections including the translation correction from the second user; and (b) evaluating an accuracy of the translation correction from the second user using a word-based feature, a language-based feature, and/or a word alignment feature.

In certain embodiments, the method includes offering an incentive (e.g., a virtual good and/or a virtual currency for use in an online game) to encourage the second user to submit the translation correction. Determining the most accurate translation correction may include: receiving at least one additional translation correction from at least one additional user to address the error in the initial translation, wherein that at least one additional translation correction and the translation correction from the second user define the plurality of translation corrections; receiving feedback from users regarding an accuracy of the plurality of translation corrections; and, based on the feedback, identifying the most accurate translation correction from the plurality of translation corrections.

In some implementations, the method also includes providing a reward (e.g., a virtual good and/or a virtual currency for use in an online game) to a user who submitted the most accurate translation correction. The method may also include providing a reward (e.g., a virtual good and/or a virtual currency for use in an online game) to a user who provided the feedback used to identify the most accurate translation. The word-based feature may include, for example, a word count, a character count, an emojis, a number, and/or a punctuation mark. Using the language-based feature may include identifying parts of speech present in the original text message and in the translation correction from the second user.

In some embodiments, the method also includes: identifying a number of verbs present in each of the original text message and the translation correction from the second user; and comparing the number of verbs in the original text message with the number of verbs in the translation correction from the second user. An absence of a part of speech in the original text message and/or the translation correction from the second user may be indicative of a language detection failure. The method may also include rejecting the translation correction from the second user when the translation correction from the second user is the same as the initial translation.

In another aspect, the invention relates to a system that includes a computer readable medium having instructions stored thereon, and a data processing apparatus. The data processing apparatus is configured to execute the instructions to perform operations including: providing a text message chat system to a plurality of users; receiving an original text message in a first language from a first user; generating an initial translation in a second language of the original text message; providing the original text message and the initial translation to a second user; receiving a translation correction from the second user to address an error in the initial translation; and at least one of: (a) identifying a most accurate translation correction from a plurality of translation corrections, the plurality of translation corrections including the translation correction from the second user; and (b) evaluating an accuracy of the translation correction from the second user using a word-based feature, a language-based feature, and/or a word alignment feature.

In certain embodiments, the operations include offering an incentive (e.g., a virtual good and/or a virtual currency for use in an online game) to encourage the second user to submit the translation correction. Determining the most accurate translation correction may include: receiving at least one additional translation correction from at least one additional user to address the error in the initial translation, wherein the at least one additional translation correction and the translation correction from the second user define the plurality of translation corrections; receiving feedback from users regarding an accuracy of the plurality of translation corrections; and, based on the feedback, identifying the most accurate translation correction from the plurality of translation corrections.

In some implementations, the operations also include providing a reward (e.g., a virtual good and/or a virtual currency for use in an online game) to a user who submitted the most accurate translation correction. The operations may also include providing a reward (e.g., a virtual good and/or a virtual currency for use in an online game) to a user who provided the feedback used to identify the most accurate translation. The word-based feature may include, for example, a word count, a character count, and emojis, a number, and/or a punctuation mark. Using the language-based feature may include identifying parts of speech present in the original text message and in the translation correction from the second user.

In some embodiments, the operations also include: identifying a number of verbs present in each of the original text message and the translation correction from the second user; and comparing the number of verbs in the original text message with the number of verbs in the translation correction from the second user. An absence of a part of speech in the original text message and/or the translation correction from the second user may be indicative of a language detection failure. The operations may also include rejecting the translation correction from the second user when the translation correction from the second user is the same as the initial translation.

In another aspect, the invention relates to a computer program product stored in one or more storage media for controlling a processing mode of a data processing apparatus. The computer program product is executable by the data processing apparatus to cause the data processing apparatus to perform operations including: providing a text message chat system to a plurality of users, receiving an original text message in a first language from a first user; generating an initial translation in a second language of the original text message; providing the original text message and the initial translation to a second user; receiving a translation correction from the second user to address an error in the initial translation; and at least one of: (a) identifying a most accurate translation correction from a plurality of translation corrections, the plurality of translation corrections including the translation correction from the second user; and (b) evaluating an accuracy of the translation correction from the second user using a word-based feature, a language-based feature, and/or a word alignment feature.

In certain embodiments, the operations include offering an incentive (e.g., a virtual good and/or a virtual currency for use in an online game) to encourage the second user to submit the translation correction. Determining the most accurate translation correction may include: receiving at least one additional translation correction from at least one additional user to address the error in the initial translation, wherein the at least one additional translation correction and the translation correction from the second user define the plurality of translation corrections; receiving feedback from users regarding an accuracy of the plurality of translation corrections; and, based on the feedback, identifying the most accurate translation correction from the plurality of translation corrections.

In some implementations, the operations also include providing a reward (e.g., a virtual good and/or a virtual currency for use in an online game) to a user who submitted the most accurate translation correction. The operations may also include providing a reward (e.g., a virtual good and/or a virtual currency for use in an online game) to a user who provided the feedback used to identify the most accurate translation. The word-based feature may include, for example, a word count, a character count, an emojis, a number, and/or a punctuation mark. Using the language-based feature may include identifying parts of speech present in the original text message and in the translation correction from the second user.

In some embodiments, the operations also include: identifying a number of verbs present in each of the original text message and the translation correction from the second user; and comparing the number of verbs in the original text message with the number of verbs in the translation correction from the second user. An absence of a part of speech in the original text message and/or the translation correction from the second user may be indicative of a language detection failure. The operations may also include rejecting the translation correction from the second user when the translation correction from the second user is the same as the initial translation.

In one aspect, the invention relates to a method implemented by data processing apparatus. The method includes: identifying a first language and a second language; receiving a chatspeak audible message in the first language from a first person at a first chat client system who communicates in the first language; converting the chatspeak audible message to a chatspeak text message in the first language; transforming the chatspeak text message to a plain speak text message in the first language; translating the plain speak text message to a corresponding plain speak text message in the second language; transforming the corresponding plain speak text message to a corresponding chatspeak text message in the second language; converting the corresponding chatspeak text message to a corresponding chatspeak audible message in the second language; and sending the corresponding chatspeak audible message to a second person at a second chat client system who communicates in the second language.

In certain embodiments, converting the chatspeak audible message to a chatspeak text message in the first language includes providing the chatspeak audible message to a speech recognition system. Transforming the chatspeak text message may include: identifying a chatspeak word or phrase in the chatspeak text message; and replacing the chatspeak word or phrase with a non-chatspeak word or phrase. In some examples, converting the corresponding chatspeak text message to a corresponding chatspeak audible message in the second language includes providing the corresponding chatspeak text message to a text-to-speech system.

In certain implementations, the speech recognition system and/or the text-to-speech system utilize data including a plurality of accents and dialects for each of the first and second languages. The data may include chatspeak and plain speak formats for each of the first and second languages. In various embodiments, the method includes receiving feedback from a user regarding an accuracy of the corresponding plain speak text message, the corresponding chatspeak text message, and/or the corresponding chatspeak audible message. The method may also include offering an incentive (e.g., a virtual good and/or a virtual currency, for use in an online game) to the user for providing the feedback. In some instances, the method includes processing the feedback to improve accuracy of the speech recognition system and/or the text-to-speech system.

In another aspect, the invention relates to a system including a computer readable medium having instructions stored thereon, and a data processing apparatus. The data processing apparatus is configured to execute the instructions to perform operations including: identifying a first language and a second language; receiving a chatspeak audible message in the first language from a first person at a first chat client system who communicates in the first language; converting the chatspeak audible message to a chatspeak text message in the first language; transforming the chatspeak text message to a plain speak text message in the first language; translating the plain speak text message to a corresponding plain speak text message in the second language; transforming the corresponding plain speak text message to a corresponding chatspeak text message in the second language; converting the corresponding chatspeak text message to a corresponding chatspeak audible message in the second language; and sending the corresponding chatspeak audible message to a second person at a second chat client system who communicates in the second language.

In certain embodiments, converting the chatspeak audible message to a chatspeak text message in the first language includes providing the chatspeak audible message to a speech recognition system. Transforming the chatspeak text message may include: identifying a chatspeak word or phrase in the chatspeak text message; and replacing the chatspeak word or phrase with a non-chatspeak word or phrase. In some examples, converting the corresponding chatspeak text message to a corresponding chatspeak audible message in the second language includes providing the corresponding chatspeak text message to a text-to-speech system.

In certain implementations, the speech recognition system and/or the text-to-speech system utilize data including a plurality of accents and dialects for each of the first and second languages. The data may include chatspeak and plain speak formats for each of the first and second languages. In various embodiments, the operations include receiving feedback from a user regarding an accuracy of the corresponding plain speak text message, the corresponding chatspeak text message; and/or the corresponding chatspeak audible message. The operations may also include offering an incentive (e.g., a virtual good and/or a virtual currency, for use in an online game) to the user for providing the feedback. In some instances, the operations include processing the feedback to improve accuracy of the speech recognition system and/or the text-to-speech system.

In another aspect, the invention relates to a computer program product stored in one or more storage media for controlling a processing mode of a data processing apparatus. The computer program product is executable by the data processing apparatus to cause the data processing apparatus to perform operations including: identifying a first language and a second language; receiving a chatspeak audible message in the first language from a first person at a first chat client system who communicates in the first language; converting the chatspeak audible message to a chatspeak text message in the first language; transforming the chatspeak text message to a plain speak text message in the first language; translating the plain speak text message to a corresponding plain speak text message in the second language; transforming the corresponding plain speak text message to a corresponding chatspeak text message in the second language; converting the corresponding chatspeak text message to a corresponding chatspeak audible message in the second language; and sending the corresponding chatspeak audible message to a second person at a second chat client system who communicates in the second language.

In certain embodiments, converting the chatspeak audible message to a chatspeak text message in the first language includes providing the chatspeak audible message to a speech recognition system. Transforming the chatspeak text message may include: identifying a chatspeak word or phrase in the chatspeak text message; and replacing the chatspeak word or phrase with a non-chatspeak word or phrase. In some examples, converting the corresponding chatspeak text message to a corresponding chatspeak audible message in the second language includes providing the corresponding chatspeak text message to a text-to-speech system.

In certain implementations, the speech recognition system and/or the text-to-speech system utilize data including a plurality of accents and dialects for each of the first and second languages. The data may include chatspeak and plain speak formats for each of the first and second languages. In various embodiments, the operations include receiving feedback from a user regarding an accuracy of the corresponding plain speak text message, the corresponding chatspeak text message, and/or the corresponding chatspeak audible message. The operations may also include offering an incentive (e.g., a virtual good and/or a virtual currency, for use in an online game) to the user for providing the feedback. In some instances, the operations include processing the feedback to improve accuracy of the speech recognition system and/or the text-to-speech system.

In one aspect, the invention relates to a method implemented by a data processing apparatus. The method includes: selecting a mixture of old training data (e.g., including one or more old text messages for which correct translations to a different language are known) and new training data (e.g., including one or more new text messages for which correct translations to the different language are not known); sending a plurality of respective requests at different times to a client device of a user (or to multiple client devices of multiple users), wherein the requests include (i) a respective request for the user to translate the old training data and/or the new training data and (ii) a respective incentive for the translation; after sending a particular request, receiving a translation from the client device for the old training data of the particular request; comparing the received translation with the correct translation for the old training data; determining an accuracy of the received translation based on the comparison; and updating a confidence score for the user based on the translation. The confidence score represents a likelihood that the user will provide an accurate translation of a text message to the different language at a later time.

In certain embodiments, the user is a particular in an online game. The respective incentive may include, for example, a virtual good and/or a virtual currency for the online game. Determining an accuracy of the translation received from the user may include (i) computing word error rate (WER) and/or (ii) using bilingual evaluation understudy (BLEU). In some instances, updating the confidence score for the user includes using item response theory to identify a deviation from a norm in user translation accuracy. The method may also include revoking the user's translation privileges when the confidence score falls below a threshold value.

In various implementations, the method includes rewarding the user with the respective incentive when the user's translation is determined to be correct. The method may also include detecting collusion between the user and a second user by identifying a pre-existing relationship between the user and the second user. In one example, identifying the pre-existing relationship includes analyzing a social network of at least one of the user and the second user.

In another aspect, the invention relates to a system including a computer readable medium having instructions stored thereon, and a data processing apparatus. The data processing apparatus is configured to execute the instructions to perform operations including: selecting a mixture of old training data (e.g., including one ore more old text messages for which correct translations to a different language are known) and new training data (e.g., including one or more new text messages for which correct translations to the different language are not known), sending a plurality of respective requests at different times to a client device of a user (or to multiple client devices of multiple users), wherein the requests include (i) a respective request for the user to translate the old training data and/or the new training data and (ii) a respective incentive for the translation; after sending a particular request, receiving a translation from the client device for the old training data of the particular request; comparing the received translation with the correct translation for the old training data; determining an accuracy of the received translation based on the comparison; and updating a confidence score for the user based on the translation. The confidence score represents a likelihood that the user will provide an accurate translation of a text message to the different language at a later time.

In certain embodiments, the user is a participant in an online game. The respective incentive may include, for example, a virtual good and/or a virtual currency for the online game. Determining an accuracy of the translation received from the user may include (i) computing word error rate (WER) and/or (ii) using bilingual evaluation understudy (BLEU). In some instances, updating the confidence score for the user includes using item response theory to identify a deviation from a norm in user translation accuracy. The operations may also include revoking the user's translation privileges when the confidence score falls below a threshold value.

In various implementations, the operations include rewarding the user with the respective incentive when the user's translation is determined to be correct. The operations may also include detecting collusion between the user and a second user by identifying a pre-existing relationship between the user and the second user. In one example, identifying the pre-existing relationship includes analyzing a social network of at least one of the user and the second user.

In another aspect, the invention relates to a computer program product stored in one or more storage media for controlling a processing mode of a data processing apparatus. The computer program product is executable by the data processing apparatus to cause the data processing apparatus to perform operations including: selecting a mixture of old training data (e.g., including one or more old text messages for which correct translations to a different language are known) and new training data (e.g., including one ore more new text messages for which correct translations to the different language are not known); sending a plurality of respective requests at different times to a client device of a user (or to multiple client devices of multiple users), wherein the requests include (i) a respective request for the user to translate the old training data and/or the new training data and (ii) a respective incentive for the translation; after sending a particular request, receiving a translation from the client device for the old training data of the particular request; comparing the received translation with the correct translation for the old training data; determining an accuracy of the received translation based on the comparison; and updating a confidence score for the user based on the translation. The confidence score represents a likelihood that the user will provide an accurate translation of a text message to the different language at a later time.

In certain embodiments, the user is a participant in an online game. The respective incentive may include, for example, a virtual good and/or a virtual currency for the online game. Determining an accuracy of the translation received from the user may include (i) computing word error rate (WER) and/or (ii) using bilingual evaluation understudy (BLEU). In some instances, updating the confidence score for the user includes using item response theory to identify a deviation from a norm in user translation accuracy. The operations may also include revoking the user's translation privileges when the confidence score falls below a threshold value.

In various implementations, the operations include rewarding the user with the respective incentive when the user's translation is determined to be correct. The operations may also include detecting collusion between the user and a second user by identifying a pre-existing relationship between the user and the second user. In one example, identifying the pre-existing relationship includes analyzing a social network of at least one of the user and the second user.

In one aspect, the invention relates to a method implemented by a data processing apparatus. The method includes obtaining a text message in a first language, the text message comprising at least one word; providing the text message to a machine translation system; obtaining a translation of the text message from the machine translation system; determining that the text message and the translation both comprise the at least one word in the first language and that the at least one word is correctly spelled; and performing one or more of the following: (a) determining a frequency with which the at least one word appears in prior text messages; (b) determining Bayesian probabilities for neighboring words that appear before and after the at least one word; and (c) performing k-means clustering to identify a cluster of words including synonyms. When the frequency exceeds a first threshold value, when the Bayesian probabilities exceed a second threshold value, and/or when the cluster includes the at least one word, the method includes adding the at least one word to a lexicon in a date store.

In certain embodiments, the at least one word includes or is an out of vocabulary word. The at least one word may be or include a new chatspeak word. The method may include determining whether the lexicon in the data store includes the at least one word. The text message may be received from a client device of a player in an online game. In various examples, the lexicon includes or consists of words in a vocabulary of the first language.

Determining Bayesian probabilities may include (i) reviewing previous uses of the at least one word in prior text messages and (ii) identifying words, if any, that appear before and after the at least one word in the prior text messages. The Bayesian probabilities may provide an indication of a likelihood that the neighboring words will appear before and after the at least one word in the test message.

In various implementations, identifying the cluster includes reviewing prior text messages and identifying words used in a similar context as the at least one word in the text message. The method may also include analyzing syntax and semantics of the text message to determine parts of speech present in the text message.

In another aspect, the invention relates to a system including a computer readable medium having instructions stored thereon, and a data processing apparatus. The data processing apparatus is configured to execute the instructions to perform operations including: obtaining a text message in a first language, the text message comprising at least one word; providing the text message to a machine translation system; obtaining a translation of the text message from the machine translation system; determining that the text message and the translation both comprise the at least one word in the first language and that the at least one word is correctly spelled; and performing one or more of the following: (a) determining a frequency with which the at least one word appears in prior text messages; (b) determining Bayesian probabilities for neighboring words that appear before and after the at least one word; and (c) performing k-means clustering to identify a cluster of words including synonyms. When the frequency exceeds a first threshold value, when the Bayesian probabilities exceed a second threshold value, and/or when the cluster includes the at least one word, the method includes adding the at least one word to a lexicon in a data store.

In certain embodiments, the at least one word includes or is an out of vocabulary word. The at least one word may be or include a new chatspeak word. The operations may include determining whether the lexicon in the data store includes the at least one word. The text message may be received from a client device of a player in an online game. In various examples, the lexicon includes or consists of words in a vocabulary of the first language.

Determining Bayesian probabilities may include (i) reviewing previous uses of the at least one word in prior text message and (ii) identifying words, if any, that appear before and after the at least one word in the prior test messages. The Bayesian probabilities may provide an medication of a likelihood that the neighboring words will appear before and after the at least one word in the text message.

In various implementations, identifying the cluster includes reviewing prior text messages and identifying words used in a similar context as the at least one word in the text message. The operations may also include analyzing syntax and semantics of the text message to determine parts of speech present in the text message.

In another aspect, the invention relates to a computer program product stored in one or more storage media for controlling a processing mode of a data processing apparatus. The computer program product is executable by the data processing apparatus to cause the data processing apparatus to perform operations including: obtaining a text message in a first language, the text message comprising at least one word; providing the text message to a machine translation system; obtaining a translation of the text message from the machine translation system; determining that the text message and the translation both comprise the at least one word in the first language and that the at least one word is correctly spelled; and performing one or more of the following: (a) determining a frequency with which the at least one word appears in prior text message; (b) determining Bayesian probabilities for neighboring words that appear before and after the at least one word; and (c) performing k-means clustering to identify a cluster of words including synonyms. When the frequency exceeds a first threshold value, when the Bayesian probabilities exceed a second threshold value, and/or when the cluster includes the at least one word, the method includes adding the at least one word to a lexicon in a data store.

In certain embodiments, the at least one word includes or is an out of vocabulary word. The at least one word may be or include a new chatspeak word. The operations may include determining whether the lexicon in the data store includes the at least one word. The text message may be received from a client device of a player in an online game. In various examples, the lexicon includes or consists of words in a vocabulary of the first language.

Determining Bayesian probabilities may include (i) reviewing previous uses of the at least one word in prior text messages and (ii) identifying words, if any, that appear before and after the at least one word in the prior text messages. The Bayesian probabilities may provide an indication of a likelihood that the neighboring words will appear before and after the at least one word in the text message.

In various implementations, identifying the cluster includes reviewing prior text messages and identifying words used in a similar context as the at least one word in the text message. The operations may also include analyzing syntax and semantics of the text message to determine parts of speech present in the text message.

In one aspect, the invention relates to a method implemented by data processing apparatus. The method includes: (a) receiving a request to review a portion of a history of text messages from a multi-user chat session, the history comprising a plurality of text messages, each text messages being in a respective language and having originated from a respective chat session participant, (b) performing a plurality of parallel processes, each parallel process comprising (i) selecting a different respective text message from the portion of the history of text messages, and (ii) translating the selected text message into a target language; (c) providing translated text messages from the plurality of parallel processes to a client device of a user; (d) receiving a request to review a different portion of the history of text messages; and (e) repeating steps (b) and (c) for the different portion of the history of text messages.

In certain embodiments, selecting the different respective text message includes querying a storage device for the portion of the history of text messages. Translating the selected text message may include transforming at least a portion of the text message from chatspeak to plain speak. In some implementations, the method includes receiving a request from the user to stop viewing the history of text messages. The plurality of parallel processes may include one process for each respective chat session participant. Alternatively or additionally, the plurality of parallel processes may include one process for each language used in the respective chat session.

In another aspect, the invention relates to a system including a computer readable medium having instructions stored thereon, and a data processing apparatus. The data processing apparatus is configured to execute the instructions to perform operations including: (a) receiving a request to review a portion of a history of text messages from a multi-user chat session, the history comprising a plurality of text messages, each text message being in a respective language and having originated from a respective chat session participant, (b) performing a plurality of parallel processes, each parallel process comprising (i) selecting a different respective text message from the portion of the history of text messages, and (ii) translating the selected text message into a target language; (c) providing translated text messages from the plurality of parallel processes to a client device of a user; (d) receiving a request to review a different portion of the history of text messages, and (e) repeating steps (b) and (c) for the different portion of the history of text messages.

In certain embodiments, selecting the different respective text message includes querying a storage device for the portion of the history of text messages. Translating the selected text message may include transforming at least a portion of the text message from chatspeak to plain speak. In some implementations, the operations include receiving a request from the user to stop viewing the history of text messages. The plurality of parallel processes may include one process for each respective chat session participant. Alternatively or additionally, the plurality of parallel processes may include one process for each language used in the respective chat session.

In another aspect, the invention relates to a computer program product stored in one or more storage media for controlling a processing mode of a data processing apparatus. The computer program product is executable by the data processing apparatus to cause the data processing apparatus to perform operations including: (a) receiving a request to review a portion of a history of text messages from a multi-user chat session, the history comprising a plurality of text messages, each text message being in a respective language and having originated from a respective chat session participant; (b) performing a plurality of parallel processes, each parallel process comprising (i) selecting a different respective text message from the portion of the history of text messages, and (ii) translating the selected text message into a target language; (c) providing translated text messages from the plurality of parallel processes to a client device of a user; (d) receiving a request to review a different portion of the history of text messages; and (e) repeating steps (b) and (c) for the different portion of the history of text messages.

In certain embodiments, selecting the different respective text message includes querying a storage device for the portion of the history of text messages. Translating the selected text message may include transforming at least a portion of the text message from chatspeak to plain speak. In some implementations, the operations include receiving a request from the user to stop viewing the history of text messages. The plurality of parallel processes may include one process for each respective chat session participant. Alternatively or additionally, the plurality of parallel processes may include one process for each language used in the respective chat session.

In one aspect, the invention relates to a method implemented by data processing apparatus. The method includes providing a text message chat system to a plurality of users (e.g., of an online game); receiving a request from a first user of the text message chat system to block a second user of the text message chat system; and, following receipt of the request, preventing text messages from the second user from being displayed for the first user.

In certain embodiments, following receipt of the request, the method includes blocking future invitations from the second user to the first user to engage in a chat session using the text message chat system. The method may include receiving a second request from the first user to unblock the second user. In some instances, following receipt of the second request, the method includes permitting text messages from the second user to be displayed for the first user. Following receipt of the second request, the method may include permitting future invitations to be sent from the second user to the first user to engage in a chat session using the text message chat system.

In some embodiments, the plurality of users include or define an alliance in the online game. The method may include translating at least a portion of a text message in the text message chat system from a first language to a second language. The method may also include transforming at least a portion of the text message from chat speak to plain speak. In some implementations, translating and/or transforming may include or utilize parallel processes. For example, the parallel processes may include or utilize one process for each of the plurality of users of the chat system (or one process for each language used by the users).

In another aspect, the invention relates to a system including a computer readable medium having instructions stored thereon, and a data processing apparatus. The data processing apparatus is configured to execute the instructions to perform operations including: providing a text message chat system to a plurality of users (e.g., of an online game); receiving a request from a first user of the text message chat system to block a second user of the text message chat system; and, following receipt of the request, preventing text messages from the second user from being displayed for the first user.

In certain embodiments, following receipt of the request, the operations include blocking future invitations from the second user to the first user to engage in a chat session using the text message chat system. The operations may include receiving a second request from the first user to unblock the second user. In some instances, following receipt of the second request, the operations include permitting text messages from the second user to be displayed for the first user. Following receipt of the second request, the operations may include permitting future invitations to be sent from the second user to the first user to engage in a chat session using the text message chat system.

In some embodiments, the plurality of users include or define an alliance in the online game. In operations may include translating a least a portion of a text message in the text message chat system from a first language to a second language. The operations may also include transforming at least a portion of the text message from chat speak to plain speak. In some implementations, translating and/or transforming may include or utilize parallel processes. For example, the parallel processes may include or utilize one process for each of the plurality of users of the chat system (or one process for each language used by the users).

In another aspect, the invention relates to a computer program product stored in one or more storage media for controlling a processing mode of a data processing apparatus. The computer program product is executable by the data processing apparatus to cause the data processing apparatus to perform operations including: providing a text message chat system to a plurality of users (e.g., of an online game); receiving a request from a first user of the text message chat system to block a second user of the text message chat system; and, following receipt of the request, preventing text messages from the second user from being displayed for the first user.

In certain embodiments, following receipt of the request, the operations include blocking future invitations from the second user to the first user to engage in a chat session using the text message chat system. The operations may include receiving a second request from the first user to unblock the second user. In some instances, following receipt of the second request, the operations include permitting text messages from the second user to be displayed for the first user. Following receipt of the second request, the operations may include permitting future invitations to be sent from the second user to the first user to engage in a chat session using the text message chat system.

In some embodiments, the plurality of users include or define an alliance in the online game. The operations may include translating at least a portion of a text message in the text message chat system from a first language to a second language. The operations may also include transforming at least a portion of the text message from chat speak to plain speak. In some implementations, translating and/or transforming may include or utilize parallel processes. For example, the parallel processes may include or utilize one process for each of the plurality of users of the chat system (or one process for each language used by the users).

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

Other features and aspects of various embodiments will become apparent from the following detailed description, taken in conjunction with the accompanying drawings, which illustrate, by way of example, the features of such embodiments.

BRIEF DESCRIPTION OF THE DRAWINGS

Various embodiments are described in detail with reference to the following figures. The drawings are provided for purposes of illustration only and merely depict some embodiments. These drawings shall not be considered limiting of the breadth, scope, or applicability of embodiments.

DETAILED DESCRIPTION

Figure 1:
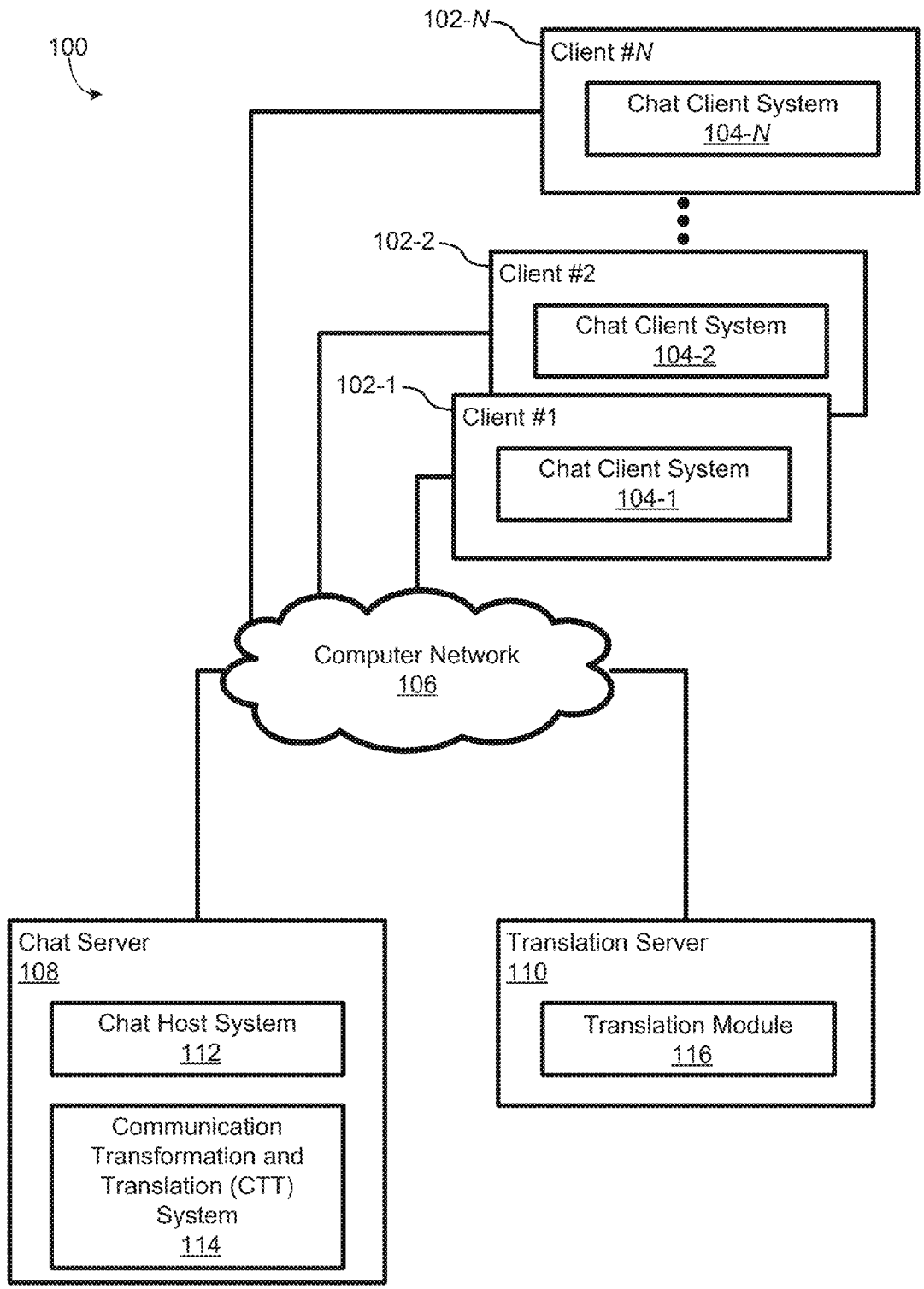
FIG. 1 is a block diagram illustrating an exemplary environment utilizing a multi-lingual communications system, in accordance with various embodiments.

Various embodiments described herein relate to and facilitate multi-lingual communications. The systems and methods of some embodiments may enable multi-lingual communications through different modes of communications including, for example, Internet-based chat (e.g., Apple® iMessage, Windows® Live Messenger, etc.), e-mail (e.g., embedded forum messaging, Yahoo® mail, RFC 5322, etc.), text-based mobile phone communications (e.g., SMS messages or MMS messages), postings to online forums (e.g., postings to a web-based hobby forum), postings to online social media services (e.g., Twitter®, Facebook®, etc.), and the like. Certain embodiments may also be used to translate transcripts of communications or conversations that took place in the past (e.g., deposition transcripts or chat history). Various embodiments may implement communications systems and methods that translate text between two or more languages (e.g., spoken), while handling/accommodating for one or more of the following in the text: specialized/domain-related jargon (e.g., chatspeak), abbreviations, acronyms, proper nouns, common nouns, diminutives, colloquial words or phrases, and profane words or phrases. For example, some systems and methods described herein may be utilized in connection with a chat system, such as those used in massive-multiplayer online (MMO) games, which tend to have users that chat in different foreign languages. Through certain embodiments, the chat dialogue between two or more users can be transparently translated and presented to each user in their respective native language or language of choice. Additionally, through the use of a multi-tiered/multi-module transformation process, certain embodiments may facilitate faster translation of communication between two or more users (e.g., in their respective native languages) than otherwise possible by traditional translation systems alone (e.g., translation in a matter of microseconds).

According to some embodiments, a system or method may perform translation from chatspeak in a first language, such as English, to chatspeak in a second language, such as French. In another example, a system or method may perform transformation from chatspeak in the first language (e.g., English) to formal speak in the first language (e.g., English), before attempting translation to the second language (e.g., French). Some embodiments may achieve such text translations by first querying a data store (e.g., translations cache), which may contain translations manually entered by a human operator or translations based on previously performed by a translation system (e.g., historical translations performed by an embodiment). Embodiments may attempt to transform one or more portions of the text (e.g., process one or more of the following within the text: chatspeak, acronyms, abbreviations, proper nouns, common nouns, colloquialisms, and profanity) to make it more suitable for accurate text translation. For example, certain embodiments may transform a given text to account for (current or past) idiomatic language use across different languages. Embodiments may reattempt querying the data store after transformation of the portions of the text. If this translation lookup reattempt fails, embodiments may attempt to translate the text (which may have been transformed) using a machine translation service (e.g., third-party, cloud-based translation service, such as Google® translate).

Embodiments may attempt to transform a translated piece of formal text to chatspeak in the new language (e.g., transform French formal speak to French chatspeak) to further refine the translation of the text eventually produced. Accordingly, certain embodiments facilitate chat translation between chatspeak in a first language (e.g., English) to chatspeak in a second language (e.g., Russian, French, Spanish, Chinese, Hindi, etc.).

Some embodiments may help reduce or avoid the need for using machine translations (thereby reducing time, cost, and other overhead associated with machine translations), and may facilitate accurate translations of text having minimal context or comprising short sentence structure. Where the machine translation is facilitated by a third-party service or over a secure network connection (e.g., Secure-Socket Layer [SSL] connection), the cost or overhead avoided by certain embodiments may be significant.

As understood herein, "transformation" means manipulating a first text segment, in a first language, to form a second text segment in the first language. The resulting second text segment may also be referred to herein as the "transformed text." "Translation" will be understood to mean converting a text segment in a first language to a corresponding text segment in a second language.

As also understood herein, a "transformed translation" means translation of a text segment (from a first language to a second language) that has already been transformed in accordance with embodiments described herein (e.g., transformed from chatspeak text in a first language to formal text in the first language). An "untransformed translation" will be understood to mean a translation of a text segment (from a first language to a second language) before the text segment has been transformed in accordance with embodiments described herein.

Various embodiments may implement different transformation/translation strategies, with certain strategies being well suited for particular translation applications. For example, for particular chat system applications, the transformation strategy implemented may comprise applying the following set of transformation-related modules in the order listed: chatspeak module, acronym module, proper noun module, common noun module, colloquialism module, spelling check module, abbreviation module, and profanity module. Generally, the transformation/translation strategy employed determines which transformation operations are performed, when the transformation operations are performed in the overall translation process (e.g., transformation performed before or after machine translation), or in what order the transformation operations are performed (e.g., precedence or priority of transformation operations). The transformation/translation strategy may also determine what translations are pre-populated into the data store (e.g., translations can be stored in a translation "cache" to speed up the overall process) and when translation caches are utilized in the overall translation process. For certain embodiments, the transformation/translation strategy employed may be dynamically determined based on the conditions of the environment in which the embodiments are used. For example, where a chat system is experiencing a heavier load of users than usual, the transformation/translation strategy may switch to one that lessens the processing burden of the chat system (e.g., relies more on machine translations rather than on the data store).

FIG. 1 is a block diagram illustrating an exemplary environment 100 utilizing a multi-lingual system in accordance with various embodiments. As shown in FIG. 1, the exemplary environment 100 comprises clients 102-1 through 102-N (thereafter, collectively referred to as "clients 102" or "client 102"), a chat server 108, and a translation server 110, each of which may be communicatively coupled with each other through a computer network 106. In accordance with some embodiments, the computer network 106 may be implemented or facilitated using one or more local or wide-area communications networks, such as the Internet, WiFi networks, WiMax networks, private networks, public networks, and the like. Depending on the embodiment, some or all of the communication connections with the computer network 106 may utilize encryption (e.g., Secure Sockets Layer [SSL]) to secure information being transferred between the various entities shown in the exemplary environment 100.

Each of the clients 102, the chat server 108, and the translation server 110 may be implemented using one or more digital devices, which may be similar to the digital devices discussed later with respect to FIG. 12. For instance, the client 102-1 may be any form of computing device capable of receiving user input (e.g., configured for user interaction), capable of providing a client user interface that facilitates communications with one or more other clients (e.g., any of clients 102-2 through 102-N), and capable of communicating with the chat server 108 through the computer network 106. Such computing devices may include a mobile phone, a tablet computing device, a laptop, a desktop computer, personal digital assistant, a portable gaming unit, a wired gaming unit, a thin client, a set-top box, a portable multi-media player, or any other type of network accessible user device known to those of skill in the art. Further, one or more of the chat server 108 and the translation server 100 may comprise of one or more servers, which may be operating on or implemented using one or more cloud-based services (e.g., System-as-a-Service [SaaS], Platform-as-a-Service [PaaS], or Infrastructure-as-a-Service [IaaS]).

The clients 102 may be configured to communicatively connect with the chat server 108, which provides or otherwise facilitates chat sessions between the clients 102. Each of the clients 102-1 through 102-N may comprise a chat client system (104-1 through 104-N, respectively) that enables a user at each of the clients 102 to access to the chat session through the chat server 108. Additionally, depending on the embodiment, each of the chat client systems 104-1 through 104-N (hereinafter, collectively referred to as "chat client systems 104" or "chat client system 104") may be implemented as a standalone chat application, as a chat feature embedded in non-chat application (e.g., video game), or through a chat service accessible at the client through a web browser. Those skilled in the art will appreciate that for some embodiments the chat client systems 104 may be non-heterogeneous with respect to one another and still be capable of establishing a chat session between them. The chat client systems 104 may be capable of receiving chat input (e.g., a chat message) from their respective users in a language (and corresponding character set) selected by the user (e.g., based on user settings or preferences), and transmitting the chat input to the chat server 108 to be relayed to another user (e.g., another user at another chat client system). The chat client systems 104 may also be capable of receiving chat output (e.g., chat session dialogue) from the chat server 108 (e.g., from another user at another chat client system), and displaying the received chat output in a language (and corresponding character set) selected by the user (e.g., based on user setting or preferences).

Through the use of some embodiments, the translation of the chat dialogue may be transparent to the users as dialogue is passed between the chat client systems 104. Accordingly, for some embodiments, all chat dialogue presented at a given chat client system 104 may be in a language native to (or selected by) the user at that given chat client system 104, irrespective of what language is being by users, at other chat client systems 104 that are contributing to the same chat dialogue. For example, where the user at the chat client system 104-1 and the user at the chat client system 104-2 are contributing to the same chat dialogue (i.e., involved in the same chat session), the user at the chat client system 104-1 may have chosen to enter and receive chat dialogue in English while the user at the chat client system 104-2 may have chosen to enter and receive chat dialogue in Russian. Though the users at the client systems 104-1 and 104-2 will see the same chat content, the chat dialogue will be presented in their respectively chosen languages.

As shown, the chat server 108 may comprise a chat host system 112 configured to established and/or facilitate chat sessions between the chat client systems 104, and a communication transformation and translation (CTT) system 114 configured to perform transformation and/or translation operations in accordance with the various systems and methods described herein. For some embodiments, the chat client systems 104 may establish a chat session with each other through the chat host system 112, and the chat host system 104 may utilize the features of the CTT system 114 in facilitating the transparent translation of chat dialogue between the chat client systems 104. Those skilled in the art will appreciate that for some embodiments, the chat host system 112 and the CTT system 114 may be part of separate servers, and that the entity operating the chat host system 112 may be different from the entity operating the CTT system 114. For instance, the chat host system 112 may be a third-party chat host system that utilizes the services of the CTT system 114.

As also shown, the translation server 110 may comprise a translation module 116 configured to receive and service requests for machine text translation. In accordance with some embodiments, the CTT system 114 may utilize the operations/services of the translation module 116 in performing machine translations of texts. The CTT system 114 may use of one or more translation application programming interfaces (APIs) to obtain access to the services provided by the translation module 116. Depending on the embodiment, the translation module 116 (and the server 100 on which it resides) may be operated by a third-party, such as Google®, which may offer the machine translation services free of charge or for a fee. Though the translation module 116 is shown to be a component operating on a server separate from the CTT system 114, those skilled in the art will appreciate that, for some embodiments, the translation module 116 may operating on the same server as the CTT system 114 and/or may be an integrated component of the CTT system 114.

Figure 2:
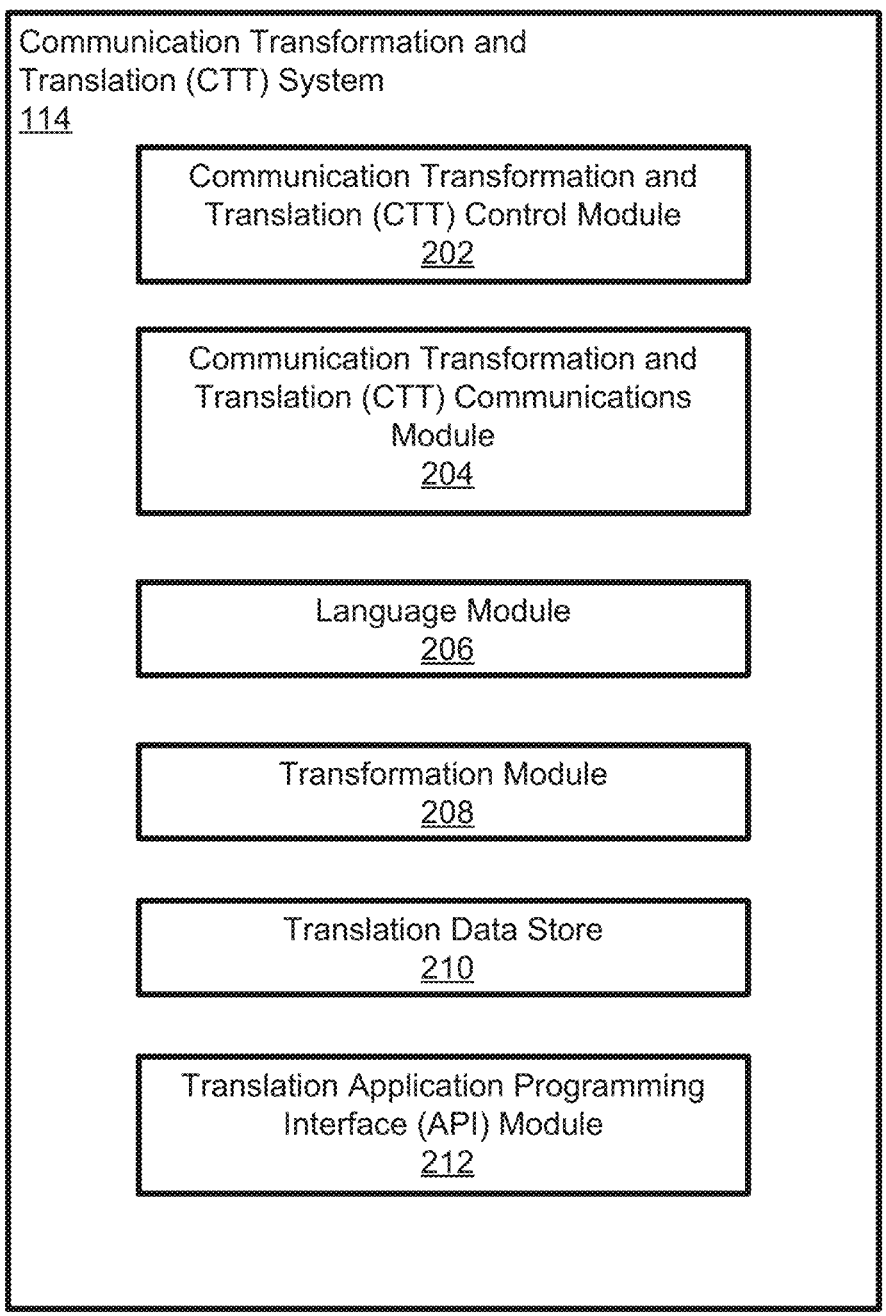
FIG. 2 is a block diagram illustrating an exemplary communication transformation and translation system, in accordance with various embodiments.

FIG. 2 is a block diagram illustrating an exemplary communication transformation and translation system 114 in accordance with various embodiments. As shown the CTT system 114 may comprise a communication transformation and translation (CTT) control module 202, a communication transformation and translation (CTT) communications module 204, a language module 206, a transformation module 208, a translation data store 210, and a translation application programming interface (API) module 212. The CTT control module 202 may be configured to control and/or orchestrate performance of various operations within the CTT system 114 as the CTT system 114 performs transformation or translation operations in accordance with some systems and methods described herein. For some embodiments, the CTT control module 202 may control the operation of other components of the CTT system 114, such as the CTT communications module 204, the language module 206, the transformation module 208, the translation data stores 210, and the translation API module 212.

The CTT communications module 204 may be configured to facilitate communications between the CTT system 114 and systems and components external to the CTT system 114, such as the chat server 108 and/or the translation server 110. Accordingly, through the CTT communications module 204, the CTT system 114 may receive the chat dialogue (comprising one or more chat messages) to be transformed or translated by the CTT system 114, and may output the translated chat dialogue that results from the CTT system 114.

The language module 206 may be configured to identify the one or more languages used in connection with chat dialogue received by the CTT system 114. For some embodiments, the language module 206 may identify the language through analysis of the content of the chat dialogue received, and/or obtaining language preference/settings information from the respective chat client systems (e.g., chat client systems 104) involved with the chat dialogue received.

The transformation module 208 may be configured to perform transformation operations on chat dialogue (comprising one or more chat messages), received by the CTT system 114, in accordance with some systems and methods described herein. In accordance with some embodiments, the transformation operations performed by the transformation module 208 may include, without limitation, those relating to chatspeak, acronyms, abbreviations, proper nouns, common nouns, colloquialisms, and profanity. Additional details of the transformation module 208 are discussed in FIG. 3.

The translation data store 210 may be configured to store and subsequently provide previously translated text to the CTT system 114 as the CTT system 114 performs transformed translations and untransformed translations in accordance with the some system and methods described herein. As described herein, the translation data store 210 may operate as a cache for translations previously performed by the CTT system 114, and/or may store translations manually entered and stored by a human operator (e.g., by way of a translation training system). For some embodiments, the translation data store 210 may be populated with translations that would speed up the performance of the CTT system 114 with respect to certain chat contexts. For example, where the CTT system 114 is utilized in conjunction with a chat system associated with an MMO game, the translation data store 210 may be populated (e.g., by the operator of the CTT system 114) with (transformed and untransformed) translators relating specifically to the MMO game. For certain embodiments, the multi-tiered/multi-module approach of transforming text used by the transformation module 208 is particularly well suited for handling chat text in MMO games, which by nature tends to be complex.

Depending on the embodiment, the data store 210 may store either untransformed translations (e.g., <English Formal> 'you'→<French Formal>'vous'), transformed translations (e.g., <English Chatspeak> 'u'→<French Formal>'vous'), or both. For some embodiments, the translation data store 210 may store translations such that corresponding chat messages may be identified using hash values/tags. For instance, to store a Spanish translation for an original message in English, the Spanish translation may be stored based on a hash value of the English message, thereby enabling the Spanish translation to be later located and obtained using the hash value of the English message. Those skilled in the art will appreciate that for some embodiments, the translation data store 210 may comprise a separate data store for translations between two specific languages. Accordingly, when a chat message is being transformed/translated between English and French, a corresponding data English-French data store may be utilized for operations relating to the translation data store 210.

The translation API module 212 may be configured to provide the CTT system 114 with access to machine translation services provided external to the CTT system 114 (e.g., by the translation module 116 of the translation server 110). As described herein, the translation API module 212 may be utilized by the CTT system 114 when a translation is not located in the translation data store 210.

Figure 3:
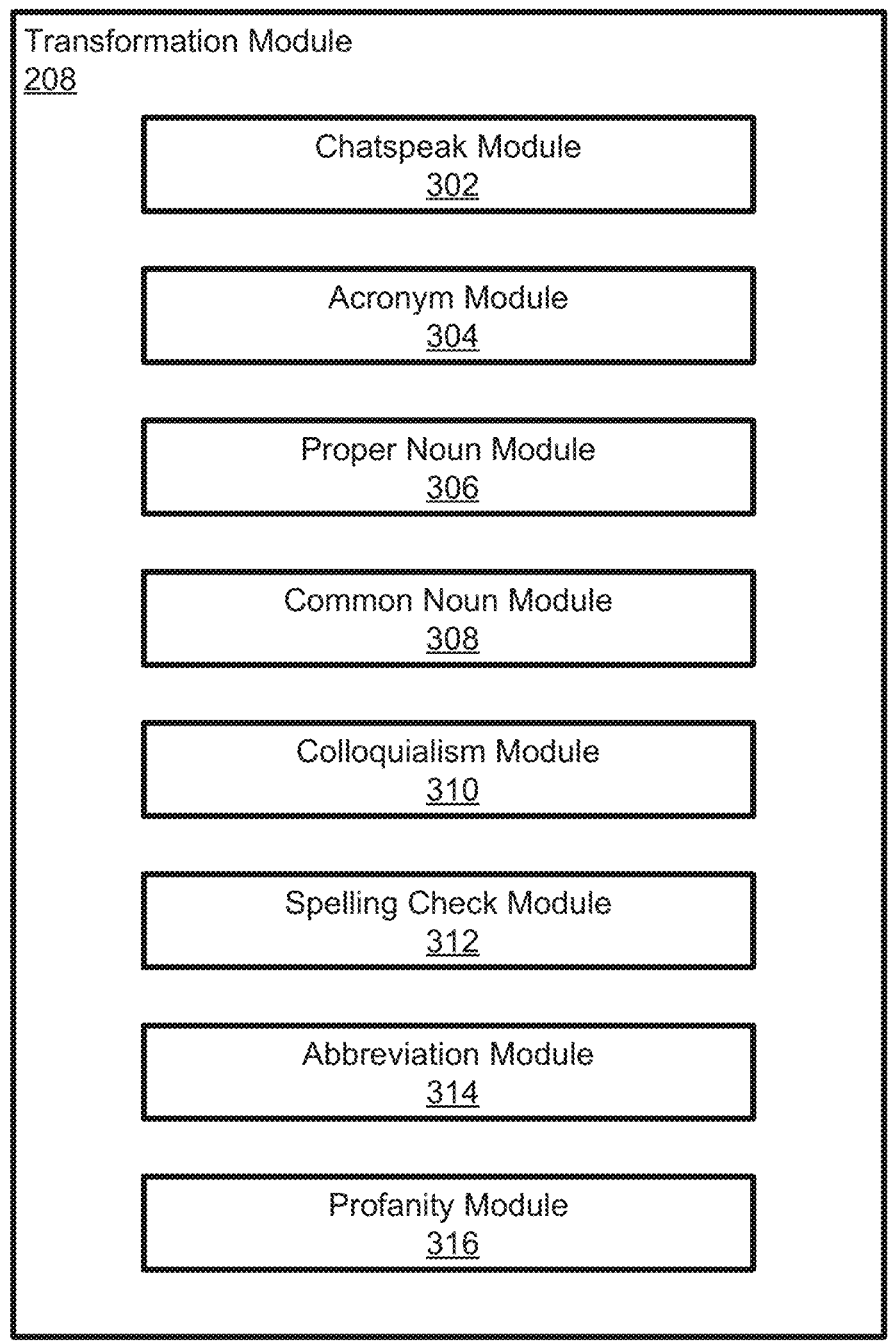
FIG. 3 is a block diagram illustrating an exemplary transformation module, in accordance with various embodiments.

FIG. 3 is a block diagram illustrating an exemplary transformation module 208 in accordance with various embodiments. As shown, the transformation module 208 may comprise a chatspeak module 302, an acronym module 304, a proper noun module 306, a common noun module 308, a colloquialism module 310, a spelling check module 312, an abbreviation module 314, and/or a profanity module 316. According to some embodiments, during operation the transformation module 208 may process a chat message in whole or in parts (e.g., breaks the message into tokens or logical portions and then processes those tokens/portions). In some embodiments, various modules of the transformation module 208 may be called in parallel.

The chatspeak module 302 may be configured to identify one or more words or phrases in a chat message that are associated with chat jargon (i.e., chatspeak), and may be further configured to suggest replacement (e.g., corresponding formal/i.e., non-chatspeak) words or phrases for the identified words or phrases. In some embodiments, the chatspeak module 302 may flag an identified chatspeak word or phrase to be skipped or otherwise ignored during a subsequent machine translation (e.g., by the translation module 116). Additionally, in some embodiments, an identified chatspeak word or phrase may be flagged for later review and disposition by a human operator (e.g., an administrator of the CTT system 114). In order to identify a chatspeak word or phrase and/or its corresponding (formal) word or phrase, some embodiments may utilize a dataset (e.g., stored on a data store) comprising chatspeak words or phrases and/or mappings between chatspeak words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. For example, the chatspeak module 302 may employ statistical machine translation in its functionality. For some embodiments, the statistical machine translation employed may be trained using parallel texts and/or using phrase-level pairs extracted from transformations that preserve contextual information and/or add grammar to an otherwise ungrammatical sentence. The result from the chatspeak module 302 may comprise a chatspeak word or phrase flagged by the chatspeak module 302 to be ignored, a suggested replacement, or a non-chatspeak word or phrase inserted into the message by the chatspeak module 302 (e.g., in place of the identified chatspeak word or phrase). Depending on the embodiment, the message that results from the chatspeak module 302 may be provided to another transformation module (in the transformation module 208) for further processing or the suggested replacement may be provided to the CTT control module 202 to determine if the message transformed by the chatspeak module 302 is in the data store 210.

The acronym module 304 may be configured to identify one or more acronyms in a chat message, and may be further configured to suggest replacement words or phrases corresponding to (e.g., represented by) the acronyms. In some embodiments, the acronym module 304 may flag an identified acronym to be skipped or otherwise ignored during a subsequent machine translation (e.g., by the translation module 116). Additionally, in some embodiments, an identified acronym may be flagged for later review and disposition by a human operator (e.g., an administrator of the CTT system 114). In order to identify an acronym and/or its corresponding word or phrase, some embodiments may utilize a dataset (e.g., stored on a data store) comprising acronyms and/or mappings between acronyms and their corresponding words and phrases. The dataset may be constructed by way of training or a learning system, may be propriety (e.g., manually collected "in-house" by an administrator of the CTT system 114), may be commercially acquired, or may be derived from a publicly available Internet knowledgebase. The result form the acronym module 304 may comprise an acronym flagged by the acronym module 304 to be ignored, a suggested replacement, or a word or phrase inserted into the message by the acronym module 304 (e.g., in place of the identified acronym). Depending on the embodiment, the message that results from the acronym module 304 may be provided to another transformation module (in the transformation module 208) for further processing or the suggested replacement may be provided to the CTT control module 202 to determine if the message transformed by the acronym module 304 is in the data store 210.

The proper noun module 306 may be configured to identify one or more proper nouns in a chat message, and may be further configured to suggest replacement words or phrases corresponding to (e.g., represented by) the proper nouns. In some embodiments, the proper noun module 306 may flag an identified proper noun to be skipped or otherwise ignored during a subsequent machine translation (e.g., by the translation module 116). Additionally, in some embodiments, an identified proper noun may be flagged for later review and disposition by a human operator (e.g., an administrator of the CTT system 114). In order to identify a proper noun and/or its corresponding word or phrase, some embodiments may utilize a dataset (e.g., stored on a data store) comprising proper nouns (e.g., well-known proper nouns such as Disneyland®, or common names for individuals) and/or mappings between proper nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the proper noun module 306 may comprise a proper noun flagged by the proper noun module 306 to be ignored, a suggested replacement, or a word or phrase inserted into the message by the proper noun module 306 (e.g., in place of the identified proper noun). Depending on the embodiment, the message that results from the proper noun module 306 may be provided to another transformation module (in the transformation module 208) for further processing or the suggested replacement may be provided to the CTT control module 202 to determine if the message transformed by the proper noun module 306 is in the data store 210.

The common noun module 308 may be configured to identify one or more common nouns in a chat message, and may be further configured to suggest replacement words or phrases corresponding to (e.g., represented by) the common nouns. In some embodiments, the common noun module 308 may flag an identified common noun to be skipped or otherwise ignored during a subsequent machine translation (e.g., by the translation module 116). Additionally, in some embodiments, an identified common noun may be flagged for later review and disposition by a human operator (e.g., an administrator of the CTT system 114). In order to identify a common noun and/or its corresponding word or phrase, some embodiments may utilize a dataset (e.g., stored on a data store) comprising common nouns and/or mappings between common nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the common noun module 308 may comprise a common noun flagged by the common noun module 308 to be ignored, a suggested replacement, or a word or phrase inserted into the message by the common noun module 308 (e.g., in place of the identified common noun). Depending on the embodiment, the message that results from the common noun module 308 may be provided to another transformation module (in the transformation module 208) for further processing or the suggested replacement may be provided to the CTT control module 202 to determine if the message transformed by the common noun module 308 is in the data store 210.

The colloquialism module 310 may be configured to identify one or more colloquial words or phrases in a chat message, and may be further configured to suggest replacement (e.g., corresponding formal/i.e., non-colloquial) words or phrases for the identified words or phrases. In some embodiments, the colloquialism module 310 may flag an identified colloquial word or phrase to be skipped or otherwise ignored during a subsequent machine translation (e.g., by the translation module 116). Additionally, in some embodiments, an identified colloquial word or phrase may be flagged for later review and disposition by a human operator (e.g., an administrator of the CTT system 114). In order to identify a colloquial word or phrase and/or its corresponding (formal) word or phrase, some embodiments may utilize a dataset (e.g., stored on a data store) comprising colloquial words or phrases and/or mappings between colloquial words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the colloquialism module 310 may comprise a colloquial word or phrase flagged by the colloquialism module 310 to be ignored, a suggested replacement, or a non-colloquial word or phrase inserted into the message by the colloquialism module 310 (e.g., in place of the identified colloquial word or phrase). Depending on the embodiment, the message that results from the colloquialism module 310 may be provided to another transformation module (in the transformation module 208) for further processing or the suggested replacement may be provided to the CTT control module 202 to determine if the message transformed by the colloquialism module 310 is in the data store 210.

The spelling check module 312 may be configured to identify one or more misspelled words or phrases in a chat message, and may be further configured to suggest replacement (e.g., corrected) words or phrases for the identified words or phrases. For example, the spelling check module 312 may be configured to automatically correct the words or phrases with the suggested replacement words or phrases. In some embodiments, the spelling check module 312 may flag an identified misspelled word or phrase to be skipped or otherwise ignored during a subsequent machine translation (e.g., by the translation module 116). Additionally, in some embodiments, an identified misspelled word or phrase may be flagged for later review and disposition by a human operator (e.g., an administrator of the CTT system 114). In order to identify a misspelled word or phrase and/or its corresponding (corrected) word or phrase, some embodiments may utilize a dataset (e.g., stored on a data store) comprising misspelled words or phrases and/or mappings between misspelled words or phrases and their corresponding words and phrases. The dataset may be constructed by way of training or learning system, may be proprietary (e.g., manually collected "in-house" by an administrator of the CTT system 114), may be commercially acquired, or may be derived from a publicly available Internet knowledgebase. The result from the spelling check module 312 may comprise a misspelled word or phrase flagged by the spelling check module 312 to be ignored, a suggested replacement, or a corrected word or phrase inserted into the message by the spelling check module 312 (e.g., in place of the misspelled word or phrase). Depending on the embodiment, the message that results from the spelling check module 312 may be provided to another transformation module (in the transformation module 208) for further processing or the suggested replacement may be provided to the CTT control module 202 to determine if the message transformed by the spelling check module 312 is in the data store 210.

The abbreviation module 314 may be configured to identify one or more abbreviations in a chat message, and may be further configured to suggest replacement words or phrases corresponding to (e.g., represented by) the abbreviations. In some embodiments, the abbreviation module 314 may flag an identified abbreviation to be skipped or otherwise ignored during a subsequent machine translation (e.g., by the translation module 116). Additionally, in some embodiments, an identified abbreviation may be flagged for later review and disposition by a human operator (e.g., an administrator of the CTT system 114). In order to identify an abbreviation and/or its corresponding word or phrase, some embodiments may utilize a dataset (e.g., stored on a data store) comprising abbreviations and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the abbreviation module 314 may comprise an abbreviation flagged by the abbreviation module 314 to be ignored, a suggested replacement, or a word or phrase inserted into the message by the abbreviation module 314 (e.g., in place of the identified abbreviation). Depending on the embodiment, the message that results from the abbreviation module 314 may be provided to another transformation module (in the transformation module 208) for further processing or the suggested replacement may be provided to the CTT control module 202 to determine if the message transformed by the abbreviation module 314 is in the data store 210.

The profanity module 316 may be configured to identify one or more profane words or phrases (hereafter, referred to as a "profanity") in a chat message, and may be further configured to suggest replacement words or phrases (e.g., suitable substitute) corresponding to the profanity (e.g., a toned down euphemism) in some embodiments, the profanity module 316 may flag identified profanity to be skipped or otherwise ignored during a subsequent machine translation (e.g., by the translation module 116). Additionally, in some embodiments, identified profanity may be flagged for later review and disposition by a human operator (e.g., an administrator of the CTT system 114). In order to identify profanity and/or its corresponding word or phrase, some embodiments may utilize a dataset (e.g., stored on a data store) comprising profanity and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the profanity module 316 may comprise profanity flagged by the profanity module 316 to be ignored, a suggested replacement, or a word or phrase inserted into the message by the profanity module 316 (e.g., in place of the identified profanity). Depending on the embodiments, the message that results from the profanity module 316 may be provided to another transformation module (in the transformation module 208) for further processing or the suggested replacement may be provided to the CTT control module 202 to determine if the message transformed by the profanity module 316 is in the data store 210.

For some embodiments, one or more various modules of the transformation module 208 may flag one or more portions of the chat message by inserting a predetermined character before and/or after the portion being flagged. For instance, where the chatspeak module 302 flags the word "LOL" in a portion of the chat message, the chatspeak module 302 may insert an predetermined character ("_") before and/or after the word (e.g., "_LOL_") to indicate that the flagged portion should be ignored by the translation module 116.

For some embodiments, the transformation module 208 may perform two or more transformation operations on the initial message in parallel, and in response, each of the two or more transformation operations may return a separate response, from which the transformation module 208 may then select one transformed message for further processing (e.g., to be used in operation 514). Depending on the embodiment, each response may comprise a flagged text portion, a suggested replacement, or a word or phrase inserted into the initial message. Thereafter, the transformed message selected may be according to a priority of selection, which can determine which transformed message is selected for further processing and according to what precedent. In some embodiments, the priority selection may be according to which transformation operation is more likely to generate a transformed message suitable for a subsequent lookup in the translation data store 210) or for subsequent machine translation. Additionally, in some embodiments, the priority of selection may be according to which transformation operation generates the most formal transformed message. The priority of selection may depend on the transformation/translation strategy selected by the embodiment.

Table 1 following provides examples of how the transformation module 208 may process a portion of a chat message in accordance with various embodiments. As shown, the transformation module 208 may process a chat message based on tokens or proximal tokens, and may cease processing on a particular token once a transformation is performed.

TABLE 1

Examples of chat message processing.

| Token(s) from a Chat Message | Transformation Processing |
|---|---|
| Token = 'USA' | Chatspeak Module ('USA') → Acronym Module ('USA') → Flag for non-translation. |
| Token = 'brb' | Chatspeak Module ('brb') → Acronym Module ('brb') → Proper Noun Module ('brb') → Common Noun Module ('brb') → Colloquialism Module ('brb') → Spelling Check Module ('brb') → Abbreviation Module ('brb') → Transform to 'be right back' |
| Token = '9' | Chatspeak Module ('9') → Transform to 'parents watching over shoulder' |
| Token = '99' | Chatspeak Module ('99') → Transform to 'parents stopped watching over shoulder' |
| Proximal tokens = 'go gabe' | Chatspeak Module ('go gabe') → Acronym Module ('go gabe') → Proper Noun Module ('going') Common Noun Module ('go gabe') → Flag for likely being a common noun. |
| String = 'Your going to attack him?' Token#1 = 'Your' Token#2 = 'going' Token#3 = 'to' Token#4 = 'attack' Token#5 = 'him' | Spelling Check Module ('Your') → Correct with 'You're' based on proximal token 'going' (i.e., using proximal context for spell checking). Chatspeak Module ('going') → Acronym Module ('going') → Proper Noun Module ('going') Common Noun Module ('going') → Colloquialism Module ('going') → Spelling Check Module('going') → Abbreviation Module ('going') → Profanity Module ('going') → No transform. Chatspeak Module ('to') → Acronym Module ('to') → Proper Noun Module ('to') → Common Noun Module ('to') → Colloquialism Module ('to') → Spelling Check Module('to') → Abbreviation Module ('to') → Profanity Module ('to') → No transform. Chatspeak Module ('attack') → Acronym Module ('attack') → Proper Noun Module ('attack') Common Noun Module ('attack') → Colloquialism Module ('attack') → Spelling Check Module('attack') → Abbreviation Module ('attack') → Profanity Module ('attack') → No transform. Chatspeak Module ('him') → Acronym Module ('him') → Proper Noun Module ('him') Common Noun Module ('him') → Colloquialism Module ('him') → Spelling Check Module('him') → Abbreviation Module ('him') → Profanity Module ('him') → No transform. |
| String = 'Sup bro, sup yall?' Token#1 = 'Sup' Token#2 = 'bro' Token#3 = 'sup' Token#4 = 'yall' | Chatspeak Module ('Sup') → Replace with "How is it going." Chatspeak Module ('bro') → Acronym Module ('bro') → Proper Noun Module ('bro') → Common Noun Module ('bro') → Colloquialism Module ('bro') → Spelling Check Module('bro') → Abbreviation Module ('bro') → Replace with "brother" Chatspeak Module ('sup') → Replace with "how is it going." Chatspeak Module ('yall') → Replace with "you all." |

Figure 4:
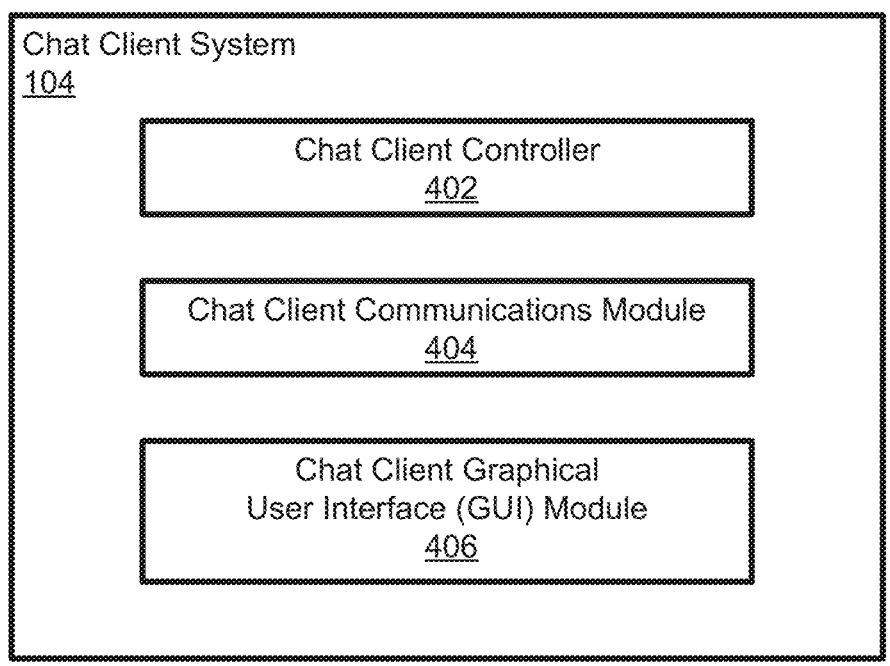
FIG. 4 is a block diagram illustrating an exemplary chat client system, in accordance with various embodiments.

FIG. 4 is a block diagram illustrating an exemplary chat client system 104 in accordance with various embodiments. As shown, the chat client system 104 may comprise a chat client controller 402, a chat client communications module 404, and a chat client graphical user interface (GUI) module 406. The chat client control module 402 may be configured to control and/or orchestrate performance of various operations within the chat client system 104 as the chat client system 104 performs chat related operations (e.g., communications chat dialogue with the chat server 108). For some embodiments, the chat client control module 402 may control the operation of other components of the chat client system 104 including, for example, such as the chat client communications module 404, and the chat client GUI module 406.

The chat client communications module 404 may be configured to facilitate communications between the chat client system 104 and systems and components external to the chat client system 104, such as the chat server 108. Accordingly, through the chat client module 404, the chat client system 104 may receive from the chat server 108 the chat dialogue to be presented at the chat client system 104 (e.g., via the chat client GUI module 406), and may send to the chat server the chat dialogue received from the user at the chat client system 104 (e.g., via the chat client GUI module 406).

The chat client GUI module 406 may be configured to provide a user at the chat client system 104 with graphical input/output access to chat sessions with other chat client systems. Accordingly, for some embodiments the chat client GUI module 406 may present a user at the client 102 with a client GUI adapted for receiving user interactions through the client 102. For some embodiments, the chat client GUI module 406 may be configured to present the user with chat dialogue (e.g., as they are received from the chat server 108) in the language of their choice (e.g., according to the user language preferences/settings). Additionally, the chat client GUI module 406 may be configured to receive chat input from the user in the language of their choice (e.g., according to the user language preferences/settings). As described herein, the language used in presenting and receiving the chat dialogue at the chat client system 104 may be different from the language used in presenting and receiving the chat dialogue at another chat client system. More regarding the chat client GUI module 406 is discussed with respect to FIG. 7.

Figure 5:
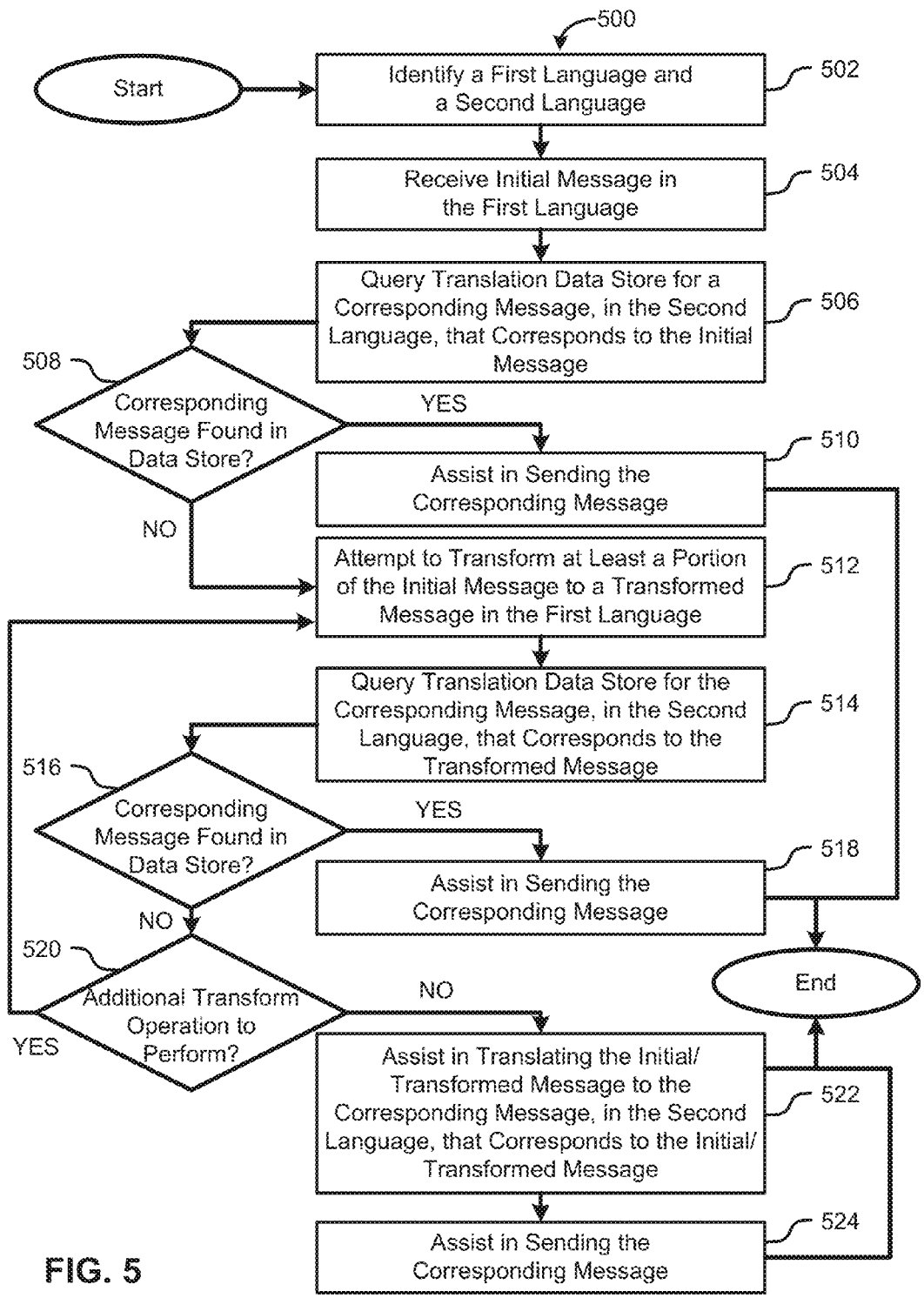
FIG. 5 is a flowchart illustrating an exemplary method of multi-lingual communication, in accordance with various embodiments.

FIG. 5 is a flowchart illustrating an exemplary method 500 for multi-lingual communication in accordance with various embodiments. As described below, for some embodiments, the method illustrated by the method 500 may perform operations in connection with the chat client system 104-1, the chat client system 104-2, the CTT system 114 (e.g., of the chat server 108), and the translation module 116 (e.g., of translation server 110).

The method 500 may start at operation 502, the language module 204 (of the CTT system 114) may being by identifying a first language being used by a user at a first chat client system (e.g., 104-1) and a second language being used by a user at a second chat client system (e.g., 104-2). According to some embodiments, the language module 204 may identify the first language and the second language by obtaining language preferences/settings from the respective chat client system 104.

At operation 504, the CTT communications module 204 (of the CTT system 114) may receive an initial message in the first language. In some embodiments, the CTT communications module 204 may receive the initial message from the chat host system 112, which may have received the initial message from a chat client system (e.g., 104-1).

At operation 506, the CTT control module 202 (of the CTT system 114) may query the translation data store 210 for a corresponding message in the second language that corresponds to the initial message. At operation 508, the CTT control module 202 may determine if a corresponding message is found in the translation data store 201. If one exists, at operation 510, the CTT communications module 204 may assist in sending the corresponding message to the second chat client system (e.g., the chat client system 104-2). In some embodiments, the corresponding message may be sent to the chat host system 112, which may relay the corresponding message to the second chat client system (e.g., 104-2). The method 500 may then end.

If a corresponding message does not exist in the translation data store 210, at operation 512, the transformation module 208 may attempt to transform at least a portion of the initial message to a transformed message in the first language. As described herein, the message that results from the transformation module 208 may be transformed or may remain unchanged (e.g., when transformation operations of the transformation module 208 are not applied to the initial message). For some embodiments, the transformation module 208 may perform two or more transformation operations on the initial message in parallel, and in response, each of the two or more transformation operations may return a separate response, from which the transformation module 208 may then select one transformed message for further processing (e.g., to be used in operation 514). Depending on the embodiment, each response may comprise a flagged text portion, a suggested replacement, or a word or phrase inserted into the initial message. Thereafter, the transformed message selected may be according to a priority of selection, which can determine which transformed message is selected for further processing and according to what precedent. In some embodiments, the priority selection may be according to which transformation operation is most likely to generate a transformed message suitable for a subsequent lookup in the translation data store 210) or for subsequent machine translation. Additionally, in some embodiments, the priority of selection may be according to which transformation operation generates the most formal transformed message. The priority of selection may depend on the transformation/translation strategy selected by the embodiment.

At operation 514, assuming the transformation module 208 transformed the message, the CTT control module 202 (of the CTT system 114) may query the translation data store 210 for a corresponding message in the second language that corresponds to the transformed message. At operation 516, the CTT control module 202 may determine if a corresponding message is found in the translation data store 210. If one exists, at operation 518, the CTT communications module 204 may assist in sending the corresponding message to the second chat client system (e.g., the chat client system 104-2). In some embodiments, the corresponding message may be sent to the chat host system 112, which may then relay the corresponding message to the second chat client system (e.g., 104-2). The method 500 may then end.

For some embodiments, if a corresponding message still does not exist in the translation data store 210, at operation 520, the CTT control module 202 may determine if there are any additional transformation operations of the transformation module 208 to perform on the chat message that have not already been performed.

If an additional transformation operation exists, the method 500 returns to operation 512 and performs additional transformation operation(s). Depending on the embodiment, the additional transformation operation(s) may involve applying a transform operation different from those already performed on the initial message by the transformation module 208, may involve applying the same transformation operations performed but to different portions of the English chat message, or may involve some combination thereof. For example, if during the first execution of operation 512 the transformation module 208 applies a chatspeak-related operation to the initial message (to create a first transformed message), during a second execution of operation 512 the transformation module 208 may apply an abbreviation-related operation to the second transformed message. Following, a subsequent execution of operation 512, the method 500 may continue to operations 514 and 516, where the CTT control module 202 may re-query the translation data store 210 for a corresponding message in the second language that corresponds to the latest resulting transformed message, and the CTT control module 202 may determine if a corresponding message is found in the translation data store 210. By performing the transformation and query operations in the iterative manner, certain embodiments may be able to find a corresponding message before having to perform every transformation operation available. Those skilled in the art will appreciate that for certain embodiments, the transformation and query operations my be performed in series, with the query operation (e.g., operation 514) only being performed after every available transformation operation provided by the transformation module 208 has been performed on the chat message.

If a corresponding message does not exist in the translation data store 210 and an additional transformation operation (of the transformation module 208) does not exist, at operation 522, (through the translation API module 212) the translation module 116 may assist in the translating the initial message or the transformed message to a corresponding message in the second language. Subsequently, at operation 524, the CTT communications module 204 may assist in sending the corresponding message to the second chat client system (e.g., the chat client system 104-2). According to some embodiments, the corresponding message may be sent to the chat host system 112, which may then relay the corresponding message to the second chat client system (e.g., 104-2). The method 500 may then end.

For certain embodiments, the transformation module 208 may be utilized to transform the corresponding message in the second language before the corresponding message is sent to the chat host system 112. As described herein, the corresponding message may be submitted for further transformation processing to further refine the translation for the user at the second chat client system (e.g., 104-2). For example, if the initial message contains chatspeak in the first language (e.g., English), additional transformation processing can add, to the extent possible, chatspeak in the second language.

Though the steps of the above method may be depicted and described in a certain order, those skilled in the art will appreciate that the order in which the steps are performed may vary between embodiments. Additionally, those skilled in the art will appreciate that the components described above with respect to the method 500 are merely examples of components that may be used with the method, and for some embodiments other components may also be utilized in some embodiments.

Figure 6:
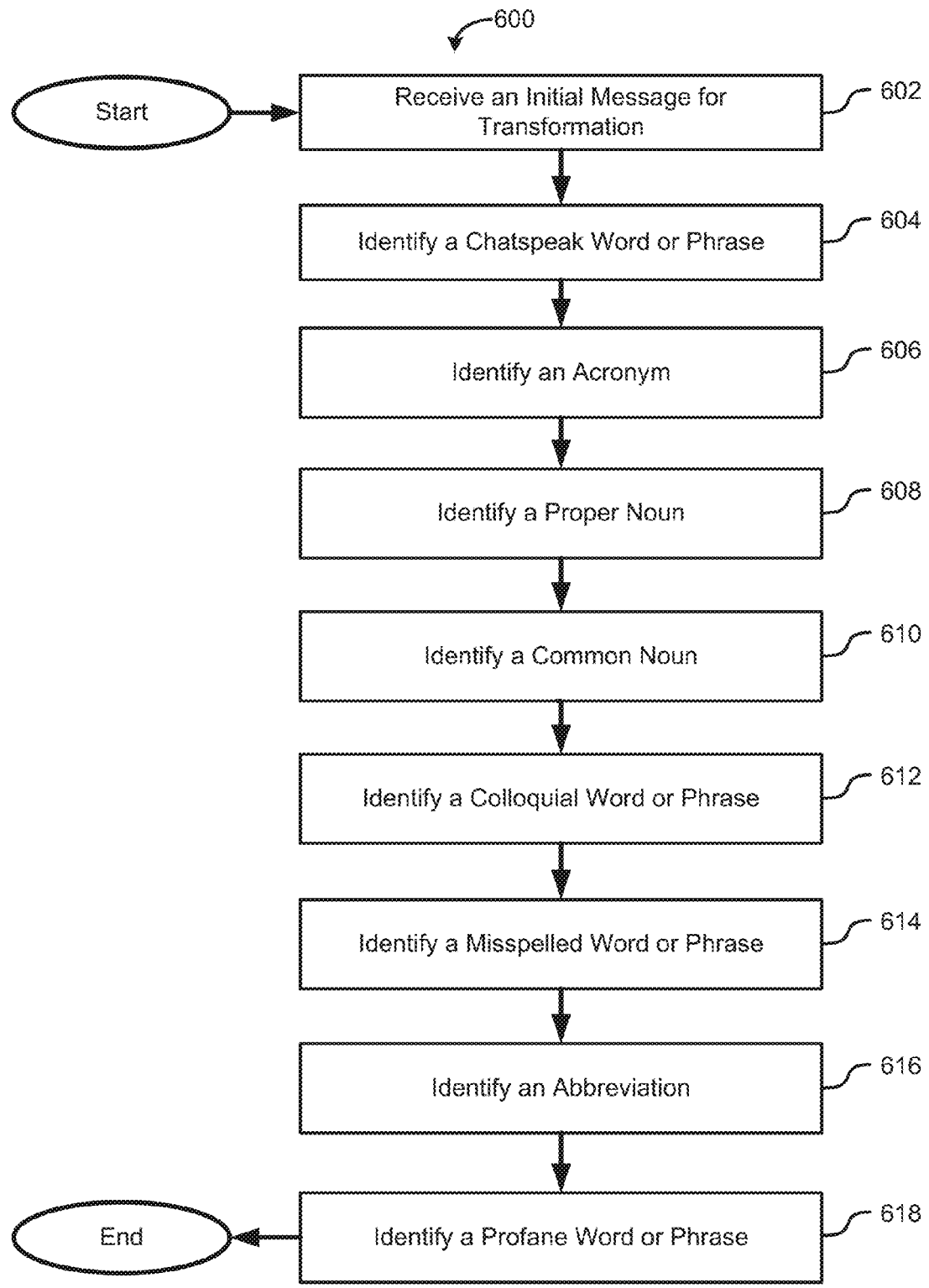
FIG. 6 is a flowchart illustrating an exemplary method of transforming communications, in accordance with various embodiments.

FIG. 6 is a flowchart illustrating an exemplary method 600 for transforming communications in accordance with various embodiments. As described below, for some embodiments, the method 600 may perform operations in connection the transformation module 208 (e.g., of the CTT system 114).

The method may start at operation 602, with an initial message being received by the transformation module 208 for transformation processing. Based on some embodiments, the transformation module 208 may received the initial message for transformation subsequent to a failure to identify a message in the translation data store 210, and possibly before the initial message is machine translated by a third-party or proprietary translation process (e.g., the translation module 116, which may be offered as a cloud-based service). As described herein, the transformation module 208 may be used in various embodiments to facilitate or otherwise improve text translation, particularly where the text comprises a minimal context, brief sentence construction, specialized/domain-related jargon (e.g., chatspeak for Internet-based chat) abbreviations, acronyms, colloquialisms, proper nouns, common nouns, profanity, or some combination thereof. Text translations that may benefit from the operations of the transformation module 208 may include, without limitation, translations of texts originating from conversations (e.g., transcript), from offline or online Internet-based chat (e.g., instant messaging), and from mobile phone messaging (e.g., SMS or MMS).

At operation 604, the chatspeak module 302 may identify one or more words or phrases in the initial message that are associated with chat jargon (i.e., chatspeak), and may further suggest replacement (e.g., corresponding formal/i.e., non-chatspeak) words or phrases for the identified words or phrases. In some embodiments, the chatspeak module 302 may flag an identified chatspeak word or phrase to be skipped or otherwise ignored during a subsequent machine translation (e.g., by the translation module 116). Additionally, in some embodiments, an identified chatspeak word or phrase may be flagged for later review and disposition by a human operator (e.g., an administrator of the CTT system 114). In order to identify a chatspeak word or phrase and/or its corresponding (formal) word or phrase, some embodiments may utilize a dataset (e.g., stored on a data store) comprising chatspeak words or phrase and/or mappings between chatspeak words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgeable. The message resulting from operation 604 (hereinafter, "the first intermediate message") may comprise a chatspeak word or phrase flagged by the chatspeak module 302 to be ignored, a suggested replacement, or a non-chatspeak word or phrase inserted into the initial message by the chatspeak module 302 (e.g., in place of the identified chatspeak word or phrase). In some instances, the first immediate message may be the same as the initial message (e.g., when no replacement is performed by the chatspeak module 302). Depending on the embodiment, the first intermediate message that results from the chatspeak module 302 may be provided to another transformation module (in the transformation module 208) for further processing or the suggested replacement may be provided to the CTT control module 202 to determine if the message transformed by the chatspeak module 302 is in the data store 210. Following operation 604, the first intermediate message may be provided to the next operation (e.g., operation 606) of the transformation module 208 for processing.

At operation 606, the acronym module 304 may identify one or more acronyms in a chat message, and may further suggest replacement words or phrases corresponding to (e.g., represented by) the acronyms. In some embodiments, the acronym module 304 may flag an identified acronym to be skipped or otherwise ignored during a subsequent machine translation (e.g., by the translation module 116). Additionally, in some embodiments, an identified acronym may be flagged for later review and disposition by a human operation (e.g., an administrator of the CTT system 114). In order to identify an acronym and/or its corresponding word or phrase, some embodiments may utilize a dataset (e.g., stored on a data store) comprising acronyms and/or mappings between acronyms and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 606, (hereafter, "the second intermediate message") may comprise an acronym flagged by the acronym module 304 to be ignored, a suggested replacement, or a word or phrase inserted into the message by the acronym module 304 (e.g., in place of the identified acronym). In some instances, the second intermediate message may be the same as the first intermediate message (e.g., when no replacement is performed by the acronym module 304). Depending on the embodiment, the second intermediate message that results from the acronym module 304 may be provided to another transformation module (in the transformation module 208) for further processing or the suggested replacement may be provided to the CTT control module 202 to determine if the message transformed by the acronym module 304 is in the data store 210. Following operation 606, the second intermediate message may be provided to the next operation (e.g., operation 608) of the transformation module 208 for processing.

At operation 608, the proper noun module 306 may identify one or more proper nouns in a chat message, and may further suggest replacement words or phrases corresponding to (e.g., represented by) the proper nouns. In some embodiments, the proper noun module 306 may flag an identified proper noun to be skipped or otherwise ignored during a subsequent machine translation (e.g., by the translation module 116). Additionally, in some embodiments, an identified proper noun may be flagged for later review and disposition by a human operator (e.g., an administrator of the CTT system 114). In order to identify a proper noun and/or its corresponding word or phrase, some embodiments may utilize a dataset (e.g., stored on a data store) comprising proper nouns (e.g., well-known proper nouns such as Disneyland®, or common names for individuals) and/or mappings between proper nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 608 (hereafter, "the third intermediate message") may comprise a proper noun flagged by the proper noun module 306 to be ignored, a suggested replacement, or a word or phrase inserted into the message by the proper noun module 306 (e.g., in place of the identified proper noun). In some instances, the third intermediate message may be the same as the second intermediate message (e.g., when no replacement is performed by the proper noun module 306). Depending on the embodiment, the third intermediate message that results from the proper noun module 306 may be provided to another transformation module (in the transformation module 208) for further processing or the suggested replacement may be provided to the CTT control module 202 to determine if the message transformed by the proper noun module 306 is in the data store 210. Following operation 608, the third intermediate message may be provided to the next operation (e.g., operation 610) of the transformation module 208 for processing.

At operation 610, the common noun module 308 may identify one or more common nouns in a chat message, and may further suggest replacement words or phrases corresponding to (e.g., represented by) the common nouns. In some embodiments, the common noun module 308 may flag an identified common noun to be skipped or otherwise ignored during a subsequent machine translation (e.g., by the translation module 116). Additionally, in some embodiments, an identified common noun may be flagged for later review and disposition by a human operator (e.g., an administrator of the CTT system 114). In order to identify a common noun and/or its corresponding word or phrase, some embodiments may utilize a dataset (e.g., stored on a data store) comprising common nouns and/or mappings between common nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 610 (hereafter, "the fourth intermediate message") may comprise a common noun flagged by the common noun module 308 to be ignored, a suggested replacement, or a word or phrase inserted into the message by the common noun module 308 (e.g., in place of the identified common noun). In some instances, the fourth intermediate message may be the same as the third intermediate message (e.g., when no replacement is performed by the common noun module 308). Depending on the embodiment, the fourth intermediate message that results from the common noun module 308 may be provided to another transformation module (in the transformation module 208) for further processing or the suggested replacement may be provided to the CTT control module 202 to determine if the message transformed by the common noun module 308 is in the data store 210. Following operation 610, the fourth intermediate message may be provided to the next operation (e.g., operation 612) of the transformation module 208 for processing.

At operation 612, the colloquialism module 310 may identify one or more colloquial words or phrases in a chat message, and may further suggest replacement (e.g., corresponding formal/i.e., non-colloquial) words or phrases for the identified words or phrases. In some embodiments, the colloquialism module 310 may flag an identified colloquial word or phrase to be skipped or otherwise ignored during a subsequent machine translation (e.g., by the translation module 116). Additionally, in some embodiments, an identified colloquial word or phrase may be flagged for later review and disposition by a human operator (e.g., an administrator of the CTT system 114). In order to identify a colloquial word or phrase and/or its corresponding (formal) word or phrase, some embodiments may utilize a dataset (e.g., stored on a data store) comprising colloquial words or phrases and/or mappings between colloquial words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 612 thereafter, "the fifth intermediate message") may comprise a colloquial word or phrase flagged by the colloquialism module 310 to be ignored, a suggested replacement, or a non-colloquial word or phrase inserted into the message by the colloquialism module 310 (e.g., in place of the identified colloquial word or phrase). In some instances, the fifth intermediate message may be the same as the fourth intermediate message (e.g., when no replacement is performed by the colloquialism noun module 310). Depending on the embodiment, the fifth intermediate message that results from the colloquialism module 310 may be provided to another transformation module (in the transformation module 208) for further processing or the suggested replacement may be provided to the CTT control module 202 to determine if the message transformed by the colloquialism module 310 is in the data store 210. Following operation 612, the fifth intermediate message may be provided to the next operation (e.g., operation 614) of the transformation module 208 for processing.

At operation 614, the spelling check module 312 may identify one or more misspelled words or phrases in a chat message, and may further suggest replacement (e.g., corrected) words or phrases for the identified words or phrases. For example, the spelling check module 312 may automatically correct the words or phrases with the suggested replacement words or phrases. In some embodiments, the spelling check module 312 may flag an identified misspelled word or phrase to be skipped or otherwise ignored during a subsequent machine translation (e.g., by the translation module 116). Additionally, in some embodiments, an identified misspelled word or phrase may be flagged for later review and disposition by a human operator (e.g., an administrator of the CTT system 114). In order to identify a misspelled word or phrase and/or its corresponding (corrected) word or phrase, some embodiments may utilize a dataset (e.g., stored on a data store) comprising misspelled words of phrases and/or mappings between misspelled words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgeable. The message resulting from operation 614 (hereafter, "the sixth intermediate message") may comprise a misspelled word or phrase flagged by the spelling check module 312 to be ignored, a suggested replacement, or a corrected word or phrase inserted into the message by the spelling check module 312 (e.g., in place of the misspelled word or phrase). In some instances, the sixth intermediate message may be the same as the fifth intermediate message (e.g., when no replacement is performed by the spelling check module 312). Depending on the embodiment, the sixth intermediate message that results from the spelling check module 312 may be provided to another transformation module (in the transformation module 208) for further processing or the suggested replacement may be provided to the CTT control module 202 to determine if the message transformed by the spelling check module 312 is in the data source 210. Following operation 614, the sixth intermediate message may be provided to the next operation (e.g., operation 616) of the transformation module 208 for processing.

At operation 616, the abbreviation module 314 may identify one or more abbreviations in a chat message, and may further suggest replacement words or phrases corresponding to (e.g., represent by) the abbreviations. In some embodiments, the abbreviation module 314 may flag an identified abbreviations to be skipped or otherwise ignored during a subsequent machine translation (e.g., by the translation module 116). Additionally, in some embodiments, an identified abbreviation may be flagged for later review and disposition by a human operator (e.g., an administrator of the CTT system 114). In order to identify an abbreviation and/or its corresponding word or phrase, some embodiments may utilize a dataset (e.g., stored on a data store) comprising abbreviations and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 616 (hereafter, "the seventh intermediate message") may comprise an abbreviation flagged by the abbreviation module 314 to be ignored, a suggested replacement, or a word or phrase inserted into the message by the abbreviation module 314 (e.g., in place of the identified abbreviation). In some instances, the seventh intermediate message may be the same as the sixth intermediate message (e.g., when no replacement if performed by the abbreviation module 314). Depending on the embodiment, the seventh intermediate message that result from the abbreviation module 314 may be provided to another transformation module (in the transformation module 208) for further processing or the suggested replacement may be provided to the CTT control module 202 to determine if the message transformed by the abbreviation module 314 is in the data store 210. Following operation 616, the seventh intermediate message may be provided to the next operation (e.g., operation 618) or the transformation module 208 for processing.

At operation 618, the profanity module 316 may identify one or more profane words or phrases (hereafter, referred to as a "profanity") in a chat message, and may further suggest replacement words or phrases (e.g., suitable substitute) corresponding to the profanity (e.g., a toned down euphemism). In some embodiments, the profanity module 316 may flag identified profanity to be skipped or otherwise ignored during a subsequent machine translation (e.g., by the translation module 116). Additionally, in some embodiments, identified profanity may be flagged for later review and disposition by a human operator (e.g., an administrator of the CTT system 114). In order to identify profanity and/or its corresponding word or phrase, some embodiments may utilize a dataset (e.g., stored on a data store) comprising profanity and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 618 (hereafter, "the eighth intermediate message") may comprise profanity flagged by the profanity module 316 to be ignored, a suggested replacement, or a word or phrase inserted into the message by the profanity module 316 (e.g., in place of the identified profanity). In some instances, the eighth intermediate message may be the same as the seventh intermediate message (e.g., when no replacement if performed by the profanity module 316). Depending on the embodiment, the eighth intermediate message that results from the profanity module 316 may be provided to another transformation module (in the transformation module 208) for further processing or the suggested replacement may be provided to the CTT control module 202 to determine if the message transformed by the profanity module 316 is in the data store 210. Following operation 618, the eighth intermediate message may be provided to the next operation of the transformation module 208 for processing. The method 600 may then end.

In accordance with some embodiments, the message that ultimately results from the transformation module 208 (e.g., the eighth intermediate message resulting from operation 618) may subsequently be used to query the translation data store 210 for a corresponding message, which can serve as a translation for the resulting message. Those skilled in the art will appreciate that in some instances, the message resulting from the transformation module 208 (e.g., message subsequently used in the query to the translation data store 210) may be the same as the initial message received (e.g., at operation 602) when no transformation has been applied to the initial message (e.g., the initial message passes through operations 604-618 without any transformation being applied).

Those skilled in the art will also appreciate that various embodiments may perform more or less operations than the ones shown, may perform operations different from those shown, and may perform operations in a different order. Generally, the types of transformation operations performed, and the order in which they are performed, may be depend on transformation strategy employed by the embodiments. As noted herein, various embodiments may implement different transformation/translation strategies in achieving their respective translations, with certain strategies being well suited for particular translation applications or translation contexts. The transformation/translation strategy employed may determine which transformation operations are performed, when the transformation operations are performed, or in what order the transformation operations are performed. The transformation/translation strategy may also determine what translations are populated into a translation data stores, and when a translation data store is utilized in the overall transformation/translation process.

For some embodiments, the intermediate messages resulting from operations in the method 600 may have an impact and/or cascading effect on messages that result from subsequent operations in the method 600. Additionally, for some embodiments, when a chat message is processed by the method 600, each operations of flow chart 600 may be performed on the chat message before the method concludes. Alternatively, for some embodiments, the method of flowchart 600 may terminate early upon the performance of only a subset of the operations shown (e.g., after at least one operation results in a transformation of the chat message). According to some embodiments, the performance of each operation in flowchart 500 may be followed by a query to the translation data store 210 for a corresponding message in the desired language based on the latest resulting transformed message; in the even a corresponding message is identified, the method of flowchart 500 may terminate early.

For various embodiments, the method 600 may perform operations 604-612 in parallel. For example, the CTT control module 202 may submit the initial message to two or more operations 604-612 in parallel, and receive from each of those two or more operations a separate response. Each response may comprise a flagged text portion, a suggested replacement, or a word or phrase inserted into the initial message. Thereafter, the CTT control module 202 may select one of the received responses for subsequent processing (e.g., query a translation data store 210 or translating by the translation module 116), possibly according to a priority of selection (e.g., which can determine which transformed message is selected for further processing and according to what precedent).

For instance, during the method 600, the CTT control module 202 may submit an initial message to operation 604 for identifying chatspeak processing, operation 610 for common noun processing, and operations 616 for abbreviation processing. In response, operation 604 may return the initial message transformed for chatspeak, operation 610 may return the initial message unchanged, and operation 616 may return the initial message transformed for abbreviations. Subsequently, based on a priority of selections, the CTT control module 202 may select the transformed message returned from operation 616 for further processing.

For certain embodiments, a time limit may be enforced on performing various operations in the method 600. The time limit may because a transformation operation of method 600 to stop performing if a response/result is not received before the time limit has expired. In doing so, various embodiments may ensure that certain transformation operations do not unnecessarily hinder the overall transformation/translation process.

Though the operations of the above method may be depicted and described in a certain order, those skilled in the art will appreciate that the order in which the operations are performed may vary between embodiments. Additionally, those skilled in the art will appreciate that the components described above with respect to the method of the flowchart 600 are merely examples of components that may be used with the method, and for some embodiments other components may also be utilized in some embodiments.

Figure 7:
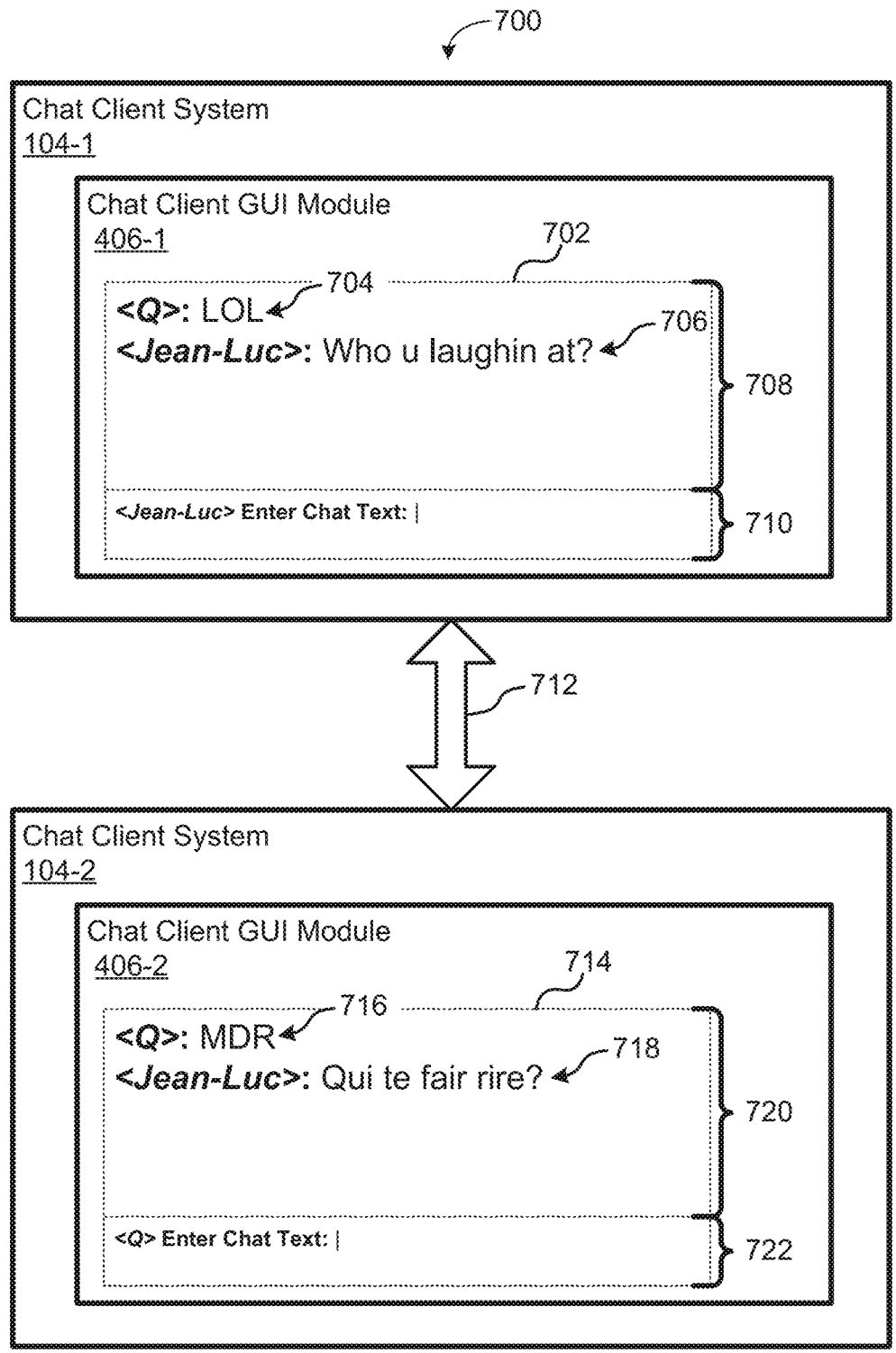
FIG. 7 is a diagram illustrating an exemplary multi-lingual chat session between chat client systems, in accordance with various embodiments.

FIG. 7 is a diagram 700 illustrating an exemplary multi-lingual chat session, between chat client systems 104 (e.g., 104-1 and 104-2), in accordance with various embodiments. As shown, the chat client system 104-1 may comprise a chat client GUI module 406-1, and the chat client system 104-2 may comprise a chat client GUI module 406-2. As described herein, each of the chat client GUI modules 406-1 and 406-2 may be configured to respectively provide users at chat client systems 104-1 and 104-2 with graphical input/output access to chat session shared between them. For some embodiments the chat client GUI modules 406-1 and 406-2 may present their respective user with a client GUI adapted for receiving user interactions with respect to the chat dialogue sent and received.

As chat dialogue 712 (represented by two-way arrow in FIG. 7) is passed between the chat client systems 104-1 and 104-2, the chat client GUI modules 406-1 and 406-2 may present the chat dialogue 712 in the language (implicitly or explicitly) chosen by the user at their respective chat client system 104-1 or 104-2. As shown, the chat client GUI module 406-1 may comprise a chat dialogue box 702 configured to present the chat dialogue 712 in a first language (e.g., English) in an output area 708 and to receive chat input in the first language in a second area 710. The chat client GUI module 406-2 may comprise a chat dialogue box 714 configured to present the chat dialogue 712 in a second language (e.g., French) in an output area 720 and to receive chat input in the second language in a second are 722. For some embodiments, when the chat dialogue 712 is presented in the dialogue boxes 702 and 714, it may include the presentation of usernames (e.g., user online identifier) associated with the users entering the chat messages in the chat dialogue 712.

In the illustrated embodiment of FIG. 7, the language chosen for the chat client system 104-1 is English and the language chosen for the chat client system 104-2 is French. Accordingly, chat messages 704 ("LOL") and 706 ("Who u laughin at?") are presented in English in the dialogue box 702 of the chat client GUI module 406-1, while their respective counterpart chat messages 716 ("MDR") and 718 ("Qui te fair rire?") are presented in French in the dialogue box 714 of the chat client GUI module 406-2. The translation of the chat messages 704, 706, and 718 may be facilitated through various systems and methods described herein. More regarding the translation of message similar to chat message 704, 706, 716, and 718 are discussed with respect to FIGS. 8-10.

Figure 8:
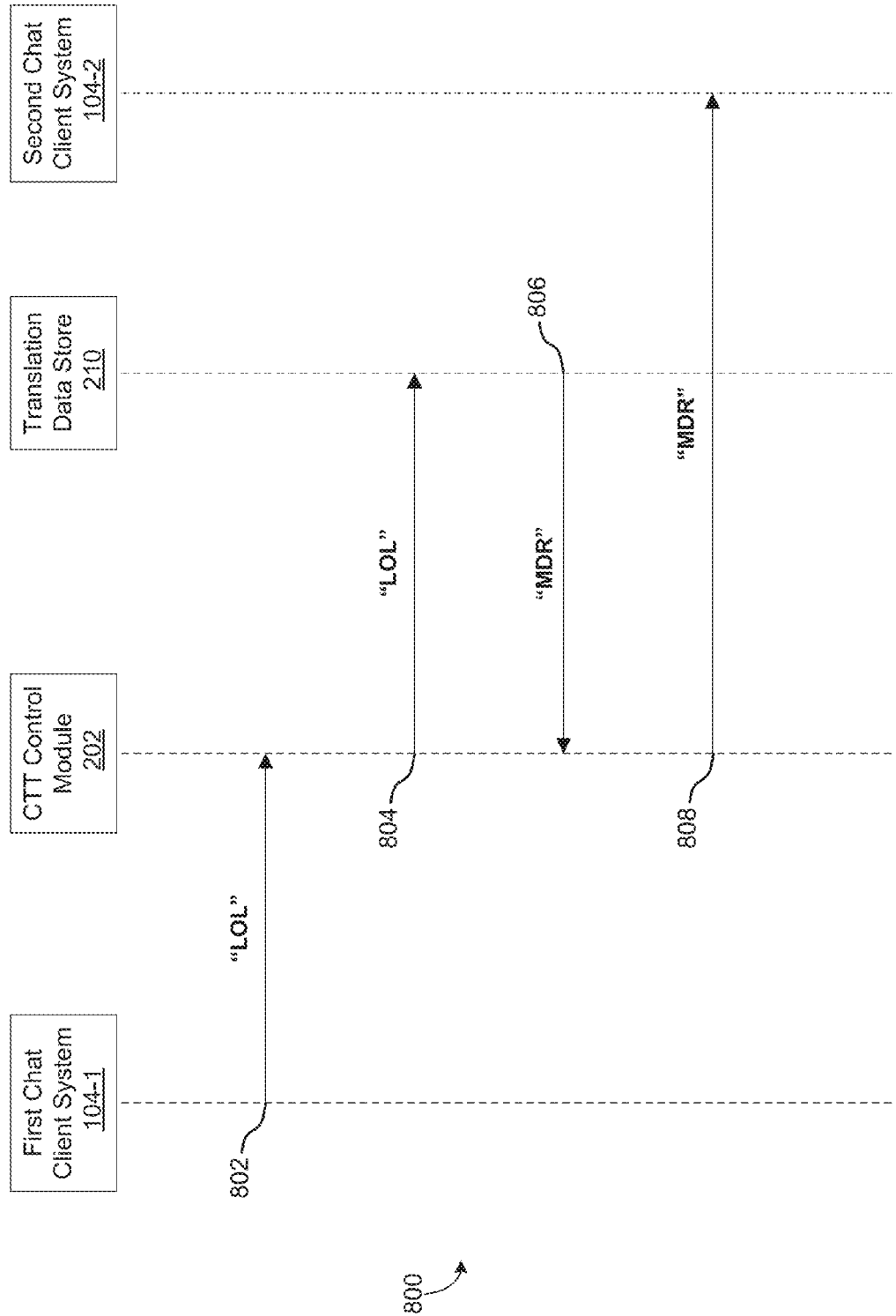
FIG. 8 is a flowchart illustrating operation of an exemplary multi-lingual communication method, in accordance with various embodiments.

FIG. 8 is a flowchart illustrating operation of an exemplary multi-lingual communication method 800 in accordance with various embodiments. As described below, for some embodiments, the method 800 may perform operations in connection with the chat client system 104-1, the chat client system 104-2, and the CTT system 114 (e.g., of the chart server 108). In particular, FIG. 8 illustrates the translation of an English chat message comprising the text "LOL" to a French chat message in accordance with some embodiments. Such a situation may arise when the language being used by the user at the first chat client system 104-1 is English and the language being used by the user at the second chat client system 104-2 is French. According to some embodiments, and the CTT system 114 may automatically detect these language choices/preferences for the chat client systems 104-1 and 104-2.

As shown, at operations 802, the first chat client system 104-1 may submit the English message for transmission to the second chat client system 104-2 (e.g., via the chat host system 112). The English message may be muted to the CTT control module 202 of the CTT system 114 for translation processing.

At operation 804, the CTT control module 202 may query the translation data store 210 for a chat message that corresponds to the English chat message ("LOL") and that is pre-translated to French. In response, at operation 806, the translation data store 210 may return to the CTT control module 202 a corresponding French message ("MDR") that corresponds to the English chat message ("LOL"). Subsequently, at operation 808, the CTT control module 202 may assist in the transmission of the corresponding French chat message ("MDR") to the second that client system 104-2 (e.g., CTT system 114 submits the corresponding French chat message to the chat host system 112 for transmission).

Figure 9:
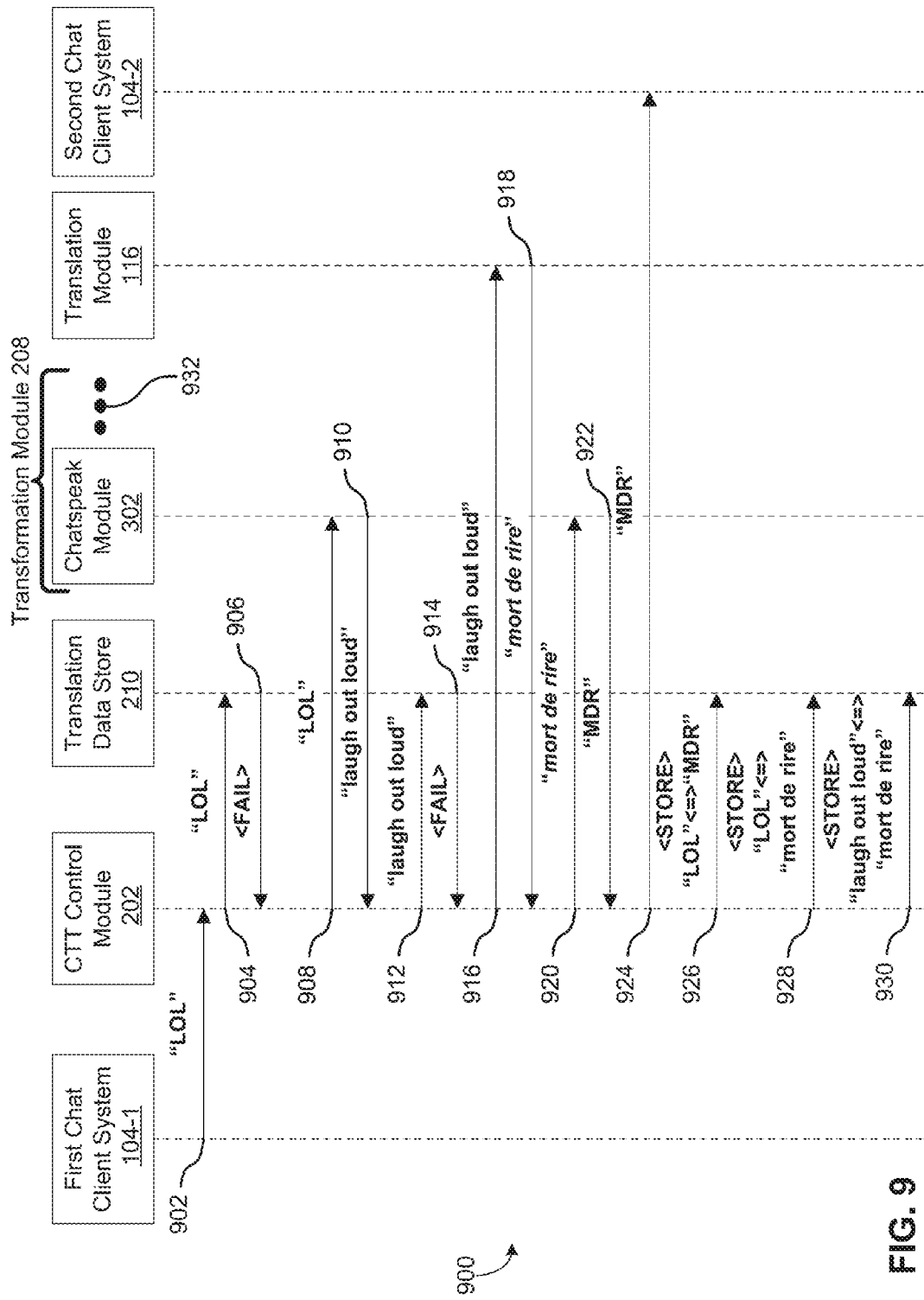
FIG. 9 is a flowchart illustrating operation of an exemplary multi-lingual communication method, in accordance with various embodiments.

FIG. 9 is a flowchart illustrating operation of an exemplary multi-lingual communication method 900 in accordance with various embodiments. As described below, for some embodiments, the method illustrated by the flowchart 900 may perform operations in connection with the chat client system 104-1, the chat client system 104-2, the CTT system 114 (e.g., of the chart server 108), and the translation module 116 (e.g., of translation server 100). In particular, FIG. 9 illustrates the translation of an English chat message comprising the text "LOL" to a French equivalent chat message, in accordance with some embodiments. Unlike the illustrated embodiment of FIG. 8, FIG. 9 illustrates the usage of the transformation module 208 (e.g., of the CTT system 114) and the translation module 116.

As shown, at operation 902, the first chat client system 104-1 may submit the English chat message for transmission to the second chat client system 140-2 (e.g., via the chat host system 112) with a user that speaks French. The English chat message may be routed to the CTT control module 202 of the CTT system 114 for translation processing.

At operation 904, the CTT control module 202 may query the translation data store 210 for a French equivalent chat message that corresponds to the English chat message ("LOL"). In response, at operation 906, the translation data store 210 does not have a corresponding French chat message for the English chat message ("LOL"). If such is the case, at operation 908, the CTT control module 202 may submit the English chat message to the transformation module 208 for transformation processing in accordance with certain embodiments. As described herein, the transformation module 208 may comprise multiple transformation-related modules 932 configured to transform a chat message to a message more suitable for further translation processing.

At operation 910, the chatspeak module 302 of the transformation module 208 may transform the English chat message ("LOL") to the transformed English chat message ("laugh out loud"), and may return the transformed English chat message to the CTT control module 202 for further processing. Those skilled in the art will appreciate that, for some embodiments, the English chat message may be processed by additional modules of the transformation module 208 before the transformed English chat message is returned to the CTT control module 202.

At operation 912, the CTT control module 202 may query the translation data store 210 for a French equivalent chat message that corresponds to the transformed English chat message ("laugh out loud"). In response, at operation 914, the translation data store 210 may return a query failure to the CTT control module 202 to indicate that the translation data store 210 does not have a corresponding French chat message for the transformed English chat message ("laugh out loud"). If such is the case, at operation 916, the CTT control module 202 may submit the transformed English chat message to the translation module 116 for machine translation processing in accordance with certain embodiments.

At operation 918, the translation module 116 may return a machine-translated French chat message ("mort de rire") that corresponds to the transformed English chat message. The resulting machine-translated French chat message ("mort de rire") is an example of a transformed translation of an English chatspeak chat message ("LOL").

At operation 920, the CTT control module 202 may submit the machine-translated French chat message ("mort de rire") to the transformation module 208 for further transformation processing of the machine-translated French chat message in accordance with certain embodiments. As noted herein, the machine-translated text may be submitted for further transformation processing to further refine the French translation. For example, if the original English chat message contained English chatspeak, the additional transformation processing can add, to the extent possible, French chatspeak. Accordingly, at operation 922, the chatspeak module 302 of the transformation module 208 may transform the machine-translated French chat message ("mort de rire") to the transformed French chat message ("MDR"), and may return the transformed French chat message to the CTT module 202 for further processing.

Eventually, at operation 924, the CTT control module 202 may assist in the transmission of the corresponding French chat message ("MDR") to the second chat client system 104-2 (e.g., CTT system 114 submits the corresponding French chat message to the chat host system 112 for transmission). Additionally, at operation 926, the CTT control module 202 may store a translation mapping in the translation data store 210 of the transformed translation between the original English chat message ("LOL") and the translated French chat message ("MDR"). Once the mapping is stored in the translation data store 210, it may be used to store translation entries to speed up future translations, e.g., as illustrated in FIG. 8. As noted herein, the translation data store 210 may store mappings of transformed translations and untransformed translations.

For some embodiments, the CTT control module 202 may also store equivalent (transformed and untransformed) translation mappings determined during the operation of the method 900. For certain embodiments, the translation mappings may be between chat message that were not original located in the translation data store 210 (e.g., the chat message shown for operation 904, and the chat message shown for operation 912) and a corresponding message determined during operations subsequent to the translation data store 210 lookups (e.g., a mapping between a query to the translation data store 210 that returns no result and a corresponding chat message determined after the query, by way of the transformation module 208 and/or the translation module 116).

For instance, as shown in FIG. 9, the CTT control module 202 queries the translation data store 210 for original English chat message ("LOL" at operation 904 and the transformed English chat message ("laugh out loud") at operation 912, both of which resulted in the CTT control module 202 receiving no results from the translation data store 210 (at operation 906 and 914, respectively). However, at operation 916, the CTT control module 202 eventually submits the transformed English message ("laugh out loud") to the machine translation module 116 for machine translation and receives, in response the machine-translated French chat message ("mort de rire") at operation 918. Accordingly, at operation 928, the CTT control module 202 may store a translation mapping in the translation data store 210 of the transformed translation between the original English chat message ("LOL") and the machine-translated French chat message ("mort de rire"). Likewise, at operation 930, the CTT control module 202 may store a translation mapping in the translation data store 210 of the transformed translation between the transformed English chat message ("laugh out loud") and the machine-translated French chat message ("mort de rire"). In doing so, next time method 900 queries the translation data store 210 for the original English chat message ("LOL") or the transformed English chat message ("laugh out loud"), the translation data store 210 will provide the corresponding transformed translations.

Figure 10:
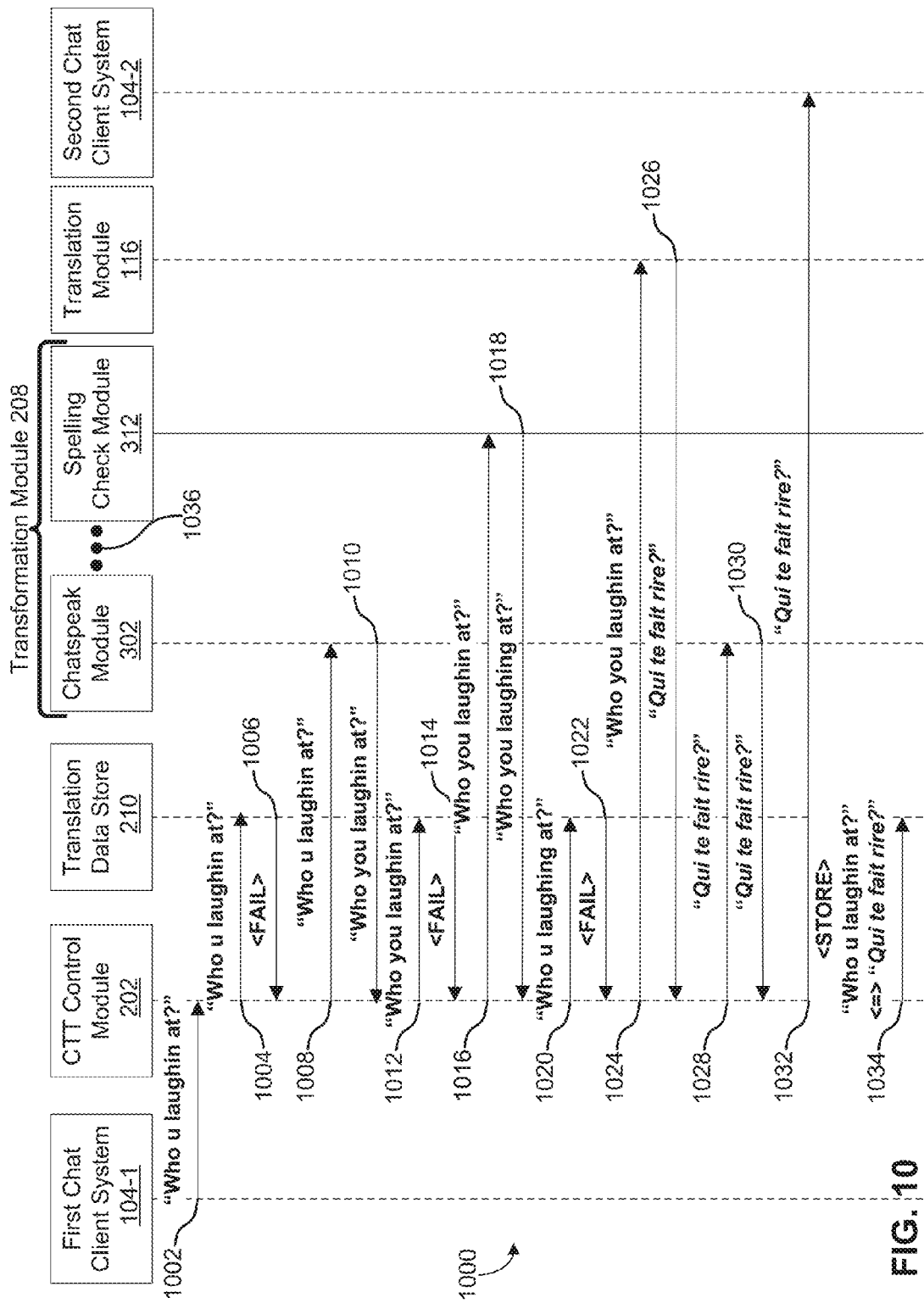
FIG. 10 is a flowchart illustrating operation of an exemplary multi-lingual communication method, in accordance with various embodiments.

FIG. 10 is a flowchart illustrating operation of an exemplary multi-lingual communication method 1600 in accordance with various embodiments. As described below, for some embodiments, the method 1000 may perform operation sin connection with the chat client system 104-1, the chat client system 104-2, the CTT system 114 (e.g., of the chart server 108), and the translation module 116 (e.g., of the translation server 110). In particular, FIG. 10 illustrates the translation of an English chat message comprising the text "Who u laughin at?" to a French chat message, in accordance with some embodiments.

As shown, at operation 1002, the first chat client system 104-1 may submit the English chat message for transmission to the second chat client system 104-2 (e.g., via the chat host system 112). The English chat message may be routed to the CTT control module 202 of the CTT system 114 for translation processing.

At operation 1004, the CTT control module 202 may query the translation data store 210 for a French equivalent chat message that corresponds to the English chat message ("Who u laughin at?"). In response, at operation 1006, the translation data 210 may return a query failure to the CTT control module 202 to indicate that the translation data store 210 does not have a corresponding French chat message for the English chat message ("Who u laughin at?"). If such is the case, at operation 1008, the CTT control module 202 may submit the English chat message to the transformation module 208 for transformation processing in accordance with certain embodiments. As described herein, the transformation module 208 may comprise multiple transformation-related modules 1036 configured to transform a chat message to a message more suitable for further translation processing.

At operation 1010, the chatspeak module 302 of the transformation module 208 may transform the English chat message ("Who u laughin at?") to the transformed English chat message ("Who you laughin at?"), and pass on the transformed English chat message to additional modules of the transformation module 208 for further processing, such as the spelling check module 312.

As discussed herein, various modules of transformation module 208, including the chatspeak module 302, may be configured to identify one or more words or phrases in a chat message and suggest replacement words or phrases for the identified words or phrases. Accordingly, those skilled in the art would appreciate that for some embodiments, the transformation performed/suggested by a module of transformation module 208 may involve a word-to-phrase or a phrase-to-phrase transformation of the chat message. For example, at operation 1010, the chatspeak module 302 may alternatively transform the English chat message ("Who u laughin at?") to the transformed English chat message ("Who are you laughing at?"), possibly by replacing/suggesting the replacement of the phrase "who u" with "who are you" during the transformation (followed by the replacement/suggestion of the replacing the word "laughin" with "laughing"). In doing so, various modules of the transformation module 208, such as the chatspeak module 302, may provide grammatical improvements to their respective transformations, while possibly obviating the need for a separate module in the transformation module 208 to implement grammar improvements.

For some embodiments, before the transformed English chat message is passed on to additional modules of the transformation module 208, the chatspeak module 302 may pass on the transformed English chat message to the CTT control module 202 at operation 1010. In turn, the CTT control module 202 may query the translation data store 210 (at operation 1012) for a French equivalent chat message that corresponds to the transformed English chat message ("Who you laughin at?"). In response, at operation 1014, the translation data store 210 may return a query failure to the CTT control module 202 to indicate that the translation data store 210 does not have a corresponding French chat message for the transformed English chat message ("Who you laughin at?").

At operation 1016, the spelling check module 312 may perform a spell check process on the transformed English chat message ("Who you laughin at?") at operation 1018. During the spell check process, the spelling check module 312 may correct the transformed English chat message to a corrected English chat message ("Who you laughing at?") and may return the corrected English chat message to the CTT control module 202. Those skilled in the art will appreciate that for some embodiments, the corrected English chat message may processed by additional modules of the transformation module 208 before the transformed English chat message is returned to the CTT control module 202.

At operation 1020, the CTT control module 202 may query the translation data store 210 for French equivalent chat message that corresponds to the corrected English chat message ("Who you laughing at?"). In response, at operation 1022, the translation data store 210 may return a query failure to the CTT control module 202 to indicate that the translation data store 210 does not have a corresponding French chat message for the corrected English chat message ("Who you laughing at?"). If such is the case, at operation 1024, the CTT control module 202 may submit the corrected English chat message to the translation module 116 for machine translation processing in accordance with certain embodiments.

At operation 1026, the translation module 116 may return a machine-translated French chat message ("Qui te fait rire?") that corresponds to the corrected English chat message. At operation 1028, the CTT control module 202 may submit the machine-translated French chat message ("Qui te fait rire?") to the transformation module 208 for further transformation processing of the machine-translated French chat message in accordance with certain embodiments.

As noted herein, the machine-translated text may be submitted for further transformation processing to further refine the translation of the text. For example, if the original English chat message contained English chatspeak, the additional transformation processing can add, to the extent possible, French chatspeak. At operation 1030, the transformation module 208 may return the machine-translated French chat message ("Qui te fait rire?") unchanged to the CTT control module 202 for further processing (e.g., when the modules of the transformation module 208 do not apply any changes to the machine-translated French chat message).

At operation 1032, the CTT control module 202 may assist in the transmission of the machine-translated French chat message ("Qui te fait rire?") to the second chat client system 104-2 (e.g., CTT system 114 submits the corresponding French chat message to the chat host system 112 for transmission). Additionally, at operation 1034, the CTT control module 202 may store a translation mapping in the translation data store 210 between the original English chat message ("Who u laughin at?") and the translated French chat message ("Qui te fait rire?"). As described herein, in additional operations (not shown), the CTT control module 202 may also store equivalent translation mappings in the translation data store 210 based on previously failed queries to the translation data store 210 and corresponding messages determined subsequent to those queries (e.g., similar to operations 928 and 930 in FIG. 9).

According to some embodiments, the transformation operations performed by the transformation module 208 may comprise performing certain transformation operation in parallel, and perform certain transformation operations in serial. The order in which transformation operations are performed in parallel and in serial may vary between various embodiments. As described herein, where the transformation operations are performed in parallel, some embodiments may employ a priority of selection to determine which transformed message is selected for further processing and according to what precedent.

Figure 11:
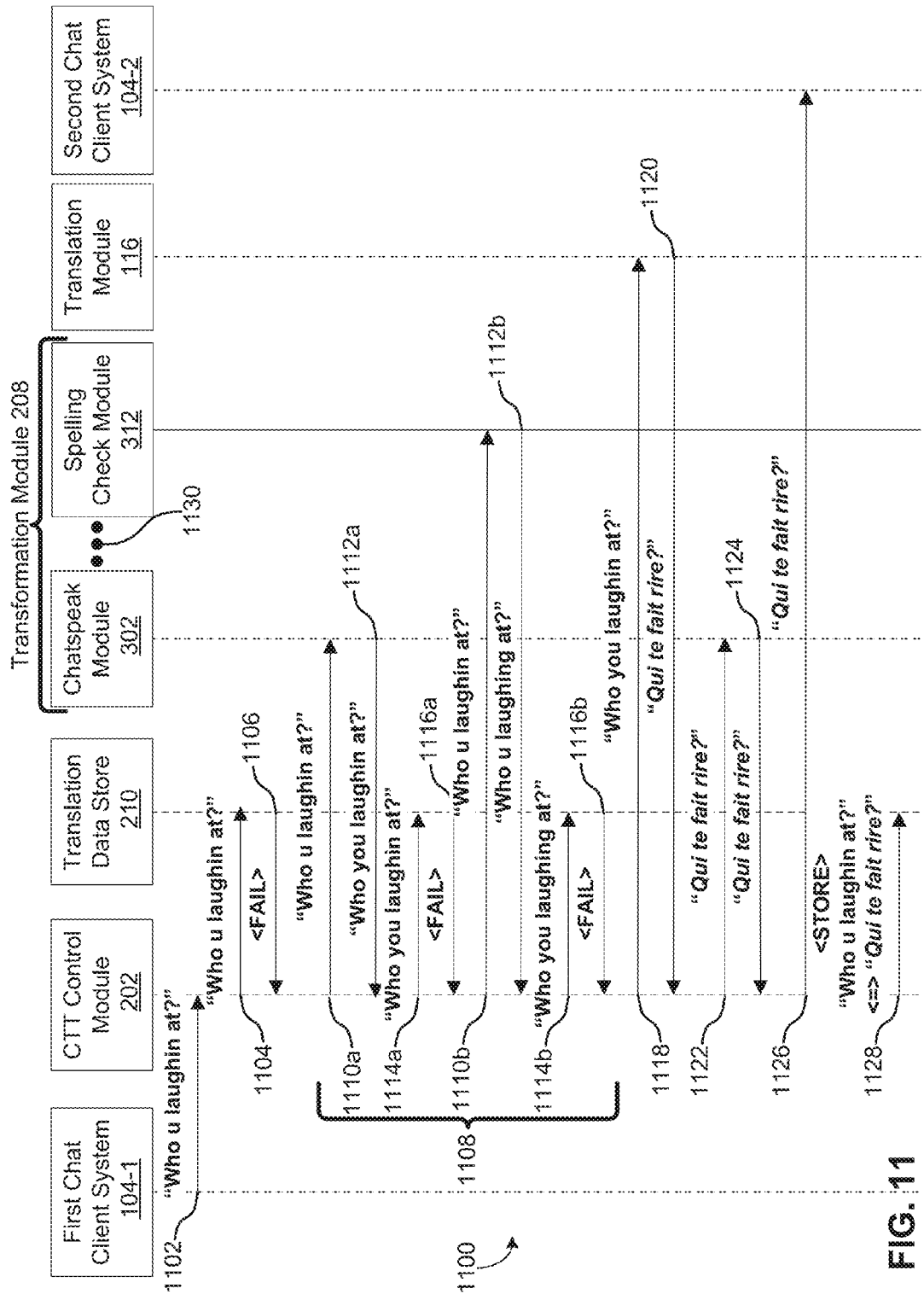
FIG. 11 is a flowchart illustrating operation of an exemplary multi-lingual communication method, in accordance with various embodiments.

FIG. 11 is a flowchart illustrating operation of an exemplary multi-lingual communication method 1100 in accordance with various embodiments. As described below, for some embodiments, the method 1100 may perform operations in connection with the chat client system 104-1, the chat client system 104-2, the CTT system 114 (e.g., of the chart server 108), and the translation module 116 (e.g., of the translation server 110). In particular, FIG. 11 illustrates the translation of an English chat message comprising the text "Who u laughin at?" to a French chat message by parallel transformation operations, in accordance with some embodiments.

As shown, at operation 1102, the first chat client system 104-1 may submit the English chat message for transmission to the second chat client system 104-2 (e.g., via the chat host system 112). The English chat message may be routed to the CTT control module 202 of the CTT system 114 for translation processing.

At operation 1104, the CTT control module 202 may query the translation data store 210 for a French equivalent chat message that corresponds to the English chat message ("Who u laughin at?"). In response, at operation 1106, the translation data store 210 may return a query failure to the CTT control module 202 to indicate that the translation data store 210 does not have a corresponding French chat message for the English chat message ("Who u laughin at?").

If such is the case, the CTT control module 202 may submit the English chat message to the transformation module 208 for transformation processing in accordance with certain embodiments. As described herein, the transformation module 208 may comprise multiple transformation-related modules 1130 configured to transform a chat message to a message more suitable for further translation processing. As shown in FIG. 11, during operations 1108, the CTT control module 202 may submit the English chat message ("Who u laughin at?"), in parallel, to two or more transformation-related modules 1130 of the transformation module 208. Additionally, during operations 1108, the CTT control module 202 may be receiving results from the transformation-related modules 1130 in parallel, and submitting queries to the translation data store 210, based on the transformation results, in parallel.

Accordingly, at operation 1110a, the CTT control module 202 may submit the English chat message ("Who u laughin at?") to the chatspeak module 302 for transformation processing. In parallel, at operation 1110b, the CTT control module 202 may submit the English chat message ("Who u laughin at?") to the spelling check module 312 for transformation processing. Subsequently, the CTT control module 202 may receive a first transformed English chat message ("Who you laughin at?") from the chatspeak module 302 at operation 1112a, while at operation 1112b the CTT control module 202 may receive a second transformed English chat message ("Who u laughing at?") from the spelling check module 312. Depending on their respective transformation processing times, the chatspeak module 302, the spelling check module 312, and the other transformation-related modules 1130 may respond to the CTT control module 202 in serial or in parallel with respect to one another.

Subsequently, at operation 1114a, the CTT control module 202 may query the translation data store 210 for a French equivalent chat message that corresponds to the first transformed English chat message ("Who you laughin at?"). At operation 1114b, the CTT control module 202 may query the translation data store 210 for a French equivalent chat message that corresponds to the second transformed English chat message ("Who u laughing at?"). For some embodiments, during operations 1114a and 1114b, the CTT control module 202 may query the translation data store 210 in serial or in parallel. In some embodiments, the timings of the queries may depend on when the transformation-related modules 1130 of the transformation module 208 return their respective responses. As shown in FIG. 11, the translation data store 210 may return a query failure (e.g., <FAIL>) for the queries at operations 1116a and 1116b.

Eventually, the CTT control module 202 may select one transformed message, from the two or more messages that result from the parallel operations 1108, for further processing. Where only one of the transformation-related modules 1130 results in a transformed message, the CTT control module 202 may select that particular transformed message for further processing. As noted herein, the CTT control module 202 may select a transformed message based on a priority of selection, which may be determined according to the transformation/translation strategy selected by the embodiments. For some embodiments, the priority of selection may be based on whether the transformed message has the most formal content, the transformed message has the most transformations, or the transformed message results from a transformation-related module known for having a high likelihood of producing a transformed message suitable for machine-translation.

Once a transformed message has been selected, at operation 1118, the CTT control module 202 may submit the transformed English chat message to the translation module 116 for machine translation processing in accordance with certain embodiments. For example, as shown in FIG. 11, the CTT control module 202 may select the first transformed English chat message produced by the chatspeak module 302 ("Who you laughin at?") for submission to the translation module 116.

At operation 1120, the translation module 116 may return a machine-translated French chat message ("Qui te fait rire?") that corresponds to the first transformed English chat message (and despite comprising the misspelled word "laughin"). At operation 1122, the CTT control module 202 may submit the machine-translated French chat message ("Qui te fait rire?") to the transformation module 208 for further transformation processing of the machine-translated French chat message in accordance with certain embodiments.

As noted herein, the machine-translated text may be submitted for further transformation processing to further refine the translation of the text. For example, if the original English chat message contained English chatspeak, the additional transformation processing can add, to the extent possible, French chatspeak. At operation 1124, the transformation module 208 may return the machine-translated French chat message ("Qui te fait rire?") unchanged to the CTT control module 202 for further processing (e.g., when the modules of the transformation module 208 do not apply any changes to the machine-translated French chat message).

At operation 1126, the CTT control module 202 may assist in the transmission of the machine-translated French chat message ("Qui te fait rire?") to the second chat client system 104-2 (e.g., CTT system 114 submits the corresponding French chat message to the chat host system 112 for transmission). Additionally, at operation 1128, the CTT control module 202 may store a translation mapping in the translation data store 210 between the original English chat message ("Who u laughin at?") and the translated French chat message ("Qui te fait rire?"). As described herein, in additional operations (not shown), the CTT control module 202 may also store equivalent translation mappings in the translation data store 210 based on previously failed queries to the translation data store 210 and corresponding messages determined subsequent to those queries (e.g., similar to operations 928 and 930 in FIG. 9).

For some embodiments, the transformation operations may be performed in a hybrid serial/parallel arrangement, whereby some transformation operations are performed in parallel and other transformation operations are performed in serial. For example, as shown in FIG. 11, the English chat message ("Who u laughin at?") is submitted to the chat speak module 302 and spelling check module 312 in parallel at operations 1110a and 1110b. Subsequently, once one of the resulting transformed messages is selected (e.g., based on a priority of selection), the other transformation-related modules 1130 of the transformation module 208 (e.g., the acronym module 304, the proper noun module 306, and the common noun module 308) may operate on the selected transformed message in parallel.

Figure 12:
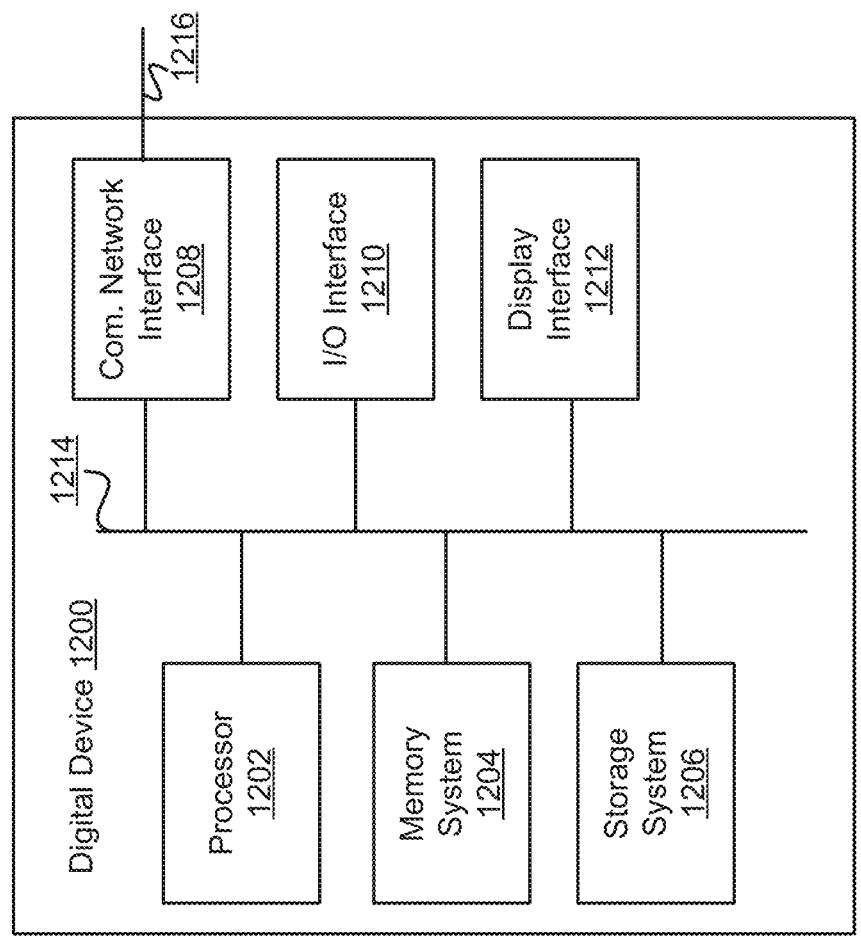
FIG. 12 is a block diagram illustrating an exemplary digital device that can be utilized, in accordance with various embodiments.

FIG. 12 is a block diagram of an exemplary digital-device 1200. The digital device 1200 comprises a processor 1202, a memory system 1204, a storage system 1206, a communication network interface 1208, and I/O interface 1210, and a display interface 1212 communicatively coupled to a bus 1214. The processor 1202 is configured to execute executable instructions (e.g., programs). In some embodiments, the processor 1202 comprises circuitry or any processor capable of processing the executable instructions.

The memory system 1204 is any memory configured to store data. Some examples of the memory system 1204 are storage devices, such as RAM or ROM. The memory system 1204 can comprise the ram cache. In various embodiments, data is stored within the memory system 1204. The data within the memory system 1204 may be cleared or ultimately transferred to the storage system 1206.

The storage system 1206 is any storage configured to retrieve and store data. Some examples of the storage system 1206 are flash drives, hard drives, optical drives, and/or magnetic tape. In some embodiments, the digital device 1200 includes a memory system 1204 in the form of RAM and a storage system 1206 in the form of flash data. Both the memory system 1204 and the storage system 1206 comprise computer readable media which may store instructions or programs that are executable by a computer processor including the processor 1202.

The communications network interface (com. network interface) 1208 can be coupled to a network (e.g., the computer network 106) via the link 1216. The communication network interface 1208 may support communication over an Ethernet connection, a serial connection, a parallel connection, or an ATA connection, for example. The communication network interface 1208 may also support wireless communication (e.g., 802.11 a/b/g/n, WiMax). It will be apparent to those skilled in the art that the communication network interface 1208 can support many wired and wireless standards.

The optional input/output (I/O) interface 1210 is any device that receives input from the user and output data. The optional display interface 1212 is any device that is configured to output graphics and data to a display. In one example, the display interface 1212 is a graphics adapter.

It will be appreciated by those skilled in the art that the hardware elements of the digital device 1200 are not limited to those depicted in FIG. 12. A digital device 1200 may comprise more or less hardware elements than those depicted. Further, hardware elements may share functionality and still be within various embodiments described herein. In one example, encoding and/or decoding may be performed by the processor 1202 and/or a co-processor located on a GPU (i.e., Nvidia®).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

Figure 13:
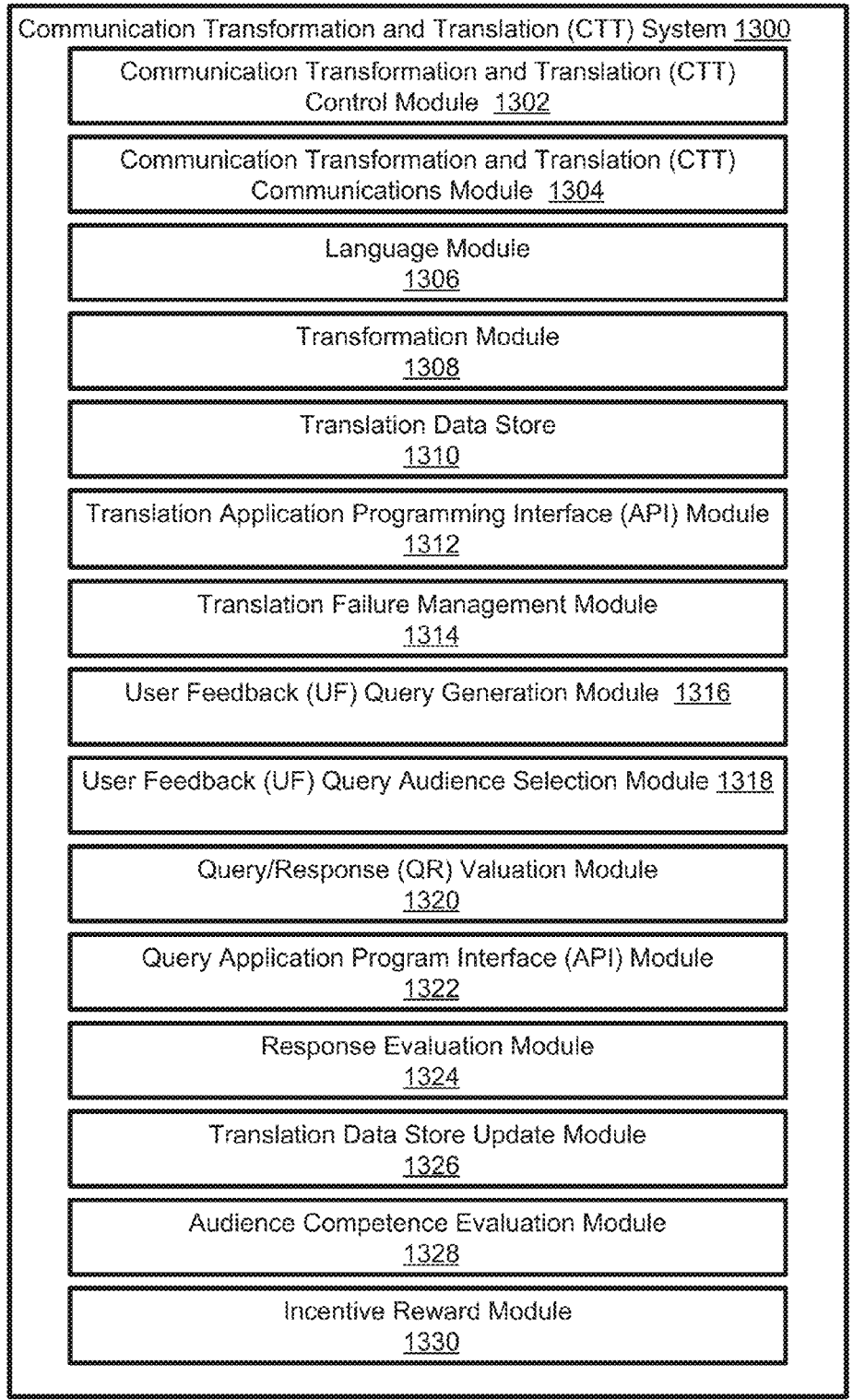
FIG. 13 is a block diagram illustrating an example user feedback system, in accordance with various embodiments.

FIG. 13 is a block diagram illustrating an example user feedback system in accordance with various embodiments. For illustrative purposes, in FIG. 13 the sample system for user feedback is shown as part of an example communication transformation and translation (CTT) system 1300 in accordance with various embodiments. For example, the example user feedback system may be part of a chat translation system employed by various multi-lingual chat systems, including game chat systems available in conjunction with MMO games (e.g., in-game chat system). With use of the example user feedback system, various players of the MMO game may choose to provide user feedback, for example through the in-game chat system, for flagged words or phrases, possibly in return for in-game currency/credit/item as an incentive for the feedback/approved feedback. Those skilled in the art will appreciate that for some embodiments, the example user feedback system, and some or all of its related components, may be separate and/or independent from the example communication transformation and translation system 1300.

As used herein, "feedback" should be understood to refer in "user feedback" or "user feedback response," possibly in response to a query requesting feedback for a transformation or a translation. It should also be understood that that user feedback can comprise user feedback for a transformation or user feedback for a translation. User feedback may comprise a definition for a given word or phrase that (i) permits the given word or phrase to be transformed from the given word or phrase in a first language to a corresponding word or phrase in the (same) first language; (ii) permits the given word or phrase to be transformed from the given word or phrase in the first language to a corresponding word or phrase in a (different) second language, thereby performing a transformed translation of the word or phrase; and/or (iii) permits the given word or phrase to be translated from a first language to a second language, thereby performing a untransformed translation of the word or phrase. As described herein, a user feedback response may be received in response to a query requesting user feedback in connection with a translation failure.

As used herein, a "failure of translation" or a "translation failure" may be understood to include an actual failure to translate a text (e.g., translated text is identical to the original text), or text translation that are flagged as potentially containing a translation failure (e.g., flagged by a user reading a translated text and believing the translated text contains questionable or incorrect translation).

As shown in FIG. 13, the CTT system 1300 may comprise a communication transformation and translation (CTT) control module 1302, a communication transformation and translation (CTT) communication module 1304, a language module 1306, a transformation module 1308, a translation data stores 1310, and a translation application programming interface (API) module 1312. In some embodiments, the CTT control module 1302, the CTT communications module 1304, the language module 1306, the transformation module 1308, the translation data stores 1310, and the translation API module 1312 may be similar to the components of the CTT system 114 as described herein.

As also shown in FIG. 13, the CTT system 1300 may comprise a translation failure management module 1314, a user feedback (UF) query generation module 1316, a user feedback (UF) query audience selection module 1318, a query/response valuation module 1320, a query application program interface (API) module 1322, a response evaluation module 1324, a translation data store update module 1326, an audience competence evaluation module 1328, and an incentive reward module 1330.

The translation failure management module 1314 may be configured to facilitate management of translation failures (e.g., failure to translate a text from a first language to a second language). For some embodiments, the translation failure management module 1314 may be adapted to handle one or more translation failures that may be experienced by the CTT system 1300 as the system 1300 attempts to translate a chat message sent from a first user, who is using a first language during their chat sessions, to a second user, who is using a second language during their chat session. As described herein, the text to be translated by the CTT system 1300 may be chat messages, which may comprise chatspeak, abbreviates, colloquialisms, idioms, and the like. It will be understood that during transformation or translation of a chat message, some or all of the chat messages may result in translation failure, possibly due to the inability of the CTT system 1300 to transform and/or translate those failure causing portions of the chat message.

Features provided by the translation failure management module 1314 may include, without limitation; automatically detecting when a failure to translation of text has occurred, automatically detecting when certain words or phrases of a text are untranslatable; enabling a user to flag some or all of a "translated" text as containing actual or potential translation errors after a translation process; managing what translations failures are selected for user feedback from various audience members (e.g., chat members, such as players using an in-game chat system); managing what words or phrases associated with a translation failure are selected for user feedback (e.g., based on how often the word is encountered/used in text to be translated), and managing when a translation failure is no longer a candidate for selection for user feedback (e.g., words or phrases associated with a translation failure are removed from the selection pool).

In various embodiments, the translation failure management module 1314 may manage the overall availability of words or phrases for user feedback by audience members. As used herein, a "user feedback opportunity" may comprise a word or phrase available for user feedback by an audience member. The translation failure management module 1314 may throttle or suspend availability of one or more user feedback opportunities based on various conditions, such as the availability of computing resources for user feedback, incentives rewarded in connection with user feedback, quality of feedback response received in the past, and the like. For instances, it may be determined that continuing to reward incentives (e.g., in-game currency or in-game item) for approved user feedback responses may negatively impact the economy relating to the incentive (e.g., the in-game economy). Accordingly, some embodiments may (temporarily) suspend the availability of user feedback opportunities that reward the incentives, or adjust the incentives rewarded (e.g., amount of incentive of type of incentive) for user feedback opportunities when those embodiments detect that the current inventive strategy is harmful to an economy of concern (e.g., in-game economy).

As described herein, an audience member from which user feedback is solicited may be one who has volunteered to provide such feedback, possibly as a participant in a user feedback program and/or in return for an incentive when their submitted feedback has been approved (e.g., as being correct, accepted, or useful in defining a transformation or translation). For some embodiments, the user feedback systems described herein may be part of a game system, such as an online MMO game, where the audience members are game players that choose to otherwise participate in user feedback opportunities, possibly for incentives useful in the game system (e.g., in-game currency or in-game items). In this way, the user feedback system may be presented as a game feature that game playing audience member regard as a "game" to be "played" for a reward, thereby leveraging the competition inherent to the gaming environments. More regarding selection of audience members is described with respect to the UF query audience selection module 1318.

As described herein, a word or phrase may be flagged by a communication system user that believes that the word or phrase of concern is preventing a translation or causing an inaccurate translation of communicated text. For example, in a multi-lingual multi-user chat system associated with an online game, a game player may flag an entire chat message they have received, or flag certain portions of the chat message (e.g., word or phrase thereof), as potentially having a translation problem or failure. Words or phrases associated with a translation failure may include, for example, specialized/domain-related jargon, abbreviations, acronyms, proper nouns, common nouns, diminutives, colloquial words or phrases, and profane words or phrases. Additionally, the word or phrase may be flagged by a system or method that automatically detects the word or phrase as being untranslatable, possibly preventing translation of larger phrases or sentences.

The translation management module 1314 may be responsible for selecting a word or phrase as being the subject of a user feedback, where the selected word or phrase may be flagged as being associated with an actual or potential failure to translate text from a first language to a second language. The translation management module 1314 may select a word or phrase based on a number of factors, some of which include the current importance of the word or phrase in translations (e.g., importance based on overall usage of the word or phrase), complexity of the word or phrase (e.g., difficulty of the word or phrase, or how long the word or phrase has been an issue), the competency of the user selected/volunteering to provide user feedback (e.g., the user has competency in the second language), and a preference of the user selected/volunteering to provide user feedback. Those skilled in the art will appreciate other factors for selecting words or phrases for user feedback may be utilized by various embodiments.

For various embodiments, users selected to provide user feedback may be ones volunteering to provide such feedback. For instance, a user may choose to provide user feedback by setting an associated user preference, by selecting an in-chat system advertisement that is soliciting user feedback, and/or browsing through a selection that lists one or more user feedback opportunities available for selection.

As noted herein, the translation failure management 1314 may manage when a particular word or phrase that is associated with an actual or potential translation failure is no longer a candidate for selection for user feedback by audience members. Various conditions can lead the translation failure management 1314 to make such a determination including, for instance, when a specific number of feedback responses has been received in connection with the certain word or phrase or with the associated translation failure; when a specific number of consistent feedback responses has been received in connection with the certain word or phrase or with the associated translation failure; and when a given feedback response has been approved as a valid response for the user feedback sought (e.g., a specific response from a set of unique feedback responses has been manually approved by an administrator as a correct response).

The UF query generation module 1316 may be configured to generate a query for obtaining user feedback, from a selected audience member, for a given word or phrase selected for user feedback. As described herein, the audience member selected may be a user who has volunteered to provide user feedback, possibly in return for an incentive when the user feedback submitted has been approved as being correct, an accepted feedback response, or useful in refining a translation in question. More regarding selection of audience members is described with respect to the UF query audience selection module 1318.

For some embodiments, the query generated may include one or more methods of receiving a query response from the selected audience member. For example, the generated query may include, as a response method, a listing of predefined responses from which the audience member can select as their response to the generated query (also referred to herein as a "select-form response"). In another example, the generated query may include, as a response method, one or more fields configured to receive as their response to the generated query, a text value entered into a field by the audience member (also referred to herein as a "free-form response"). Other response methods may include a graphical user interface (GUI) elements, text values, or some combination thereof.

The one or more response methods included in the generated query may be according to a number of factors including, for example: a preference of the audience member, the importance and/or complexity of the word or phrase for which user feedback is sought; the number of feedback responses received thus far for the word or phrase for which user feedback is sought; the number of consistent feedback responses received thus far for the word or phrase for which user feedback is sought; and whether there is enough free-form feedback responses from which to create a selection-form response. For some embodiments, the audience member to response to the generated query can select from two or more response methods for the generated query.

Additionally, the languages for which an audience member is present user feedback opportunities may be according to a number of factors including, for example: whether the audience member is multi-lingual by monitoring the audience member's chat history; whether the audience member language abilities meet or exceed a particular language confidence level; and a language setting on the user device the audience member is using to participate in a user feedback opportunity (e.g., default language setting for the audience member's device). For example, where the default device language of an audience member's device is German and he or she selects to participate in a user feedback opportunity, the query generated and sent to the audience member will based on the German language (e.g., query for defining an English word or phrase to a German word or phrase, or vice versa). For some embodiments, the generated query may provide an audience member with an option to select the language of the response to be submitted (e.g., when the generated query does not specify or require a specific language) and/or with an option to provide more two or more responses with each response possibly being of a different language. For some such embodiments, the audience member may be presented with language response options according to various language factors discussed herein, such as whether the audience member is multi-lingual and a language setting on the user device of the audience member.

The UF query audience selection module 1318 may be configured to select an audience member from which to solicit user feedback. In some embodiments, the UF query audience selection module 1318 may select the audience member from a pool of audience members who have volunteered to provide user feedback, possibly in return of incentive (which may be received when the user feedback is approved/accepted). As described herein, an audience member may volunteer to participate in translation, at which time the audience member may be included in the pool of audience members from which the UF query audience selection module 1318 selects for user feedback solicitation. In some embodiments, when the UF query audience selection module 1318 selects an audience member, the audience member may be provided with a query generated by the UF query generation module 1316 to obtain user feedback. The query generated by the UF query generation module 1316 may be provided to the audience member selected, by the UF query audience selection module 1318, as part of a listing of user feedbacks available for participation by the selected audience member. Once the generated query is provided to the selected audience member, the selected audience member may initiate a user feedback session in which the generated query is presented to the audience member (e.g., with one or more response methods associated with the generated query) and the selected audience member can provide one or more responses (e.g., by way of one or more response methods included with the generated query).

Depending on the embodiment, where a word or phrase is selected for user feedback before the audience member is selected, the audience member may be selected from a set of candidate audience members based on the selected word or phrase (e.g., whether the selected word or phrase matches the competency of preferences of the audience member). Alternatively, where the audience member is selected before the word or selected is selected for user feedback, the word or phrase selected may be based according to the audience member that is selected. The competency of a given audience member may be determined based on one or more feedback responses previously provided by the given audience member (e.g., in connection with previous queries generated and provided to the given audience member) and/or one or more language capabilities of the audience member. An audience member, for example, may be evaluated to have requisite competency to provide user feedback for one more words or phrases associated with a translation failure when the audience member has achieved a specific number of approved feedback responses. In another example, an audience member may be evaluated to have competency in a specific language based on at least previously submitted feedback responses for a specific language, the preferences of the audience member, and/or information related to the audience member that indicates their fluency in the specific language. In a further example, an audience member who has previously submitted feedback responses that were evaluated as being incorrect or fraudulent (e.g., nonsensical or fabricated responses) may be determined to have lower competency.

For some embodiments, once a given audience member has provided a response in connection with a word or phrase (and the response is possibly approved), the given audience member may not be re-selected for providing user feedback for the same word or phrase. Certain embodiments may make an exception to this restriction when the given audience member provides a response in a language that is different from the language of a response previously submitted for the same word or phrase.

Where incentives are provided in return for user feedback (e.g., upon approval of a feedback response), various embodiments may select audience members based on a quota, such as time-based quota (e.g., hourly, daily, monthly, yearly limit for submitting feedback responses) or an incentive-earned quota (e.g., limit of in-game currency or items awards for incentive-based user feedback), where the quota is associated with individual audience members, groups or audience members, or some combination thereof. For some embodiments, the UF query audience selection module 1318 may throttle or suspend availability of user feedback opportunities to one or more audience members based on various conditions, such as the availability of computing resources for user feedback, incentives rewarded in connection with user feedback, quality of feedback response received in the past, and the like.

The query/response (QR) valuation module 1320 may be configured to determine the value or importance of a query or query response based on the word or phrase for which the query or query response is soliciting user feedback. Example of factors considered by various embodiments when determining the value a query or a query response may include the complexity of the word or phrase (e.g., higher the complexity, higher the value), the importance of the word or phrase to transformation/translation processes (e.g., higher the importance, higher the value), the response method employed by the query or query response (e.g., higher value for a free-form response method over a selection-form response method), the type of word or phrase (e.g., chatspeak, abbreviation, or colloquial), or the one or more languages involved (e.g., a query comprising an English word or phrase and that receives a French response has higher value than a query comprising an English word or phrase that receives an English response). In some embodiments, an incentive rewarded for a given user feedback may be based on the value associated with the query or query response. For some embodiments, the QR valuation module 1320 may be configured to determine a value for a query or query response based on the efficacy of previous queries or query responses in soliciting beneficial, useful, or accurate user feedback. Accordingly, for some embodiments, the value may be dynamically adjusted based on the latest efficacy of achieved by previous queries or query responses. In certain embodiments, the QR valuation module 1320 may enable an administrator (e.g., of the CTT system 1300) or another authorized user to manually assign or adjust values for queries and/or query responses in connection with one or more user feedback.

The query API module 1322 may be configured to facilitate transmitting user feedback queries to selected audience members and/or receiving query responses from selected audience members. In some embodiments, the query API 1322 may be adapted to provide a listing of available user feedback opportunities available to the selected audience member, provide queries relating to one or more the user feedback opportunities selected by the selected audience member, receiving responses for one or more the user feedback opportunities selected by the selected audience member, and/or providing the selected audience member with the current status of query responses submitted for approval thus far (e.g., status of approved, rejected, or pending/awaiting approval). For some embodiments, the query API 1322 may obtain one or preferences associated with a given audience member, possibly from a chat client system being used by the given audience member to interact with the CTT system 1300. As noted herein, a preference associated with an audience member can determine selection of the word or phrase for which user feedback is solicited from the audience member, and/or can determine of whether the audience member is selected to receive a query for user feedback of a given word or phrase.

The response evaluation module 1324 may be configured to evaluate a query response submitted in connection with a query generated to obtain a user feedback. For some embodiments, the response evaluation module 1324 may evaluate query responses in one or more places.

During a validation phase, the response evaluation module 1324 may disposition one or more unique responses, submitted for a given generated query, as approved or rejected for the given generated query. In some embodiments, a unique response, submitted in connection with a generated query to obtain user feedback, may be considered pending approval until such time as the unique response has been approved as being valid for the word or phrase associated with the generated query, or rejected as being invalid for the word or phrase associated with the generated query. As used herein, a given "unique response," may include a set of responses similar but not exactly identical in syntax (e.g., different punctuation or spacing); a given unique response may be received by way of two or more response methods. A unique response is also referred to herein as a "unique query response" and a "unique user feedback response." Depending on the embodiment, more than one unique query response may be approved for a given generated query. For instance, more than one unique response may be approved as defining a given word or phrase in connection with user feedback that being sought. Responses may, for example, be manually validated by an administrator, or the like, who reviews and dispositions the responses (e.g., possibly only the unique responses). Additionally, or alternatively, responses may be validated by an automatic process, which may approve and/or reject submitted responses based on their count and/or the thresholds associated with response counts. In some embodiments, an automatic validation process may filter the top submitted responses for a given word or phrase, and provide those top submitted responses to an administrator, or the like, for review and disposition. The validation phase may be performed by the response evaluation module 1324 periodically (e.g., based on a schedule) or based on a condition (e.g., where the number of submitted responses pending approval has met or exceeded a threshold).

For some embodiments, where a plurality unique user feedback responses (e.g., definitions) are provided for a given word or phrase, the response evaluation module 1324 may automatically (and/or through manual admin input) approve the top ranked unique user feedback response (e.g., most popular response) from the plurality, but may only do so if that top ranked unique user feedback response is statistically significant. For instance, where a first unique user feedback response was received twenty-six times for a given word, and a second unique user feedback response was received twenty-four times for the same given word, the first unique user feedback response may not be approved as the response for the given word, even if it is the top ranked unique user feedback response for the given word. This is because twenty-six is not statistically significant over twenty-four. The first unique user feedback may not be selected until, for example, the first unique user feedback response remains the top ranked unique user feedback response and the response count reaches forty.

Given that phrases may be not be identical but may be similar in nature and convey the same intent, for some embodiments, a word error rate (WER) may be used to group unique user feedback responses that comprise a phrase. For two phrases, WER may measure the substitutions, deletions, and insertions of words to convey similarity between the phrases.

For various embodiments, where a plurality unique user feedback responses (e.g., definitions) are provided for a given phrase, the response evaluation module 1324 may automatically (and/or through manual admin input) approve the top ranked unique user feedback response.

During a check phase, the response evaluation module 1324 may determine whether a response submitted by an audience member has been dispositioned as approved, rejected, or pending review (e.g., pending approval). For some embodiments, a data store may maintain the status of whether a unique response submitted by audience members, in connection with a given word or phrase, has been approved or rejected as a valid definition for the given word or phrase. Accordingly, the check phase may determine the disposition of a response submitted for a given word or phrase by consulting with the data store that maintains the disposition status of unique responses previously submitted for the given words or phrase; the submitted response shares the disposition status of the unique response that corresponds with the submitted response. Depending on the embodiment, the check phase for a submitted response may be performed immediately or soon after the response has been submitted. Where a submitted response is determined to be still pending review during a check phase, the check phase may be re-performed at a later time, possibly following a validation phase that causes the status of the identical or similar submitted responses to be affected. The status of the submitted response may be updated according to the current disposition of the submitted response as determined during the check phase. As described herein, the current status of one or more responses submitted by a given audience member may be provided as a listing that reflects the current statuses for those responses. More regarding response status is discussed later with respect to FIG. 28.

The response evaluation module 1324 evaluation of the response may comprise determining whether the response is approved. The response may be approved based on at least one previous response provided by another person in response to another query, the other query being previously generated to obtain feedback for the word or phrase from the other person. The response may be approved once the response is determined to accurately define the word or phrase.

The translation data store update module 1326 may be configured to update a transformation or a translation (e.g., stored in the translation data store 210), possibly based on the evaluation of a response submitted, by a selected audience member, for a user feedback query. For example, where a submitted response in a first language is determined, during response evaluation, as being an approved definition for a given word in the (same) first language, a transformation mapping the given word in the first language to the response in the first language will be added or updated accordingly. In another example, where a submitted response in a second language is determined, during response evaluation, as being an approved definition for a given word in the first language, a transformation mapping the given word in the first language to the response in the second language will be added or updated accordingly. The update of transformation or translations may be performed by the translation data store update module 1326 during a subsequent to a check phase that results in the disposition of a submitted response changing to approved.

The audience competence evaluation module 1328 may be configured to determine the competence of an audience member, which may be indicative of the level of confidence associated with the audience member ability to provide accurate and/or useful user feedback responses. As described herein, the competency of a given audience member may be determined based on one or more feedback responses previously provided by the given audience member (e.g., in connection with previous queries generated and provided to the given audience member) and/or one or more language capabilities of the audience member. An audience member, for example, may be evaluated to have requisite competency to provide user feedback for one or more words or phrases associated with a translation failure when the audience member has achieved a specific number of approved feedback responses. In another example, an audience member may be evaluated to have competency in a specific language based on at least previously submitted feedback responses for a specific language, the preferences of the audience member, and/or information related to the audience member that indicates their fluency in the specific language. In a further example, an audience member who has previously submitted feedback responses that were evaluated as being incorrect or fraudulent (e.g., gibberish responses) may be determined to have lower competency.

The incentive reward module 1330 may be configured to reward an audience member with an incentive based on the evaluation of a response submitted, by the audience member, in connection with a query for user feedback. As described herein, upon approval a submitted response, an audience member may be rewarded with an incentive. The amount or type of incentive rewarded may be determined based on a number of factors including, without limitation, the value of the query or query response assigned by the QR valuation module 1320, the response method used by the audience member in responding to the query, the amount(s) of incentives already rewarded (e.g., to the audience member or to all audience members in connection with the particular word or phrase or through incentive-based user feedback), the language of the query or the language of the response provided, and the type of word or phrase for which a response was submitted (e.g., chatspeak, abbreviation or special domain word or phrase). The incentive rewarded may comprise real world currency or virtual currency, such as in-game currency or in-game item, which may or may not have value outside its related virtual economy (e.g., monetary value in a real world economy). For some embodiments, the incentive may comprise a real world good or service or a virtual good or service, which may have an associated monetary value. Those skilled in the art recognize that other forms of incentives may be rewarded in different embodiments.

For some embodiments, the incentive reward module 1330 may be responsible for notifying an audience member when one or more of their submitted responses are approved and/or when an incentive has been awarded to the audience member for a submitted response that has been approved. In various embodiments, the incentive reward module 1330 may notify the audience member of the incentive reward through a notification message (e.g., in-chat message, such as a pop-up message) and/or through an update to a listing of statuses for submitted responses.

Those skilled in the art will appreciate that for various embodiments, a system for user feedback may include more or less components than those illustrated in FIG. 13, and each component illustrated in FIG. 13 may perform more or less operations than those described for each component.

Figure 14:
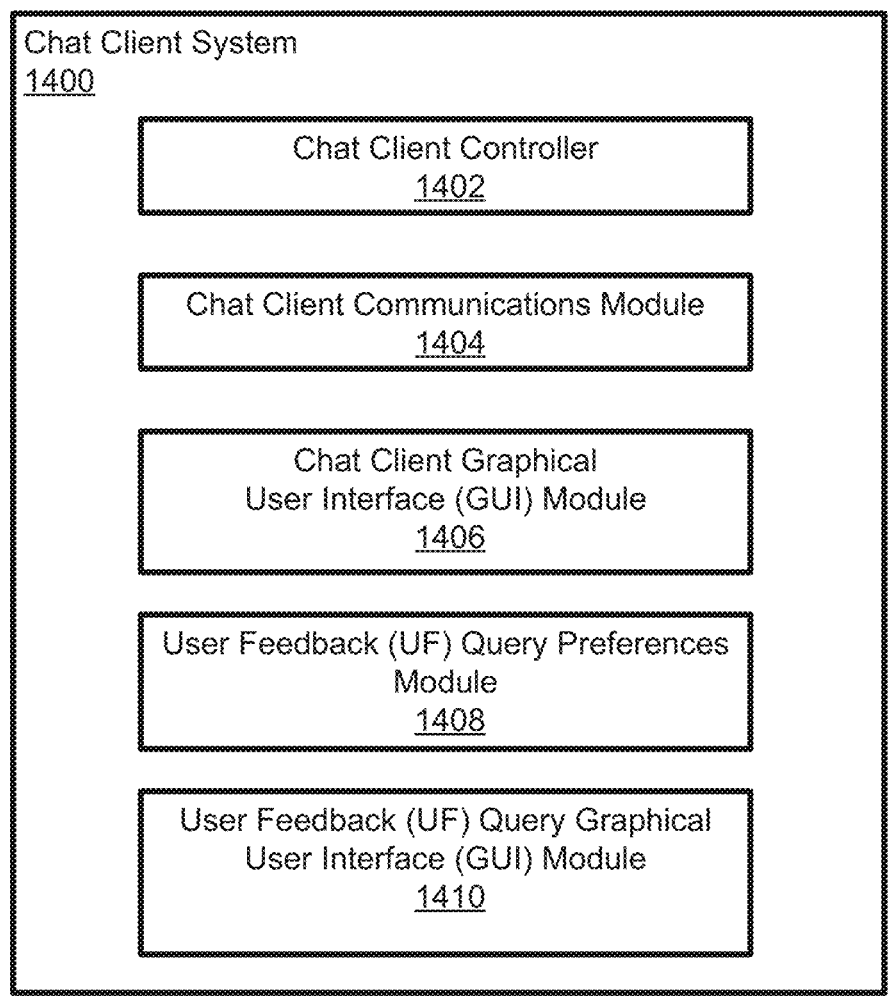
FIG. 14 is a block diagram illustrating an example user feedback client system, in accordance with various embodiments.

FIG. 14 is a block diagram illustrating an example user feedback, client system in accordance with various embodiments. For illustrative purposes, in FIG. 14 the user feedback client system is shown as part of a chat client system 1400 in accordance with various embodiments. For example, the example user feedback client system may be part of a game chat client system available in conjunction with an MMO game (e.g., in-game chat client system), where various players of the MMO game can choose to provide user feedback for flagged words or phrases, possibly in return for in-game currency/credit/item as an incentive for the feedback. Those skilled in the art will appreciate that for some embodiments, the example system user feedback, some or all of its related components, may be separate from the example communication transformation and translation system 1300.

As shown in FIG. 14, the chat client system 1400 may comprise a chat client controller 1402, a chat client communications module 1404, and a chat client graphical user interface (GUI) module 1406. In some embodiments, the chat client controller 1402, the chat client communications module 1404, and the chat client GUI module GUI module 1406 may be similar to the components of the chat client system 104 as described herein.

As also shown in FIG. 14, the chat client system 1400 may comprise a transformation/user feedback (UF) query preferences module 1408 and a transformation/user feedback (UF) query graphical user interface (GUI) module 1410. For some embodiments, the UF query preferences module 1408 and/or the UF query GUI module 1410 facilitate user feedback interactions with respect to the CTT system 1300. In the context of the chat client system 1400, a chat user of the chat client system 1400 can be an audience member with respect to the user feedback systems of various embodiments (e.g., the CTT system 1300).

The UF query preferences module 1408 may be configured to manage and otherwise permit a chat user to preview, defined, and/or adjust preferences in relation to the user feedback features provided in connection with user feedback systems of some embodiment (e.g., the CTT system 1300). Example of preferences managed by UF query preferences module 1408 may include, for instance, language preferences relating to user feedback (e.g., language of words or phrases solicited for user feedback and/or language of the user feedback sought), preferred response methods for user feedback queries (e.g., select-form responses over free-form responses), or preferred word or phrase types (e.g., abbreviations, chatspeak, physics related, or idioms), and the like.

As used herein, a select-form response is a response that is predetermined and selectable from a listing of two or more select-form responses. Depending on the embodiment, a listing of select-form responses may permit an audience member to select two or more responses when applicable. A free-form response is a response that comprises a text-based value (e.g., character value or string value) entered into a field by an audience member.

The UF query GUI module 1410 may graphically facilitate the presentation of a query generated for user feedback and provided to a chat user (e.g., by the CTT system 1300), presentation of one or more response methods associated with the query, and/or receiving a response from the chat user through the presented response method. The UF query GUI module 1410 may also facilitate management of management of preferences through the UF query preferences module 1408. More regarding with the graphical user interfaces that may be presented at a chat client system is described later with respect to FIGS. 17-23 and 24-31.

Those skilled in the art will appreciate that for various embodiments, a client system for user feedback may include more or less components than those illustrated in FIG. 14, and each component illustrated in FIG. 14 may perform more or less operations than those described for each component.

Figure 15:
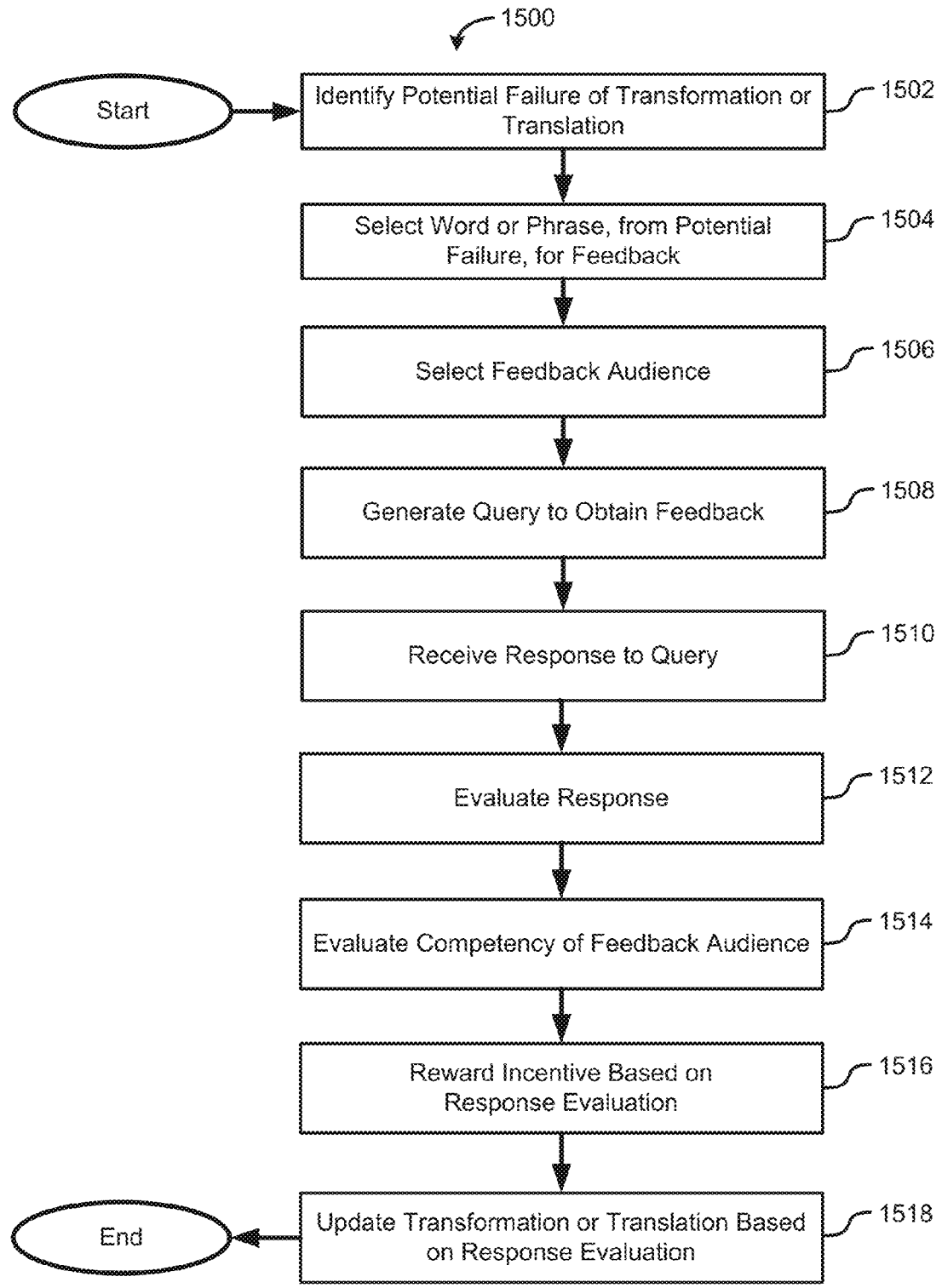
FIG. 15 is a flowchart illustrating an example method for user feedback, in accordance with various embodiments.

FIG. 15 is a flowchart illustrating an example method 1500 for user feedback in accordance with various embodiments. At step 1402, the translation failure management module 1314 may identify a potential failure of a transformation or translation of a text, possibly from a first language to a second language. At step 1504, the translation failure management module 1314 may also select a word or phrase, from the identified potential failure, for user feedback. At step 1506, the UF query audience selection module 1318 may select an audience member for soliciting user feedback. At step 1508, the UF query generation module 1316 may generate a query to obtain the user feedback, possibly from the selected audience member. At step 1510, the response evaluation module 1324 may receive a response to the generated query. The query API module 1322 may be responsible for providing the generated query to the selected audience member, and receiving the response to the generated query. At step 1512, the response evaluation module 1324 may evaluated the received the response. At step 1514, the audience competence evaluation module 1328 may evaluate the competence of the selected audience member, possibly based on the response provided in step 1510 and/or the evaluation of the received response as performed in step 1512. At step 1516, the incentive reward module 1330 may be reward the selected audience member an incentive based on the response evaluation. As noted herein, upon evaluating a response and determining that it is approved, the incentive reward module 1330 may reward the audience member with a reward, possibly in accordance with the value of the query and/or the query response as determined by the QR valuation module 1320. At step 1518, the translation data store update module 1326 may update a transformation or translation based on the response evaluation. As noted herein, upon evaluating a response and determine that it is approved, the translation data store update module 1326 may update a translation or transformation that correspond to the word or phrase of the query and the submitted query response.

Figure 16:
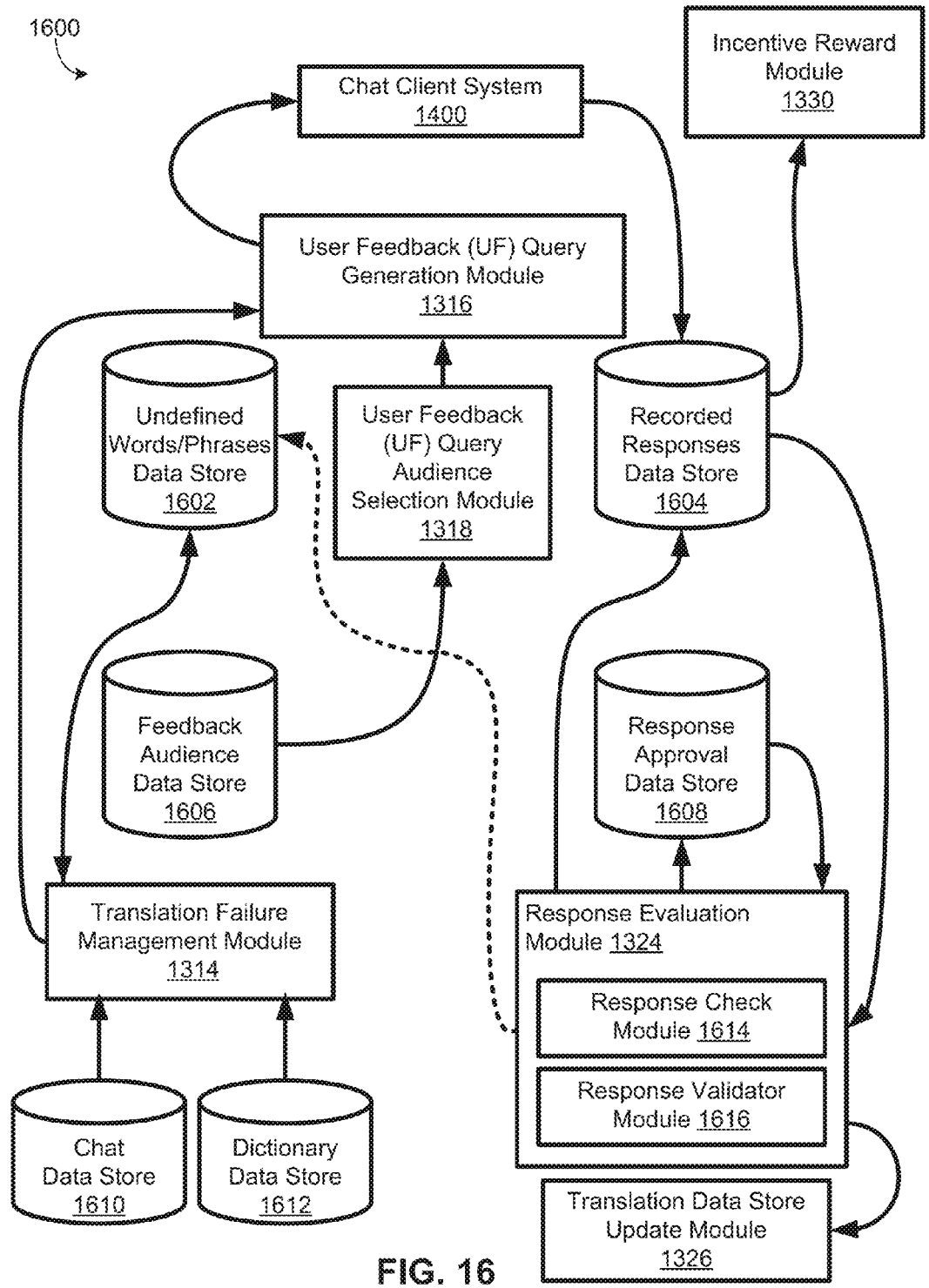
FIG. 16 is a block diagram illustrating an example data flow for a user feedback system, in accordance with various embodiments.

FIG. 16 is a block diagram illustrating an example data flow 1600 for a user feedback system in accordance with various embodiments. As shown, the data flow 1600 involve a chat client system 1400, a translation failure management module 1314, the UF query generation module 1316, the UF query audience selection module 1318, the response evaluation module 1324, the translation data store update module 1326, and the incentive reward module 1330. The data flow 1600 further involve an undefined words phrases data store 1602, a recorded responses data store 1604, a feedback audience data store 1606, a response approval data store 1608, a chat data store 1610, and a dictionary data store 1612.

The undefined words/phrases data store 1602 may comprise a word or phrase associated with a translation failure and for which user feedback is being sought. The undefined words/phrases data store 1602 may include, with the word or phrase, a sample sentence in which the word or phrase is used (e.g., word or phrase context), a confidence measure that indicates how important the word or phrase is (e.g., word importance), source language for the word or phrase, a target language for the user feedback sought, and the like. In some embodiments, the word importance of a word or phrase in the undefined words/phrases data store 1602 may initial equal for all words but gets increased as the word or phrase is encountered and problematic and/or untranslatable.

The recorded responses data store 1604 may comprise a user feedback response, received from an audience member and recorded for a word or phrase included in the undefined words/phrases data store 1602. In some embodiments, the user feedback response comprises a response received for a query generated to obtain user feedback with respect to the word or phrase. The undefined words/phrases data store 1602 may include, with the recorded user feedback response, an identifier for the audience member submitting the user feedback response, a timestamp for when the user feedback response was received and/or recorded, an indication of whether the recorded user feedback response is approved, a timestamp for when the recorded user feedback response is approved, and the like.

The feedback audience data store 1606 may comprise a set of identifiers for audience members that chosen to participate in user feedback for a word or phrase included in the undefined words/phrases data store 1602. The feedback audience data store 1606 may include, with each identifier for an audience member, a confidence score that reflects the consistency, competency, and/or confidence of the audience member in providing user feedback responses.

The response approval data store 1608 may comprise each unique user feedback response received in connection with a word or phrase included in the undefined words/phrases data store 1602. The response approval data store 1608 may include, with each unique user feedback response, an indication of whether the unique user feedback response is an approved response (e.g., correct response), a rejected response (e.g., incorrect response), a response pending review (e.g., response needing review), or a response having some other status. In some embodiments, the response approval data store 1608 may be employed in determining when a user feedback response received from an audience member and recorded in the recorded responses data store 1604 has been approved.

According to some embodiments, the translation failure management module 1314 may be configured to review chat logs, possibly provided by the chat data store 1610, and identify one or more words or phrases associated with actual or potential translation failures. In various embodiments, the translation failure management module 1314 may be configured to exclude those words, or phrases, defined in the dictionary data store 1512, which may comprise a standard dictionary (e.g., Oxford dictionary) and/or a dictionary of words or phrases (e.g., chatspeak words or phrases) that an embodiment described herein can parse, recognize, and/or handle. Words or phrases identified by the translation failure management module 1314 may be added to the undefined words/ phrases data store 1602, thereby enabling those added words and phrases to be selected for user feedback from select audience members.

The translation failure management module 1314 may be configured to select one or more words or phrases, possibly from the undefined words/phrases data store 1602, for user feedback. For some embodiments, the translation failure management module 1314 may select from a set of words or phrases designated as having the highest importance in the undefined words/phrases data store 1602 (e.g., selected from top 10 important words or phrases in the undefined words/ phrases data store 1602). In some embodiments, the translation failure management module 1314 may select two or more words or phrases so that an audience member can be provided with a set of two or more user feedbacks from which to choose to respond (e.g., enable the audience member to choose those user feedbacks to which they feel most confident responding). The selection process by the translation failure management module 1314 from the undefined words/phrases data store 1602 may be random, based on word or phrase importance, age of the word or phrase in the undefined words/phrases data store 1602, a preference of the selected audience member by the UF query audience selection module 1318, whether the audience member selected by the UF query audience selection module 1318 has already responded to the word or phrase to be selected (e.g., determine based on checking the recorded responses data store 1604 for the word or phrase to be selected), and the like.

The UF query audience selection module 1318 may be configured to select one or more audience members, possibly from the feedback audience data store 1606, from whom user feedback may be sought. As described herein, the user feedback may be sought for the words or phrases selected by the translation failure management module 1314, possibly from the chat data store 1610. The selection of an audience member from the feedback audience data store 1606 may be dependent on the competency level associated with the audience member.

The UF query generation module 1316 may be configured to generate one or more queries for the words or phrases selected by the translation failure management module 1314, possibly from the undefined words/phrases data store 1602, for user feedback. As shown, the translation failure management module 1314 may provide the UF query generation module 1316 with the selected words or phrases for which one or more queries are to be generated. As described herein, the UF query generation module 1316 may consider a number of different factors when generating the query including, for instance, the preferences of the audience members selected by the UF query audience selection module 1318 and the word or phrase selected for user feedback by the translation failure management module 1314. Eventually, the UF query generation module 1316 may provide the chat client system 1400 with the one or more queries generated by the UF query generation module 1316, which may have generated a different query for each word selected and provided by the translation failure management module 1314.

Eventually, the one or more queries generated by the UF query generation module 1316 may be provided to the chat client system 1400, which in turn would present the provided queries for selection by a user at the chat client system 1400. Depending on the embodiment, the UF query generation module 1316 may provide the generated queries to the chat client system or, alternatively, another component may be responsible for providing the generated queries to the chat client system. Once presented to the generated queries are presented for selection at the client chat system 1400, the user at the client chat system 1400 may choose to respond to one or more of the presented queries, and those responses provided by the chat client system 1400 may be added (e.g., recorded) to the recorded responses data store 1604.

When a response is added to the recorded responses data store 1604, some embodiments check the added response may be evaluated by the response evaluation module 1324. As described herein, the response evaluation module 1324 may evaluate of a response by check the response and disposition the status of a response.

As shown in FIG. 16, the response evaluation module 1324 comprises a response check module 1614, which may be configured to perform a status check of a user feedback response during evaluation of the user feedback response. The response check module 1614 may check the status of a user feedback response from the client chat system 1400 by retrieving the user feedback response from the recorded responses data store 1604 and checking the status of the unique response in the response approval data store 1608 that corresponds to the retrieved user feedback response. In doing so, the response check module 1614 can determine whether a given user feedback response is approved or rejected. The approval status of the retrieved user feedback response in the recorded responses data store 1604 may be updated according to the latest status check performed by the response check module 1614. Where the response check module 1614 determines that a retrieved user feedback response has been approved, the approval status of the retrieved user feedback response in the recorded responses data store 1604 may be updated to reflect the approval and to include a timestamp for when the approval status was updated. Eventually, the approval reflected in the recorded responses data store 1604 for the retrieved user feedback response may result in the incentive reward module 1330 rewarding an incentive to the audience member that submitted the approved user feedback response.

If the status of the retrieved translation response is still pending review, the response check module 1614 may re-check the status or the retrieved user feedback response at a later time (e.g., according to a predetermined schedule). If the status of the retrieved translation response is rejection, the approval status of the retrieved user feedback response in the recorded responses data store 1604 may be updated to reflect the rejection.

Where a unique response corresponding to the retrieved user feedback response is not found, the retrieved user feedback response can be added to the response approval data store 1608 as a unique response for the word or phrase for which the user feedback response was provided (e.g., by a user at the chat client system 1400). Additionally, where a retrieved user feedback response is added to the response approval data store 1608 as a unique response, the unique response may have the initial status of pending approval, which will remain until such time as the status of the unique response is manually or automatically dispositioned (e.g., through the evaluation response module 1324).

As shown in FIG. 16, the response evaluation module 1324 also comprises a response validator 1616, which may be configured to disposition the status a unique user feedback response as being approved, rejected, or pending approval. As described herein, a unique user feedback response, submitted in connection with a generated query to obtain user feedback, may be considered to be pending approval until such time as the unique user feedback response has been approved as being valid for the word, or phrase associated with the generated query or rejected as being invalid for the word or phrase associated with the generated query.

For some embodiments, the response evaluation module 1324 may be configured to determine when a given word or phrase no longer in need of additional user feedback. The response evaluation module 1324 may make such a determination based on such examples of factors as how many unique user feedback response have been approved for the given word or phrase, and whether the count of a unique and approved user feedback response has met or exceeded a specific threshold. When a given word or phrase is determined to longer need further user feedback, the response evaluation module 1324 may be configured to remove the given word or phrase from the undefined words/phrases data store 1602, thereby removing the word or phrase from future selection (e.g., by the translation failure management module 1314) for user feedback.

As described herein, the incentive reward module 1330 may reward an incentive to an audience member once a user feedback response they have provided has been approved as a valid response for the word or phrase for which the user feedback response was provided (e.g., by the audience member through the chat client system 1400). The incentive reward module 1330 may identify one or more user feedback responses, in the recorded responses data store 1604, that were recently approved (e.g., their approval status were recently updated to reflect the approval) and/or that were approved since the last time the incentive reward module 1330 attempted to identify one or more user feedback responses in the recorded responses data store 1604 having an approved status. The incentive reward module 1330 may determine when a given user feedback response was last approved based on the approval timestamp included for the user feedback response in the recorded responses data store 1604. For some embodiments, once an incentive is rewarded for a translated feedback response in the recorded responses data store 1604, the translated feedback response may be removed from the recorded responses data store 1604. Alternatively, once an incentive is rewarded for a translated feedback response in the recorded responses data store 1604, the translated feedback responses may be updated in the recorded responses data store 1604 to indicate, for instance, when an incentive has been rewarded, the amount of incentive rewarded, the type of incentive rewarded, when the audience member was notified of the reward and/or how the audience member was notified of the incentive reward.

Figure 17:
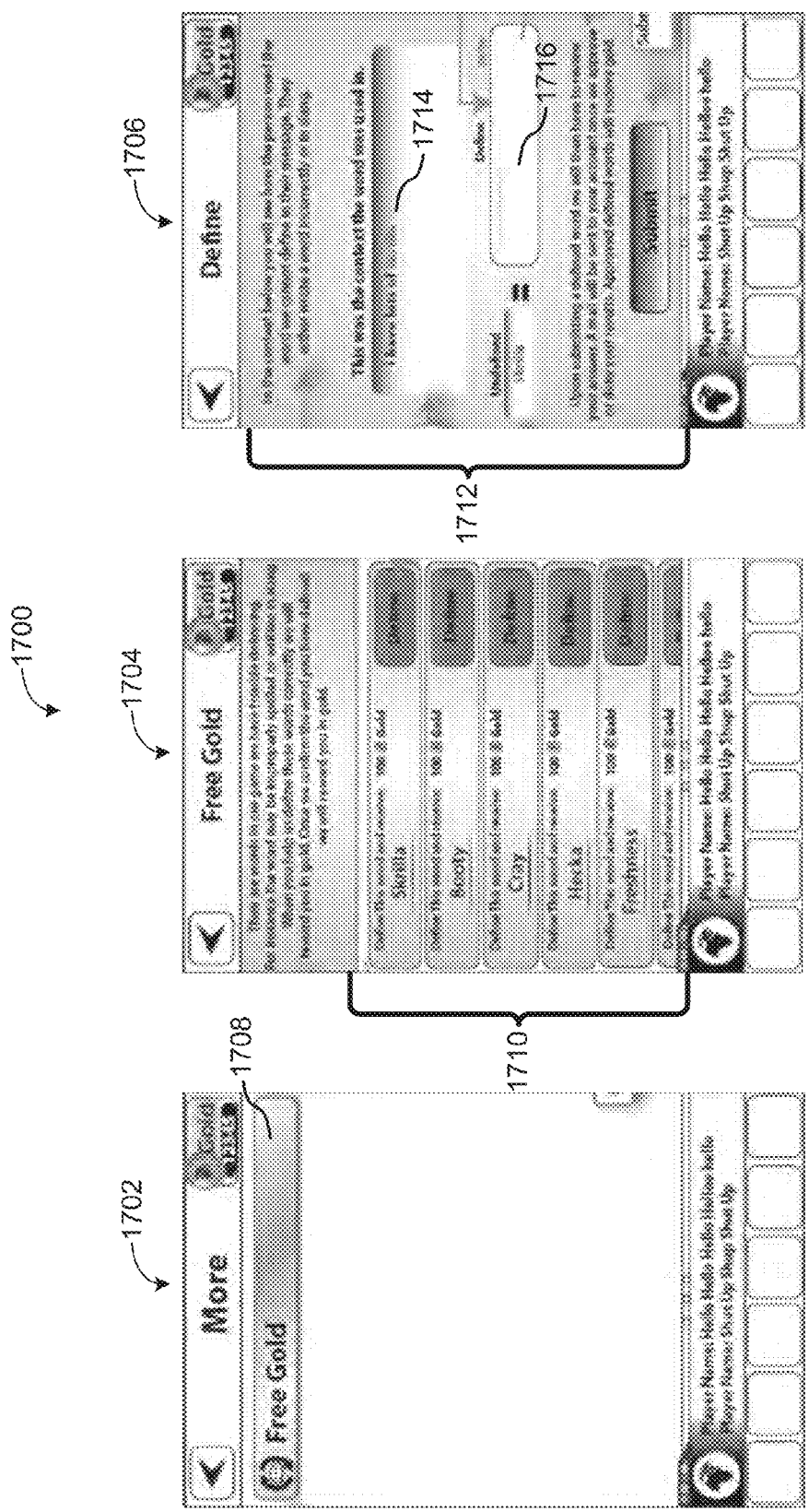
FIG. 17 depicts screenshots illustrating an example of receiving user feedback for a word, in accordance with various embodiments.

FIG. 17 depicts example screenshots for receiving user feedback for a word in accordance with various embodiments. In particular, FIG. 17 presents screenshots 1702, 1704, and 1706, which represent examples of GUIs that may be presented to an audience member (e.g., through the chat client system 1400) to facilitate user feedback processes. The screenshot 1702 presents an example of a banner 1708 that solicits one or more audience members to participate in a user feedback for a word or phrase associated with a translation failure. An audience member may choose to participate in user feedback by selecting the banner 1708, which may lead in the commencement of a user feedback session and/or lead the audience member to a listing of available user feedback opportunities from which the audience member can choose to participate. As described herein, a user feedback opportunity may permit an audience member to provide a definition for a word or phrase associated with an actual or potential translation failure. In accordance with some embodiments, the audience member can select one of the available user feedback opportunities associated with a word or phrase and, then, provide a definition for the associated word or phrase when prompted to do so.

The screenshot 1704 presents a listing 1710 of available user feedback opportunities for various words (e.g., "Skrilla," "Booty," "Cray," "Hecka," and "Freshness"). The screenshot 1706 provides an example of a query 1712 presented to an audience member to obtain user feedback for the word "Skrilla." As shown, the query 1721 provides an example context 1714 in which the word "Skrilla" is used, and also provides a field 1716 configured to receive a free-form response for the query 1712. An audience member may be led to the screenshot 1706 when the user feedback for the word "Skrilla" is selected by the audience member from the listing 1710 of screenshot 1704.

Figure 18:
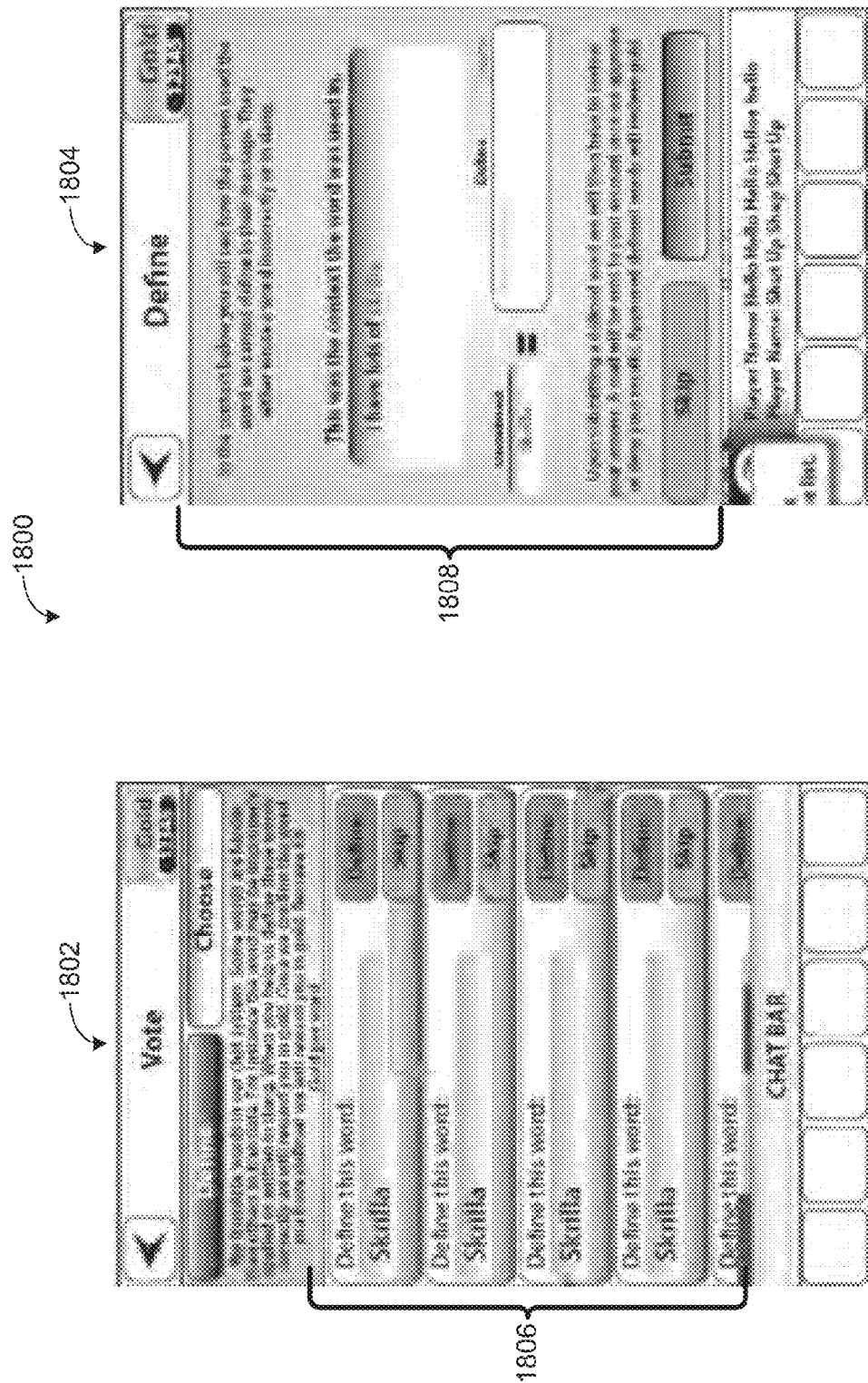
FIG. 18 depicts screenshots illustrating an example of skipping user feedback, in accordance with various embodiments.

FIG. 18 depicts example screenshots for skipping user feedback in accordance with various embodiments. In particular, FIG. 18 presents screenshots 1801 and 1804, which represent examples of GUIs that may be presented to an audience member (e.g., through the chat client system 1400) to facilitate user feedback processes. The screenshot 1802 presents a listing 1806 of user feedback opportunities available for selection by an audience member. As shown, the listing 1806 provides an audience member with the option to skip one or more of the user feedback opportunities listed.

The screenshot 1804 presents an example of a query 1808 presented to an audience member to obtain user feedback for the various words. As shown, the query 1808 provides an audience member with the option to skip the process of providing a response to the query 1808. Certain embodiments may avoid inaccurate and/or fabricated responses to various user feedback queries by providing an audience member with the option to skip certain user feedback opportunities and/or various user feedback queries.

Figure 19:
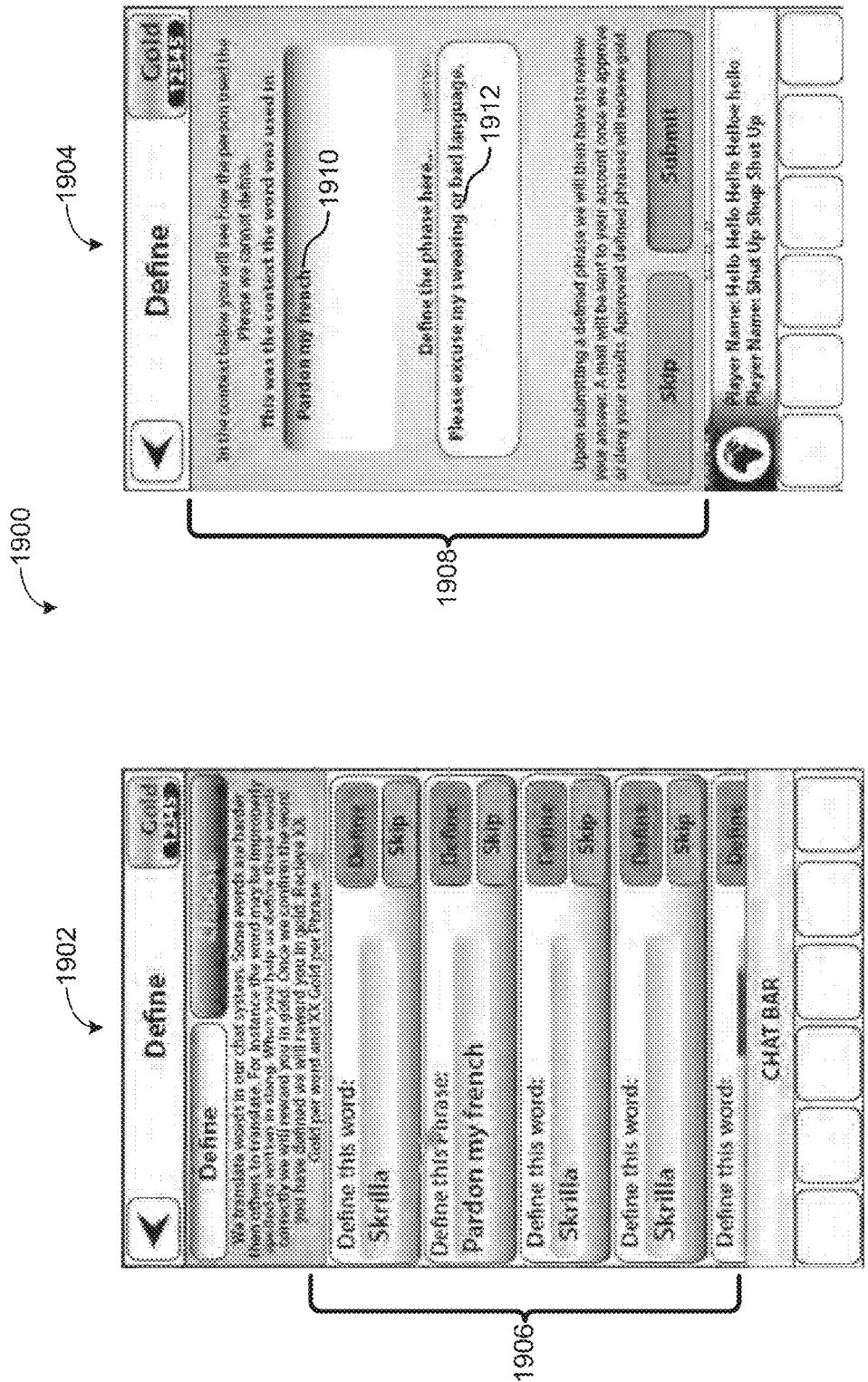
FIG. 19 depicts screenshots illustrating an example of receiving user feedback for a phrase, in accordance with various embodiments.

FIG. 19 depicts example screenshots for receiving user feedback for a phrase in accordance with various embodiments. In particular, FIG. 19 presents screenshots 1902 and 1904, which represent examples of GUIs that may be presented to an audience member (e.g., through the chat client system 1400) to facilitate user feedback processes. The screenshot 1902 presents a listing 1906 of user feedback opportunities available for selection by an audience member. As shown, the listing 1906 of available user feedback opportunities for various words and phrases (e.g., "Skrilla," and "Pardon my french").

The screenshot 1904 provides an example of a query 1908 presented to an audience member to obtain user feedback for the phrase "Pardon my french." As shown, the query 1908 provides an example context 1910 in which the phrase "Pardon my french" is used, and also provides a field 1912 configured to receive a free-form response for the query 1910. An audience member may be led to the screenshot 1904 when the user feedback for the phrase "Pardon my french" is selected by the audience member from the listing 1906 of screenshot 1902.

Figure 20:
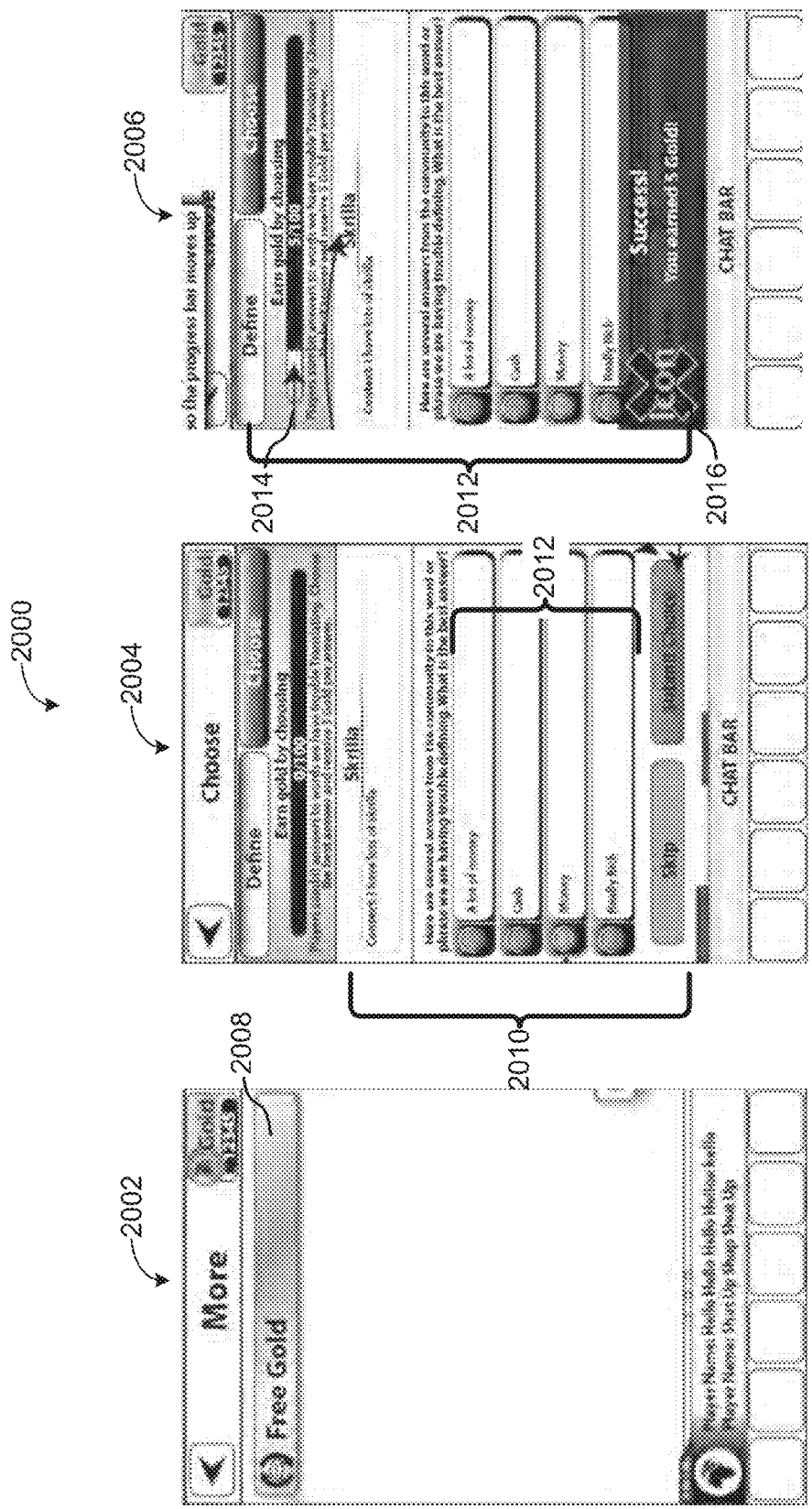
FIG. 20 depicts screenshots illustrating an example of receiving user feedback through a listing of elect-form responses, in accordance with various embodiments.

FIG. 20 depicts example screenshots for receiving user feedback through a listing of select-form responses in accordance with various embodiments. In particular, FIG. 20 presents screenshots 2002, 2004, and 2006, which represent examples of GUIs that may be presented to an audience member (e.g., through the chat client system 1400) to facilitate user feedback processes. The screenshot 2002 presents an example of a banner 2008 that solicits one or more audience members to participate in a user feedback for a word or phrase associated with a translation failure. An audience member may choose to participate in user feedback by selecting the banner 2008, which may lead in the commencement of a user feedback session and/or lead the audience member to a listing of available user feedback opportunities from which the audience member can choose to participate.

The screenshot 2004 provides an example of a query 2010 presented to an audience member to obtain user feedback for the word "Skrilla." Included with the query 2010 is a select-form responses 2012, which lists possible responses from which an audience member can select. The screenshot 2006 presents an incentive (e.g., 5 gold coins) being rewarded by notifications 2014 and 2016 once a correct response "money" is selected for the word "Skrilla."

Figure 21:
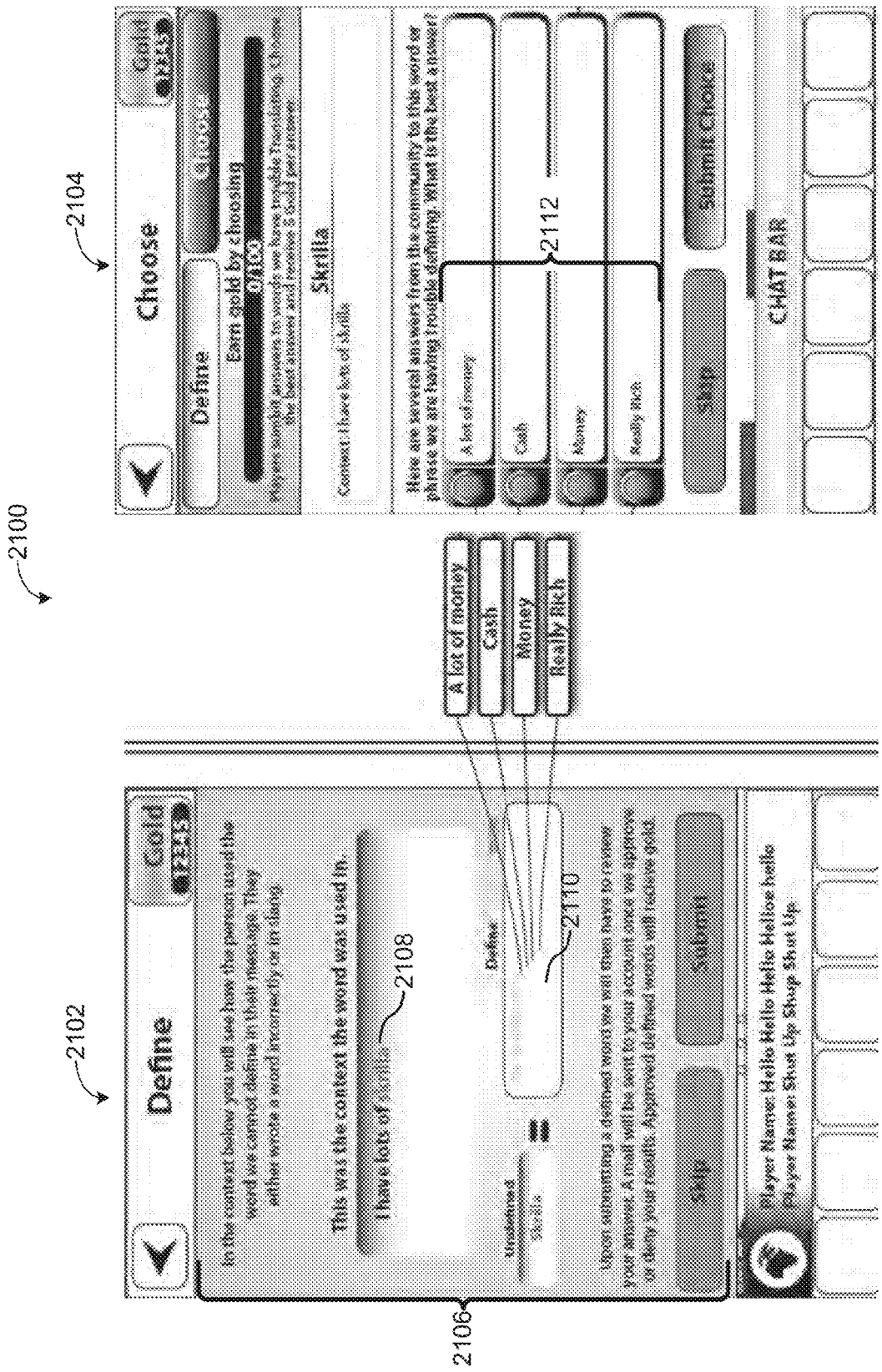
FIG. 21 depicts screenshots illustrating an example of creating a listing of select form responses, in accordance with various embodiments.

FIG. 21 depicts example screenshots for creating a listing of selections in accordance with various embodiments. In FIG. 21, a screenshot 2102 provides an example of a query 2106 presented to an audience member to obtain user feedback for the word "Skrilla." As shown, the query 2106 provides an example context 2108 in which the word "Skrilla" is used, and also provides a field 2110 configured to receive a free-form response for the query 2106.

According to some embodiments, a select-form response method, used to obtain user feedback for a given word or phrase, may comprise a listing of predefined responses selected from free-form responses gathered for the given word or phrase. Accordingly, as various audience members provide free-form responses for the word "Skrilla" through the field 2110 (e.g., "A lot of money," "Cash," "Money," and "Really Rich"), the response collected may be useful in creating a listing of select-form responses 2112, as shown in the screenshot 2104.

Figure 22:
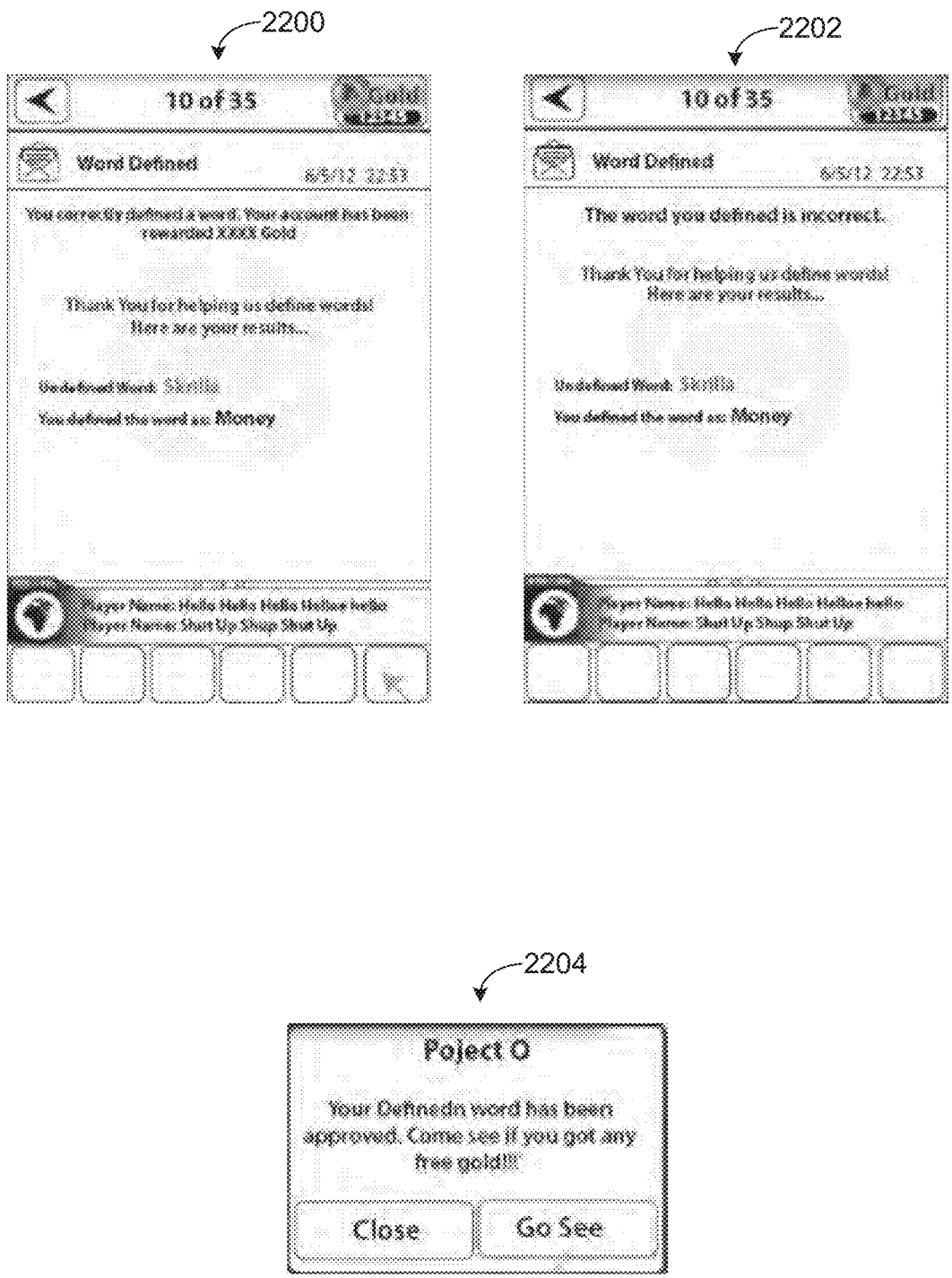
FIG. 22 depicts screenshots illustrating example incentive notifications, in accordance with various embodiments.

FIG. 22 depicts screenshots illustrating example incentive notifications in accordance with various embodiments. In FIG. 22, a screenshot 2200 presents an example of a notification to an audience member notifying them of the approval of their response of "money" for the word "Skrilla," and notify them of an incentive rewarded for the approved response (e.g., XXXX Gold). A screenshot 2202 presents an example of a notification to an audience member notifying them of the rejection of their response of "money" for the word "Skrilla." The screenshot 2204 presents an example of a push notification to an audience member notifying them of the approval of their response.

Figure 23:
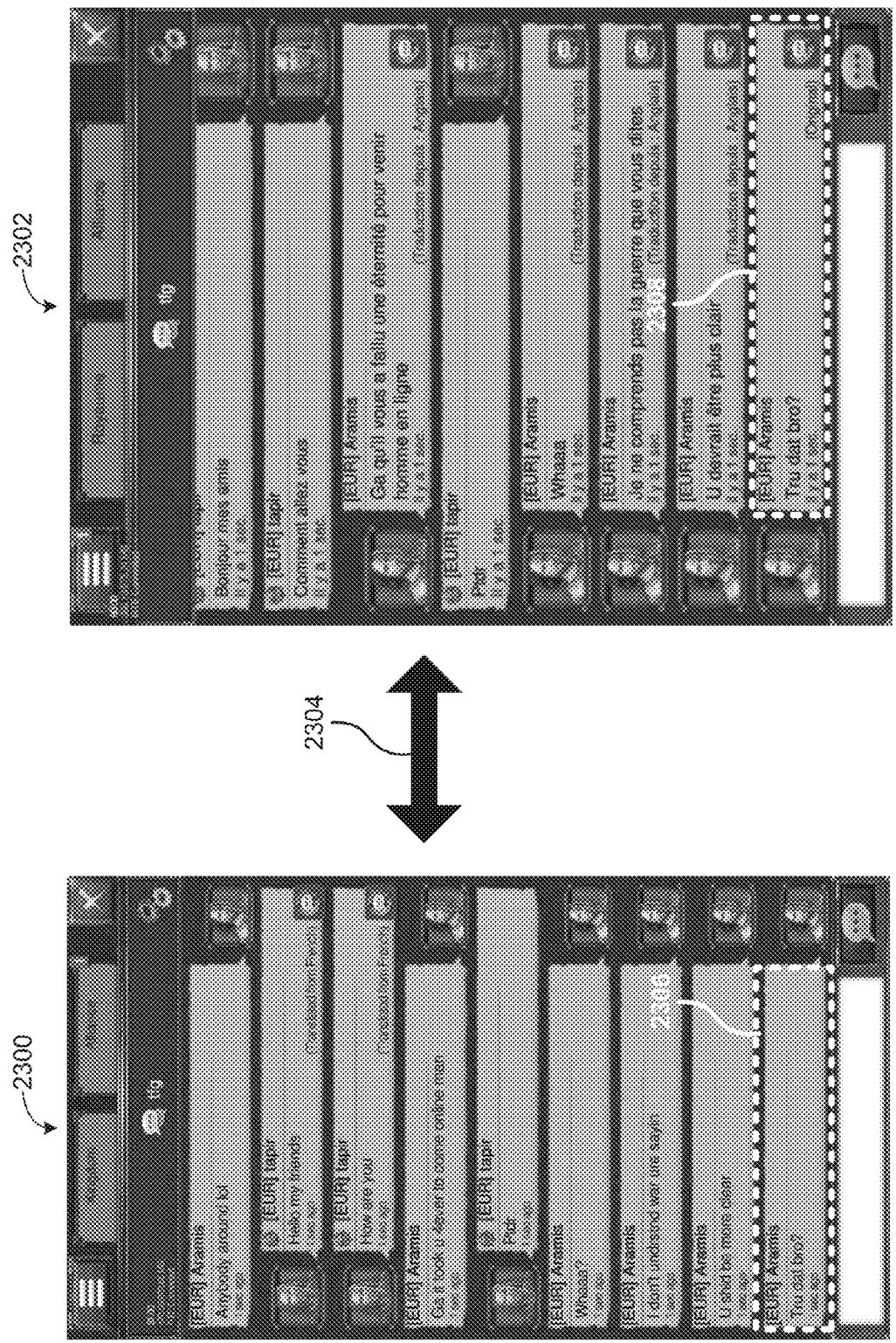
FIG. 23 depicts screenshots illustrating an example of when a translation has failed between client chat systems, in accordance with various embodiments.

FIG. 23 depicts screenshots illustrating an example of when a translation has failed between client chat systems in accordance with various embodiments. In FIG. 23, a screenshot 2300 represents an example interface of a first chat client system and a screenshot 2302 representing an example interface of a second chat client system. A double arrow 2304 represents chat communications between the first and second chat client systems. As shown, as chat user "Aramis" enters chat communications into the interface of the first chat client system in English, the entered chat communications is translated to French and presented on the interface of the second chat client system of chat user "tapir." Likewise, as chat user "tapir" enters chat communications into the interface of the second chat client system in French, the entered chat communications is translated to English and presented on the interface of the first chat client system of chat user "Aramis."

As shown in FIG. 23, chat communication 2306 (i.e., "Tru dat bro?") entered by chat user "Aramis" in the interface of the first chat client system fails to translate when it is sent to the interface of the second chat client system of chat user "tapir." The chat communication 2308 (i.e., "Tru dat bro?") presented to chat user "tapir" reflects this translation failure, by presenting the original chat communication entered by chat user "Aramis" and indicating to chat user "tapir" that the chat communication is the original chat message entered by chat user "Aramis."

The translation failure illustrated by FIG. 23 may be one that can benefit from user feedback in accordance with some embodiments. In accordance with some embodiments, the translation failure illustrated in FIG. 23 may be identified by the translation failure management module 1314 and one or more words from the original chat communication 2306 (i.e., "Tru dat bro?") may be added to the undefined words/phrases data store 1602 for future selection for user feedback from participating audience members. For example, each of words "Tru," "dat," and "bro" may be added to the undefined words/phrases data store 1602 for future user feedback of each.

Figure 24:
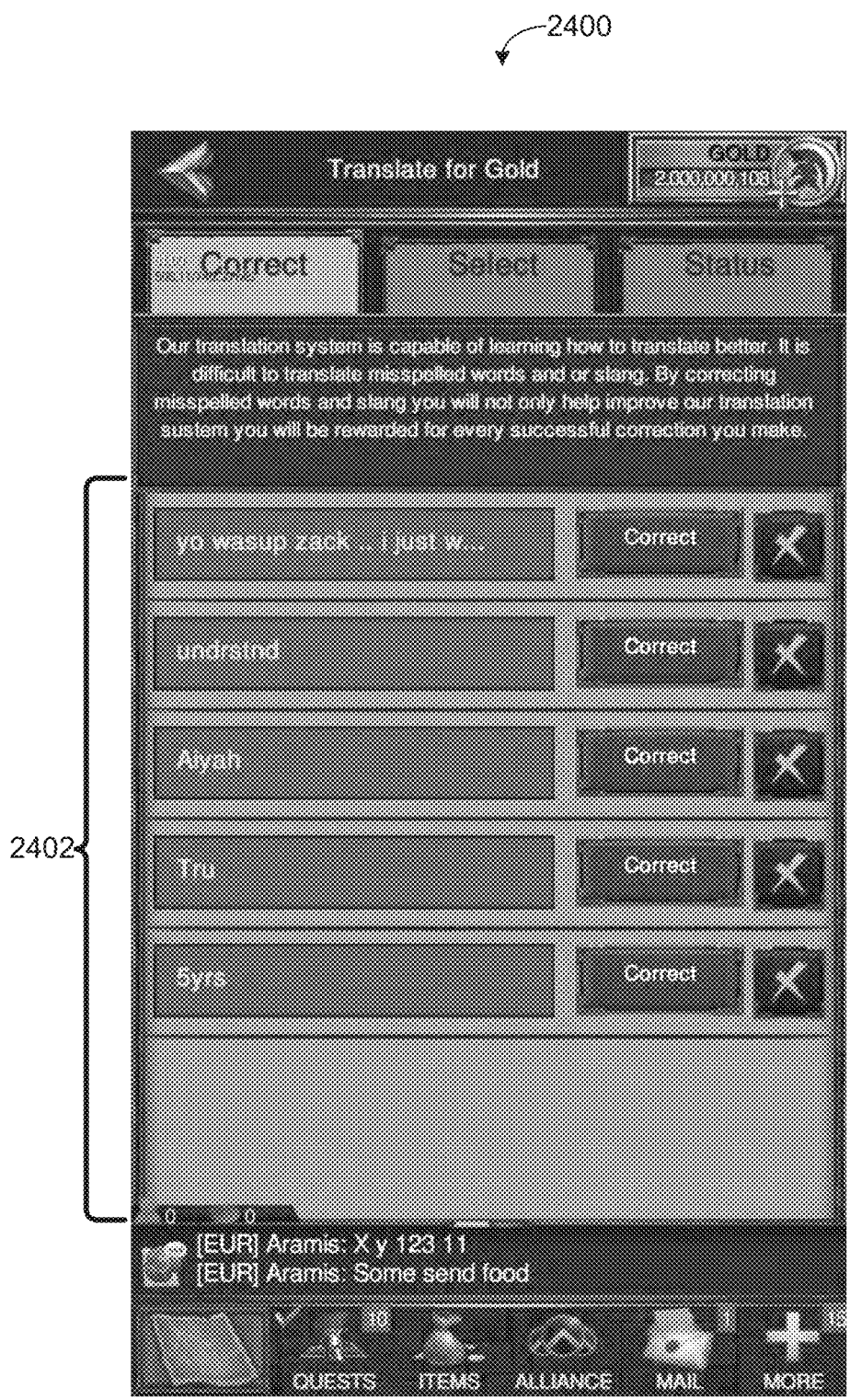
FIGS. 24 and 25 depict screenshots illustrating example listings of words or phrases available for user feedback, in accordance with various embodiments.
Figure 25:
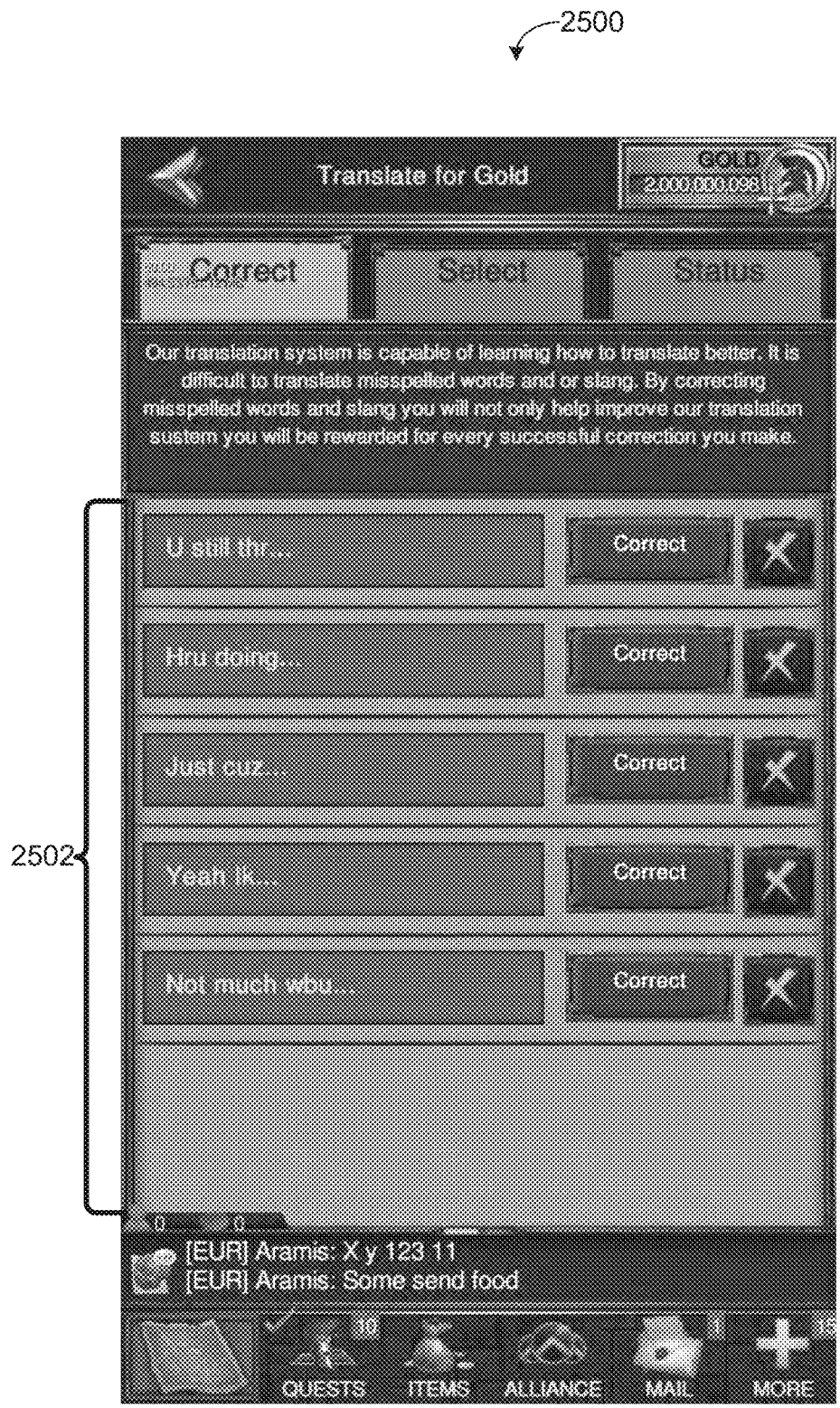

FIGS. 24 and 25 depict screenshots illustrating example listings of words or phrases available for user feedback in accordance with various embodiments. In FIG. 24, a screenshot 2400 presents a listing 2402 of user feedback opportunities, available for audience member selection, for words and phrases (including "Tru"), which are available for selection by an audience member. In FIG. 25, a screenshot 2500 presents another listing 2402 of user feedback opportunities, available for audience member selection, for phrases available for selection by an audience member. In both FIGS. 24 and 25, the screenshots 2400 and 2500 may be part of an in-game chat system, whereby game players can provide user feedback for certain words or phrases and, upon approval of the feedback response, in-game credit (e.g., in-game gold) may be awarded.

Figure 26:
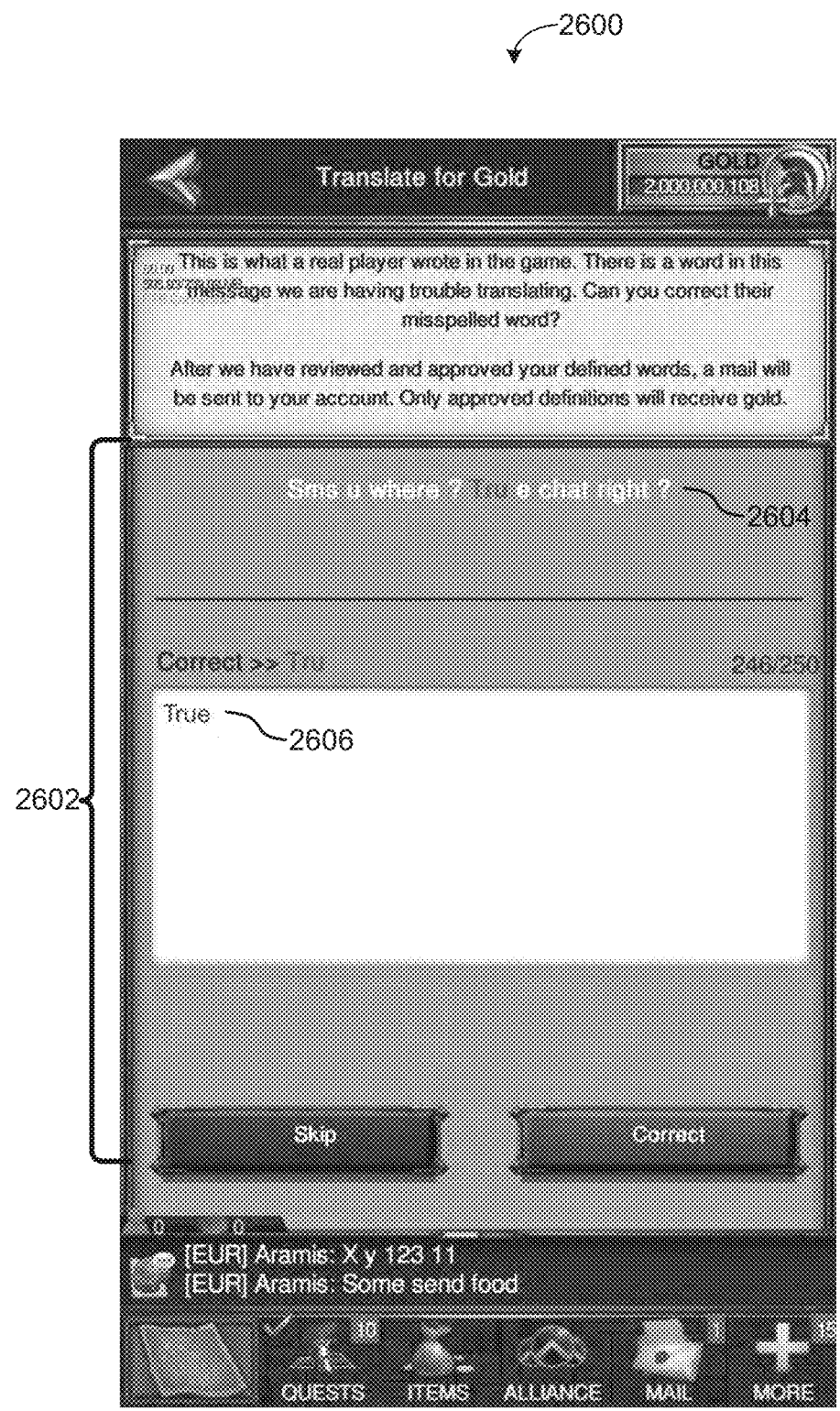
FIG. 26 depicts a screenshot illustrating an example of defining a word, in accordance with various embodiments.

FIG. 26 depicts a screenshot illustrating an example of defining a word in accordance with various embodiments. In FIG. 26, the screenshot 2600 presents a query 2602 that includes an example context 2604 in which the word "Tru" is used, and also provides a field 2606 configured to receive a free-form response for the query 2602.

Figure 27:
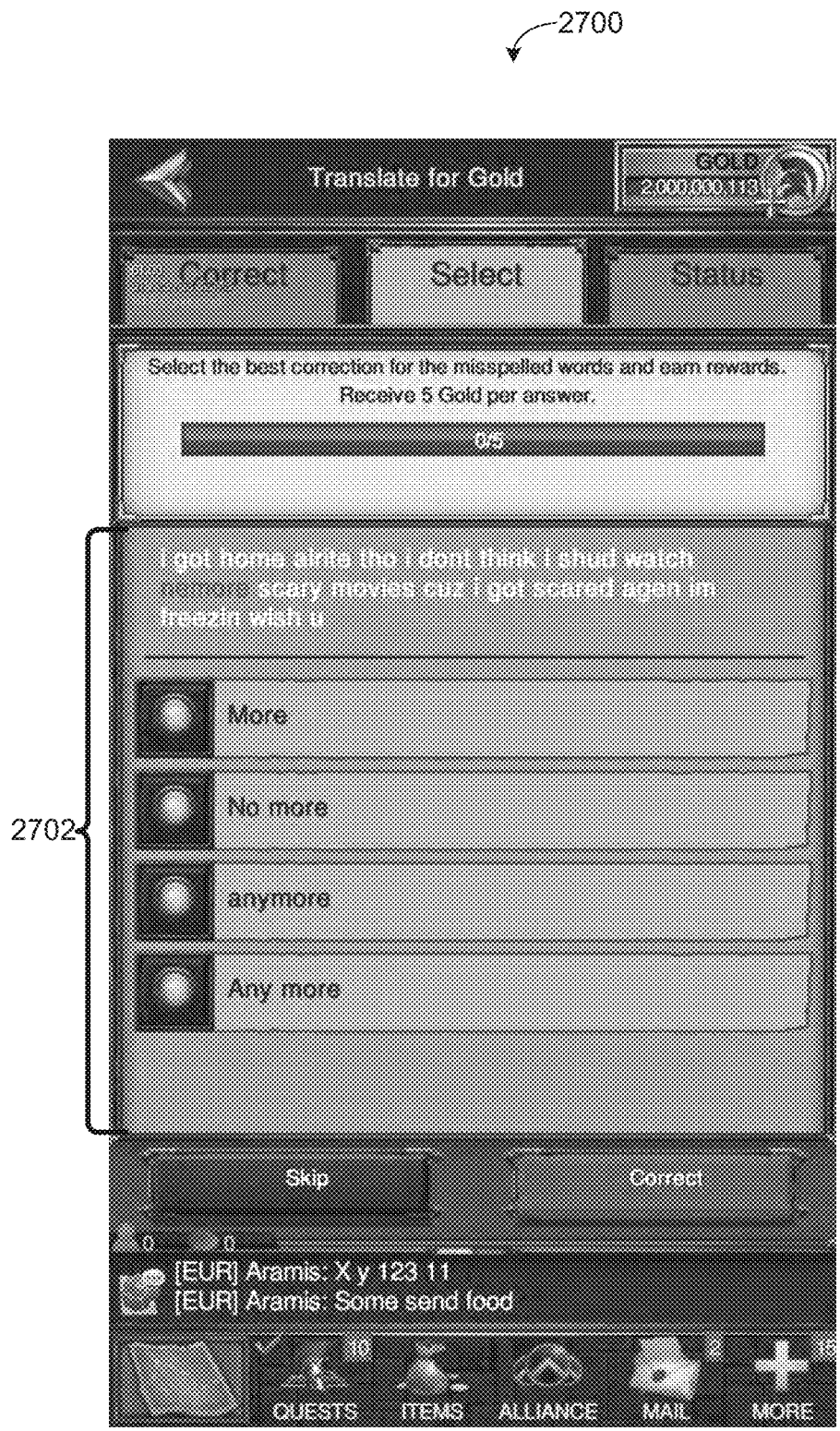
FIG. 27 depicts a screenshot illustrating an example listing of select-form responses, in accordance with various embodiments.

FIG. 27 depicts a screenshot illustrating an example listing of select-form responses in accordance with various embodiments. In FIG. 27, the screenshot 2700 presents a listing 2702 of responses that an audience member can select to define the word "nomore."

Figure 28:
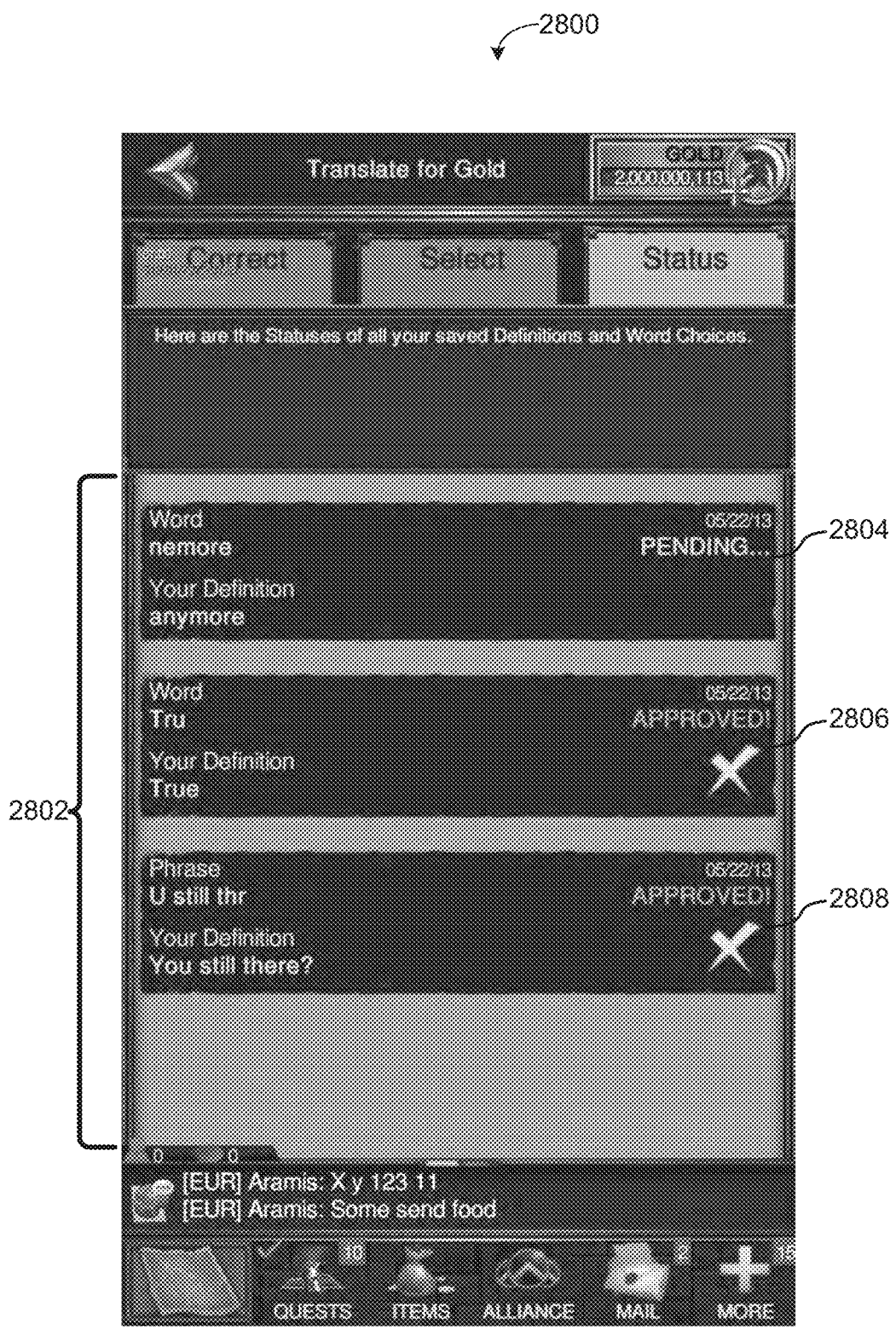
FIG. 28 depicts screenshot illustrating an example listing of statuses for responses submitted, in accordance with various embodiments.

FIG. 28 depicts a screenshot illustrating an example listing of statuses for responses submitted in accordance with various embodiments. As shown in FIG. 28, a listing 2802 of submitted response statuses includes a pending status for a first response 2804, and approved statuses for the second and third responses 2806 and 2808. For some embodiments, the list 2802 may provide further information for response statuses including, for instance, why a particular response has been approved, rejected, or still pending review.

Figure 29:
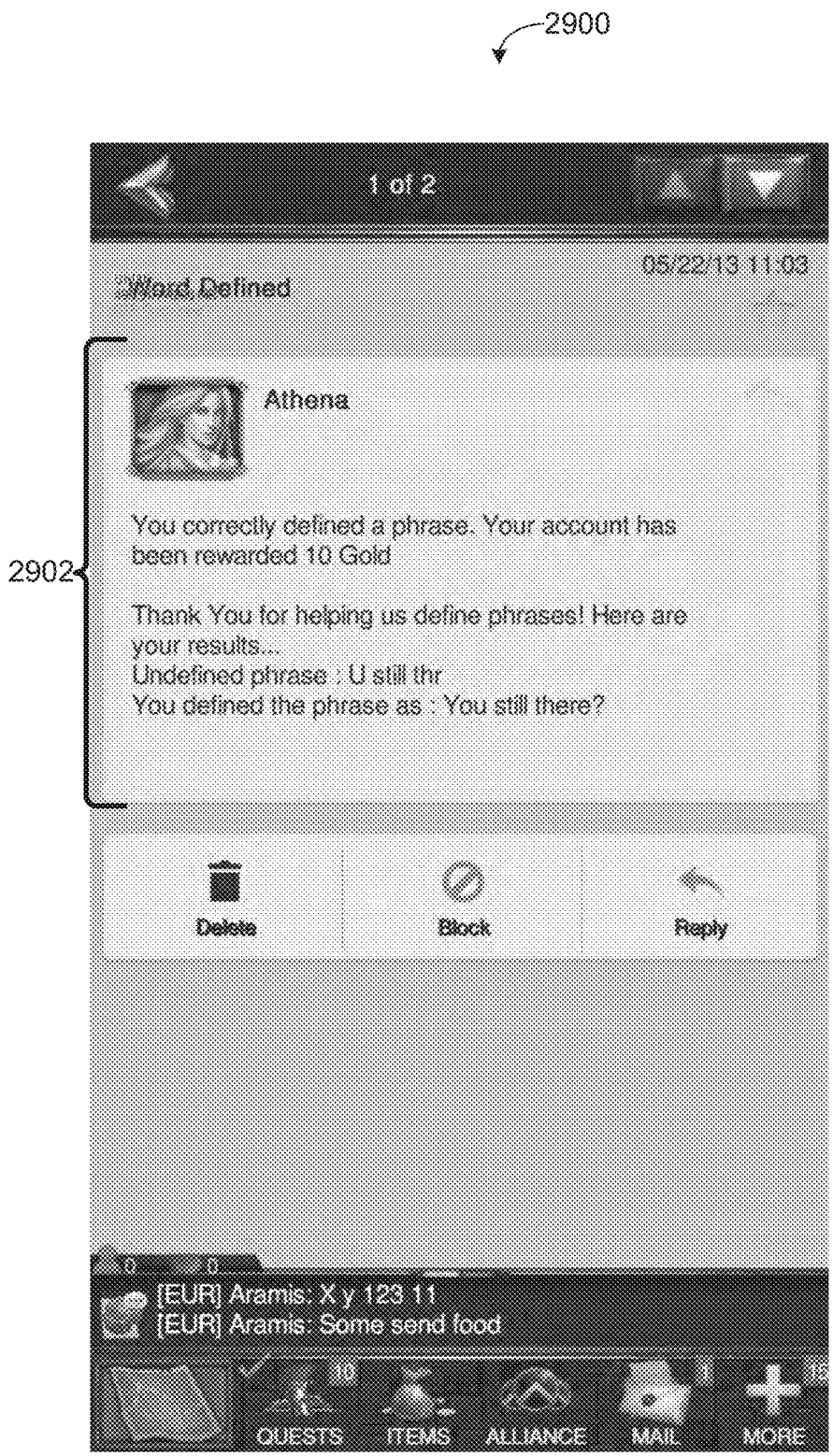
FIG. 29 depicts a screenshot illustrating an example incentive notification, in accordance with various embodiments.

FIG. 29 depicts a screenshot illustrating an example incentive notification in accordance with various embodiments. In particular, FIG. 29 provides a screenshot 2900 that presents an example notification 2902 to a member for correctly defining the phrase "U still thr" as "You still there?" during a user feedback process in accordance with an embodiment. The notification indicates that as an incentive for the user feedback provided, he or she will be rewarded with 10 gold pieces, which may be of value or useful in as in-game currency. As shown, the notification also provides a summary of the user feedback (i.e., the word or phrase in question and the user feedback response provided).

In certain embodiments, a learning system for data selection is provided in which feedback obtained from users is automated by a machine learning system that has checks and balances for player consistency. The system adds parallel sentences received from players to parallel corpora which can be used to retrain the statistical machine translation (SMT) systems from time to time.

A chat transformation system may be or include a system that transforms chatspeak to plain speak. For example the chat transformation may transform "U r da king" (a chatspeak message) to "You are the king" (a plain speak message). In certain embodiments, "plain speak" refers to ordinary language spoken and/or written by ordinary individuals, usually outside of the electronic chat environment where chatspeak may predominate. Plain speak tends to be more grammatical than chatspeak.

The learning system may also utilize or include a language translation system that translates one language to another. For example, the language translation may translate "How are you doing kind sir" (an English message) to "Como te va amable señor?" (a Spanish message).

In some embodiments, "parallel corpora" is understood to mean two texts, one in each language aligned in parallel such that line n in one text corresponds to line n in the second translated text. Parallel corpora may also be referred to as "training corpora" in such contexts.

In various embodiments, "machine learning" is understood to refer to a supervised, semi-supervised or unsupervised system that can learn from patterns in input data and develop mechanisms to detect, transform, or predict behaviour.

In general, building chat transformation systems and language translation systems requires a moderate amount of syntactic rules or a large amount of parallel corpora for statistical learning. The systems and methods described herein generally utilize reliable statistical chat transformation and language translation systems that use parallel corpora. In certain situations, however, this initial training data set may be limited in its content and scope. For example, new chat words are created and added to chat rooms each day. To maintain accurate and reliable transformation and translation systems, these new chat words should be augmented into the chat transformation training corpora.

Figure 30:
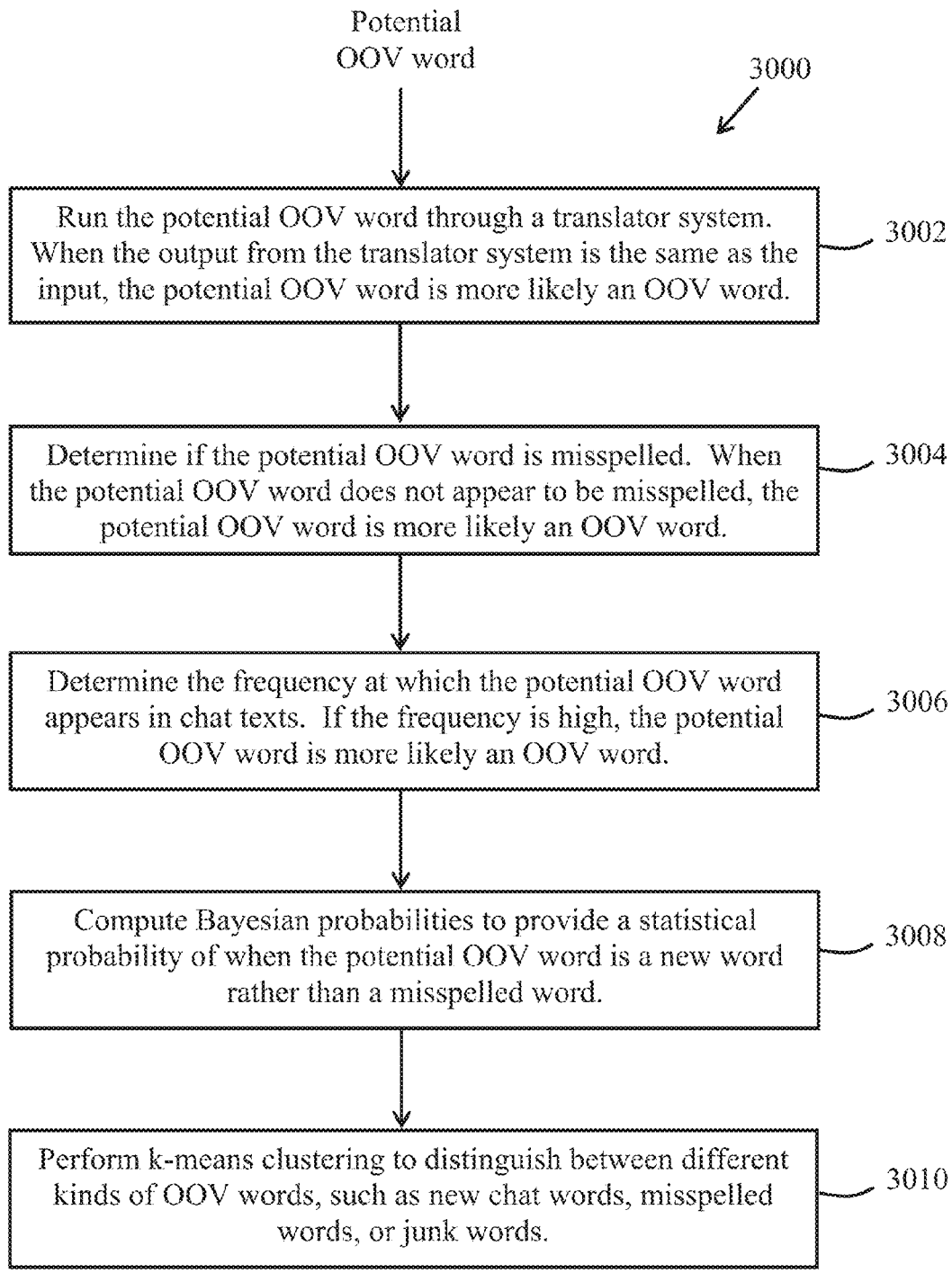
FIG. 30 is a flowchart for a method of detecting undecipherable phrases in a language corpus, in accordance with various embodiments.

In various embodiments, systems and methods are provided for identifying words that are "Out of Vocabulary" (OOV) (e.g., words that are not present in a given lexicon). Referring to FIG. 30, in some embodiments, a method 3000 is provided for detecting and processing OOV words. At step 3002, the OVV words are initially detected by sending them through a translator system, such as the CTT system 114 or the CTT system 1300 and/or one or more modules thereof. When the output from the translator system is same as the input for a given word, the translator system indicates a lack of transformability, which, suggests the word may be OOV. To further evaluate the word as a potential OOV word, the systems and methods may determine (step 3004) whether the word is a new word as opposed to just a misspelled word, both of which will appear as OOV. Accordingly, words that can be corrected with a spell checker may be considered to be misspelled words, rather than OOV words.

Additionally, OOV words that frequently appear in chats generally have a higher propensity of being an OOV word (e.g., a new chat speak word). For example, when a word has been used by users in prior text messages, such prior use suggests the word is likely an OOV word. In some embodiments, an ensemble of machine learning and language processing methods is used in parallel to detect whether a word is an OOV word (step 3006).

Additionally or alternatively, Bayesian probabilities may be computed (step 3008) to provide a statistical probability of when an OOV is a new word, rather than a misspelled word. A genuine chatspeak word tends to follow certain words commonly used prior and post the chatspeak word. A spelling error in comparison will have a less consistent distribution of neighboring words. Computing the prior and posterior Bayesian probabilities will help distinguish useful OOV words which could be added to a lexicon, from spelling errors which should not be added to a lexicon. For example, consider the phrase "Wassup, how's it going." "Wassup" is considered an OOV word as it is not present in standard lexicon. But "Wassup" is almost always followed by the words "How's it going" or is often used at the beginning of the sentence. This pattern or consistent behavior is captured by Bayesian probabilities. The system may be trained on texts that have misspelled words but no chat words.

Alternatively or additionally, machine learning methods such as k-means clustering may be used to distinguish (step 3010) between different kinds of OOV words, such as new chat words, misspelled words, or junk. K-means clustering tends to bring out latent similarities between classes of words. Words belonging to a similar topic tend to be clustered together indicating a latent synonymous relationship between them. Consider the example of "Wassup, how's it going" again. Clustering a group of sentences using the k-means algorithm, reveals a cluster of greeting words such as "Hi," "What's up," "Hello," "Hi!," etc., with "Wassup" included among them, within the cluster. A spelling error, by contrast, would be placed in the fringes of clusters or not in any defined cluster at all. These latent relationships help distinguish useful OOV words from errors. The syntax and semantics of a sentence may be analyzed to determine what kind of OOV word the sentence includes (e.g., a verb, noun, or adjective).

When the systems and methods detect a new chat word or other OOV word, the new chat word may be presented to a human translator to define a chat transformed or language translated version of the new chat word. The transformed or translated version of the new chat word may then be added to the translation lexicon and used by the systems and methods described herein.

As described herein, when an incentive is provided for manual translation of chats between languages, there is potential for users to frequently manipulate the system to take advantage of the incentive (e.g., in-game currency). The systems and methods described herein are generally tolerant to human-translator abilities yet able to detect fraudulent submissions.

When a user of the system acts as a translator, the user translates one or more words or sentences into the target language specified. The user commits fraud, however, when the user gives a false, incomplete, or improper translation for the sake of gaming the system or for gaining incentive without fulfilling the purpose of the system.

Figure 31A:
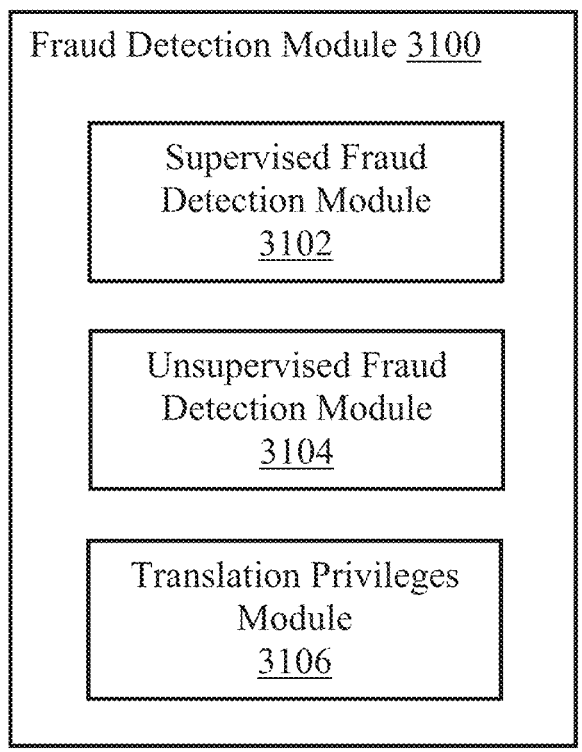
FIG. 31A is a schematic diagram of a fraud detection module, in accordance with various embodiments.

Referring to FIG. 31A, in certain embodiments, the systems and methods described herein utilize a fraud detection module 3100. The fraud detection module 3100 detects fraud in incentivized translations by presenting users with both new and old training data (e.g., parallel corpora). Old training data corresponds to translations for which the correct answers are known, while new training data corresponds to translations for which the correct answers are not known. The percentage of new to old data may be varied to a user over time. For example, more old data may be presented initially and then decreased in percentage gradually.

In some embodiments, fraud detection is done by checking the accuracy of old data translations received from users. A confidence score is assigned to each user based on this accuracy. Large or sudden shifts in translation accuracies or consistently low accuracies are indicative of fraud or low translation capabilities in a user. Even after establishing confidence in the capabilities of a translator, old data is preferably seeded randomly, at least 10-20% of the time for periodic fraud checking.

Using this basic structure, the fraud detection module 3100 may include and/or utilize a supervised fraud detection module 3102 and/or an unsupervised fraud detection module 3104. With the supervised fraud detection module 3102, a reporting tool may present the output from each user in, for example, a user interface with the following fields: input sentence presented, translation obtained, existing known to be true translation, current confidence score of the user, and a graph showing the variation of the translator's confidence score over time. When reviewing a translation, a human supervisor may accept or reject the translation, and may adjust the user's confidence score accordingly. The supervisor may remove the user (i.e., revoke the user's translation privileges) if cumulative reports show fraudulent behavior. Removal of the user or revocation of the user's translation privileges may be performed using a translation privileges module 3106.

Alternatively or additionally, the fraud detection module 3100 may utilize the unsupervised fraud detection module 3104. With the unsupervised fraud detection module 3104, the accuracy of translation may be computed using various metrics, such as WER (word error rate) and BLEU (machine translation accuracy metric that compares machine translations with good quality reference translations). Confidence in user translation abilities may be checked for changes or variations (e.g., upswings or downswings). Similar sentences presented to one translator may be presented to other independent translators who use the system. Inter-translator reliabilities may also be computed. For example, collusion may be avoided between translators through random sampling, social network analysis (e.g., to confirm two translators are not connected socially or do not have a pre-existing relationship), and be detecting repeated interactions among users in chat sessions and/or online gaming. Two users who regularly interact together online (e.g., in an online game or chat session) may be more likely to engage in collision. In some embodiments, item response theory (i.e., a theory used in psycholinguistics and testing theory) is used to augment measurement of translator confidence with translator ability. Fraud detection may be performed using item response theory to do unsupervised fraud detection in a translation augmentation system, which has an incentive mechanism. Item response theory dictates ways in which the translator accuracy can be measured relative to peers and to themselves over a period of time, to measure consistency. Deviations from the norm may be identified with this method. Intra-translator reliabilities may also be computed by presenting the same sentence to a translator again after a set period of time. Various threshold in reliabilities and translator confidences may be set and, if a translator's confidence falls below such thresholds, the translator may be removed and blocked from the system (e.g., the user's translation privileges may be revoked), using the translation privileges module 3106. In some implementations, translations from high confidence systems are added to the translation pair lexicons.

Figure 31B:
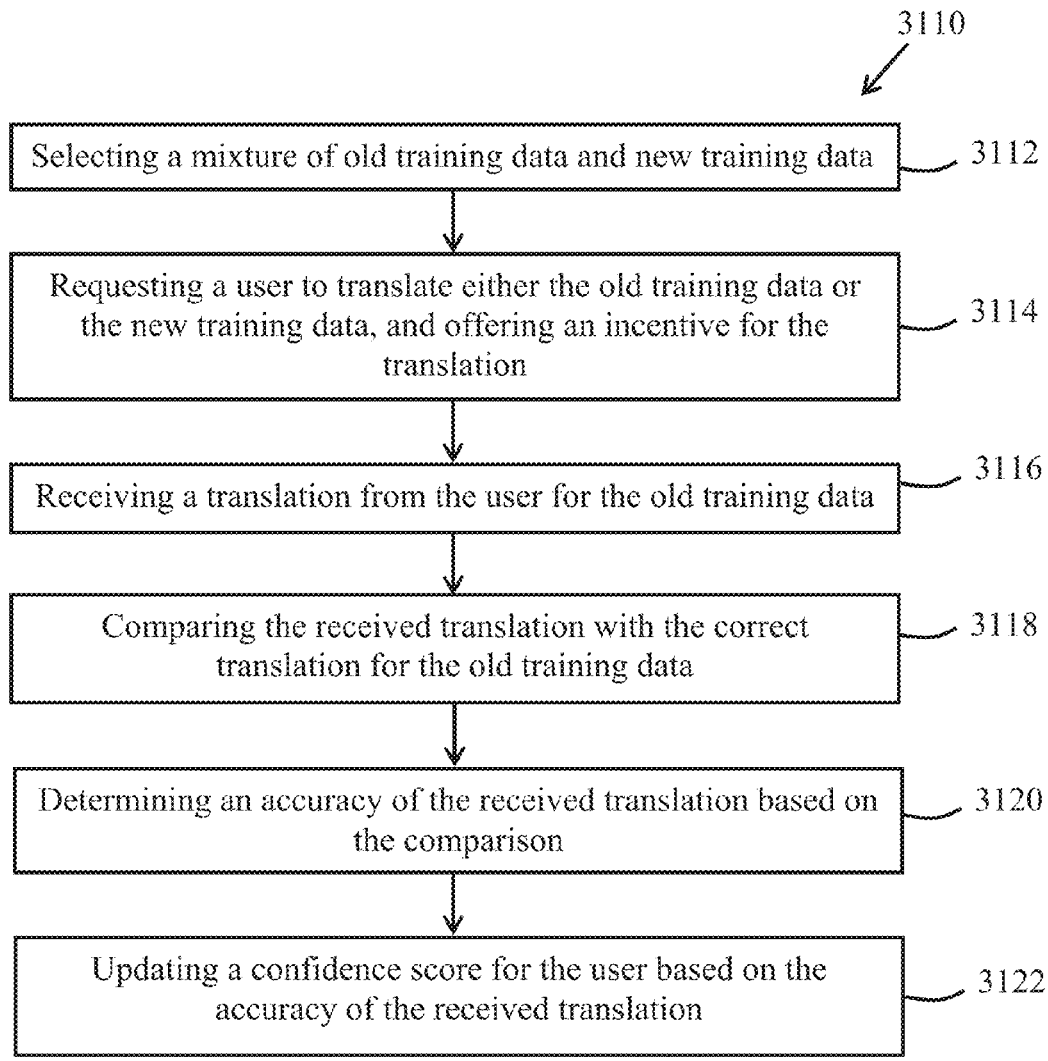
FIG. 31B is a flowchart of a method of detecting fraud in incentivized translations, in accordance with various embodiments.

FIG. 31B includes a flowchart of a method 3110 of detecting fraud in incentivized translations in accordance with certain embodiments of the invention. The method includes selecting (step 3112) a mixture of old training data and new training data. The old training data includes one or more old text messages for which correct translations to a different language are known. The new training data includes or more new text messages for which correct translations to the different language are not known. A plurality of respective requests are sent (step 3114) at different times to a client device of a user. The requests include (i) a request for the user to translate the old training data and/or the new training data and (ii) an incentive for the translation. After sending a particular request, a translation is received (step 3116) from the client device for the old training data of the particular request. The received translation is compared (step 3118) with the correct translation for the old training data. An accuracy of the received translation is determined (step 3120) based on the comparison. Next, a confidence score is updated (step 3122) for the user, based on the translation. The confidence score represents a likelihood that the user will provide an accurate translation of a text message to the different language at a later time.

In various embodiments, the systems and methods described herein utilize voice translation or voice recognition technology to translate audible speech in one language to another language for users of a group voice chat system. The systems and methods may be implemented for chatspeak in which a speech-to-text transcribing system transcribes user chatspeak into text, this text is then transformed to plain speak (e.g., non-chatspeak) and translated to a foreign language. A final transformation is then done to produce foreign chat speak which is then outputted to the end user through a foreign language text-to-speech system. The systems and methods preferably sue state of the art speech recognition techniques and statistical machine translation techniques with extremely fast decoders.

Figure 32:
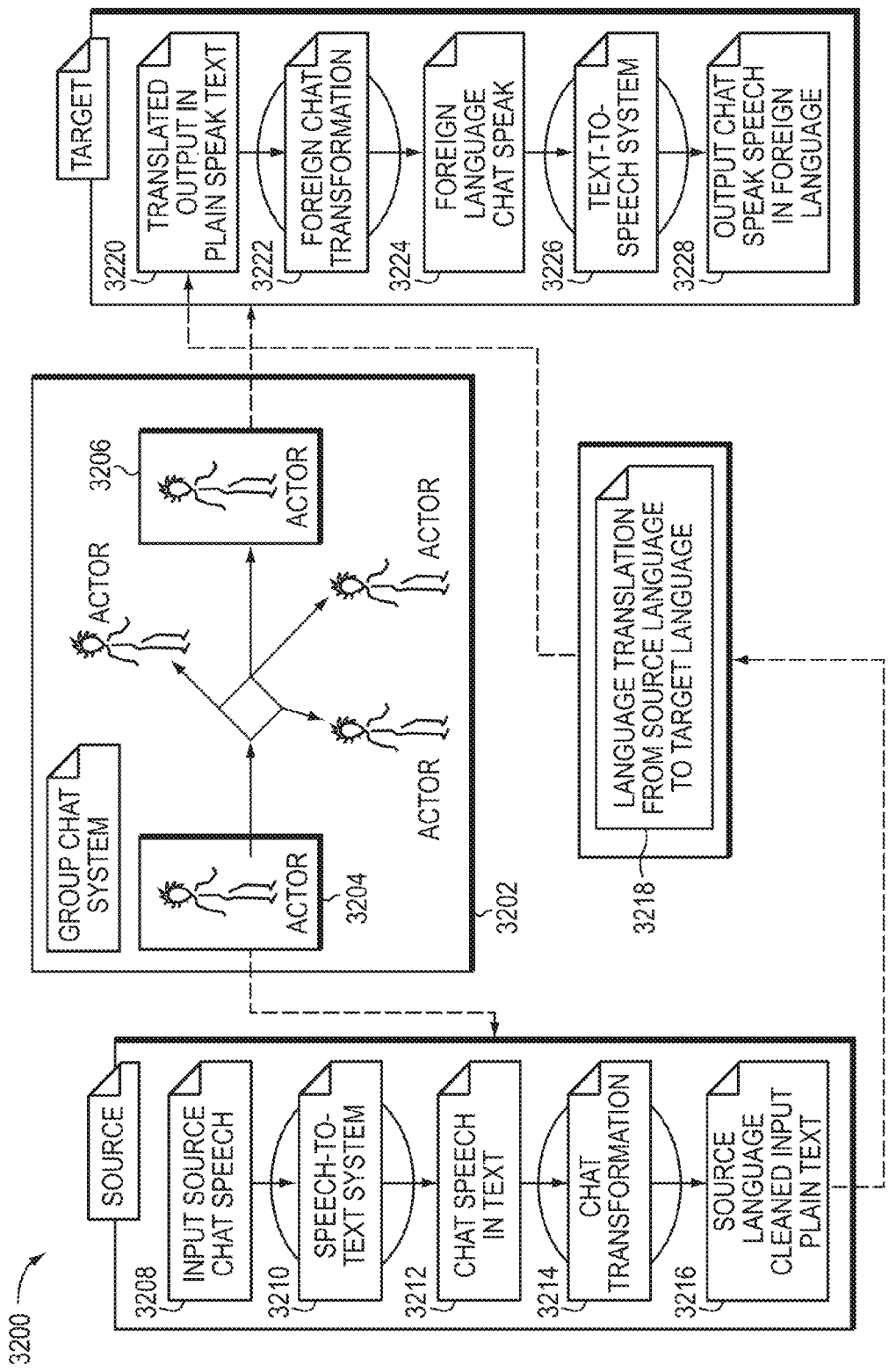
FIG. 32 is a schematic diagram of a system for performing speech-to-text transcription and translation in a group chat environment, in accordance with various embodiments.

FIG. 32 is a schematic diagram of a group chat system 3200 that allows a group of people 3202 who speak different languages to interact verbally using chatspeak. As described herein, the system 3200 is able to identify the languages spoken by the people participating in the group chat system 3200. When a first user 3204 wishes to send an audible chatspeak message to a second user 3206, the first user 3204 inputs an audible chatspeak message 3208 in a first language (e.g., English) to a user input device (e.g., a microphone in a chat client system). A speech recognition module 3210 converts the audible chatspeak message to a chatspeak text message 3212 in the first language. A transformation module 3214 is used to transform the chatspeak text message 3212 to a plain speak (e.g., non-chatspeak) text message 3216 in the first language. Next, a translation module 3218 is sued to translate the plain speak text message 3216 to a corresponding plain speak text message 3220 in the second language (e.g., French). A transformation module 3222 is then used to transform the corresponding plain speak text message 3220 to a corresponding chatspeak text message 3224 in the second language. As one of ordinary skill in the art will recognize, the transformation module 3222 may be the same as or form part of the transformation module 3214. A text-to-speech module 3226 is then used to convert the corresponding chatspeak text message 3224 to a corresponding chatspeak audible message 3228 in the second language. Finally, the corresponding chatspeak audible message 3228 is delivered to the second user 3206 using an output device (e.g., a speaker on a second chat client system).

In various embodiments, the speech recognition module 3210 may utilize hidden Markov models, dynamic time warping (DTW)-based speech recognition, and/or neural networks to convert the audible chatspeak text message 3208 to the chatspeak text message 3212. Likewise, the text-to-speech module 3226 may use speech synthesis to convert the corresponding chatspeak message into the corresponding chatspeak audible message. The speech synthesis may utilize or include concatenative synthesis (e.g., unit selection synthesis, diphone synthesis, and/or domain-specific synthesis), formant synthesis, articulatory synthesis, HMM-based synthesis, and/or sinewave synthesis, as understood by those of ordinary skill in the art.

An important aspect of creating such a speech processing system involves collecting speech samples from multiple accents and dialects for languages that may be processed. The nature of the speech data may include chatspeak and plain speak formats of each language, so as to maintain relevance of the system to the domain the system addresses. The incentivized feedback mechanism described herein may be used to transcribe these speech samples, which may in turn be used to train the speech recognition module 3210 and/or the text-to-speech module 3226. Domain adaptation techniques may be used to substitute data points where sparse. This may be needed in the case of chatspeak speech samples where data tends to be sparse. For example, speech data collected in a game domain (e.g., for an online game) can be substituted with plain speak data that is abundantly available. Domain adaptation preferably includes identifying rules that govern minor speech variations from chat-plain speak in a given language (e.g., rules that govern the conversion from chatspeak to plain speak or from plain speak to chatspeak, in the given language). A plain speak sentence, which does not have speech samples in the chatspeak equivalent, can then be converted to chatspeak using these domain level rules. A user feedback loop may be used to tune the acoustic model parameters (e.g., for the speech recognition module 3210 and/or the text-to-speech module 3226) to a level that makes the acoustic model domain specific and hence more accurate. For example, when the speech recognition module 3210 consistently has difficulty with a particular accent, additional audible samples of various words may be provided (e.g., by users) to the system in that accent. This will help the speech recognition module 3210 learn how to better recognize words spoken with the accent.

As mentioned, embodiments of the systems and methods described herein are used to translate text or chat messages from a group chat environment into different languages. Archiving such translated chats may lead to a very large number of texts in different languages to be persisted into a repository.

Figure 33A:
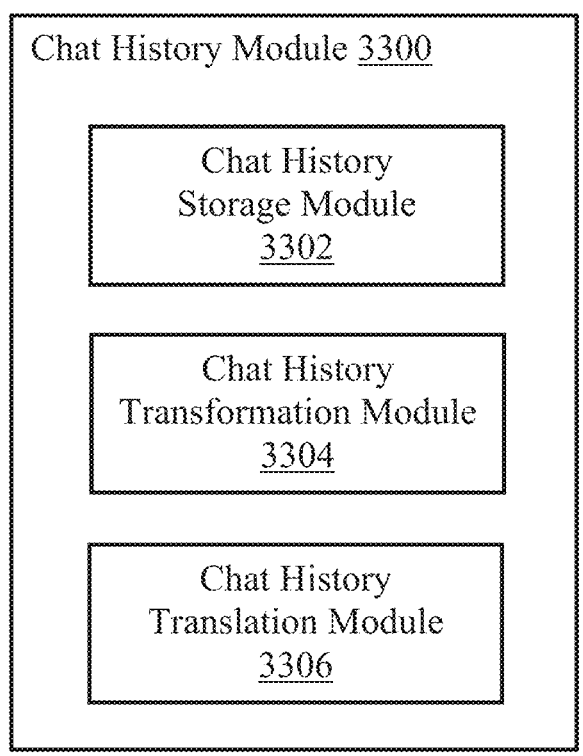
FIG. 33A is a schematic diagram of a chat history module for transforming and/or translating chat histories, in accordance with various embodiments.

Referring to FIG. 33A, in certain embodiments, to reduce storage requirements and facilitate review of chat histories by users, a chat history module 3300 is used to translate chat histories in real-time as the chat histories are browsed by users. The chat history module 3300 includes a chat storage module 3302 (e.g., a register or other storage device) for storing chat histories from the various users. The chat history module 3300 also includes a chat history transformation module 3304 that transforms a text message before and/or after the text message is translated to a different language. For example, the chat history transformation module 3304 may perform a real-time transformation of a chat history text message from chatspeak to formal speak or plain speak. In some embodiments, the chat history transformation module 3304 is the same as or similar to the transformation module 208. The chat history module 3300 also includes a chat history translation module 3306, which may be used to perform a real-time translation of a chat history text message (e.g., in formal speak or plain speak) to a different language (e.g., from French to English). The chat history translation module 3306 may be or include other modules or components described herein, such as the language module 206 and/or the translation data store 210.

Once the user is done reviewing a chat history, any transformed and/or translated text generated by the chat history module 3300 may be deleted or removed from memory. This reduces storage requirements for the systems and methods. If the user wishes to review the chat history at a later time, the chat history module 3300 may be used again to transform and translate the text in the chat history, as required.

In certain embodiments, the chat history module 3300 translates a chat history for a user in real-time. The chat history module 3300 receives a request from a user to review a history of text messages from a chat session. The chat history module 3300 receives, from the chat history storage module 3302, the history of text messages, which includes text messages in a plurality of languages. The chat history transformation module 3304 and the chat history translation module 3306 are then used to transform and/or translate an initial portion of the chat history, as required, into a language used by the user. After viewing the translated first portion of the chat history, the user may wish to view a different portion of the chat history. The chat history module 3300 may then receive a request from the user to view the different portion of the history of text messages. The chat history transformation module 3304 and the chat history translation module 3306 are then used to transform and/or translate the different portion of the chat history, as required, into a language used by the user. The chat history module 3300 preferably performs the transformations and/or translations in real-time, as the user scrolls through the chat history.

In certain instances, scrolling through chat history presents a problem of scale and data storage. Offering infinite scrolling of chat history, presents a problem of fast real-time access of data spanning multiple databases and multiple users. This may be done by spawning multiple processes in parallel that fetch historical messages from all users present in a chat room. Translation and associated chat transformations on these messages may be done in parallel, as the messages are fetched from the data storage. The resultant output realized by the end user is that of a seamless transition from one screen of chats to the next, where data lookup from the database has already been done. This can go on for an infinite number of screens, as the systems and methods described herein may have no limitations on data storage and parallel computation may be recycled between processes that were spawned earlier.

Figure 33B:
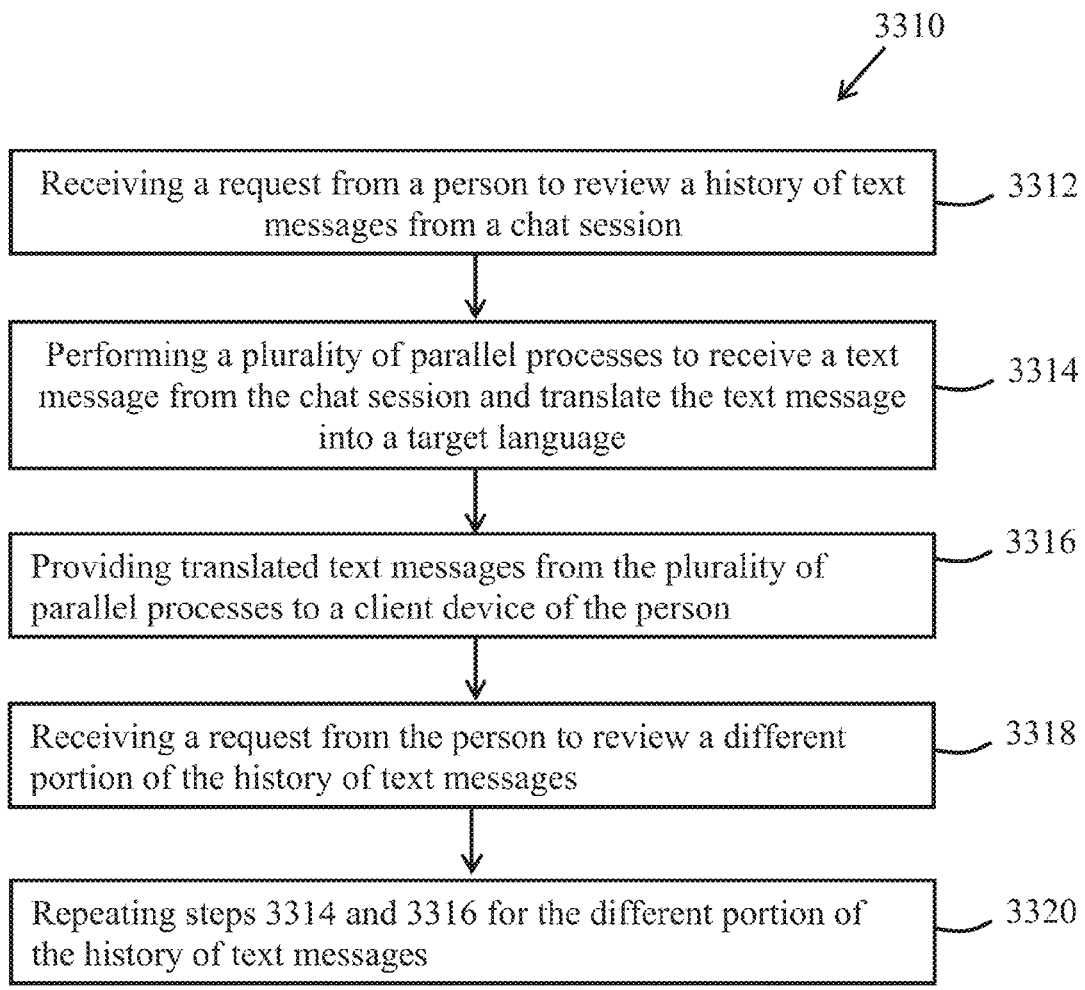
FIG. 33B is a flowchart of a method of transforming and/or translating chat histories, in accordance with various embodiments.

FIG. 33B is a flowchart of a method 3310 of translating chat histories in real-time, in accordance with certain embodiments of the invention. The method 3310 includes receiving (step 3312) a request from a person to review a history of text messages from a chat session. The history preferably includes text messages in a plurality of languages and from a plurality of users. At least two parallel processes are performed (step 3314). Each parallel process includes (i) receiving or selecting a text message generated by a respective user of the chat session (i.e., the text message forming at least part of the history of text messages), and (ii) translating the text message into a target language. Translated text messages from the plurality of parallel processes are provided (step 3316) to a client device of the person. A request is received (step 3318) from the person to review a different portion of the history of text messages. Steps 3314 and 3316 are repeated for the different portion of the history of text messages.

In some instances, users of the systems and methods described herein may wish to avoid interacting with certain other users in group chat or gaming environments. In previous chat systems, the banning and silencing of chat users is typically dealt with by administrators or moderators of a chat server. Embodiments of the systems and methods described herein, however, allow users to have direct control over who is able to send the users chat messages and/or chat contact invitations. For example user A may be allowed to block user B, so that user A no longer sees communications from user B in any chat room, and/or user A no longer receives personal chat contact (i.e., single chat) invitations from user B.

In various implementations, an alliance is a group of players in a game (e.g., a multiplayer online game) who can group together as a unit to enhance gameplay. Each alliance preferably has a chat room for itself where members of the alliance can talk or send text messages to one another. This presents a need to block certain users from an alliance chat room at times.

Figure 34A:
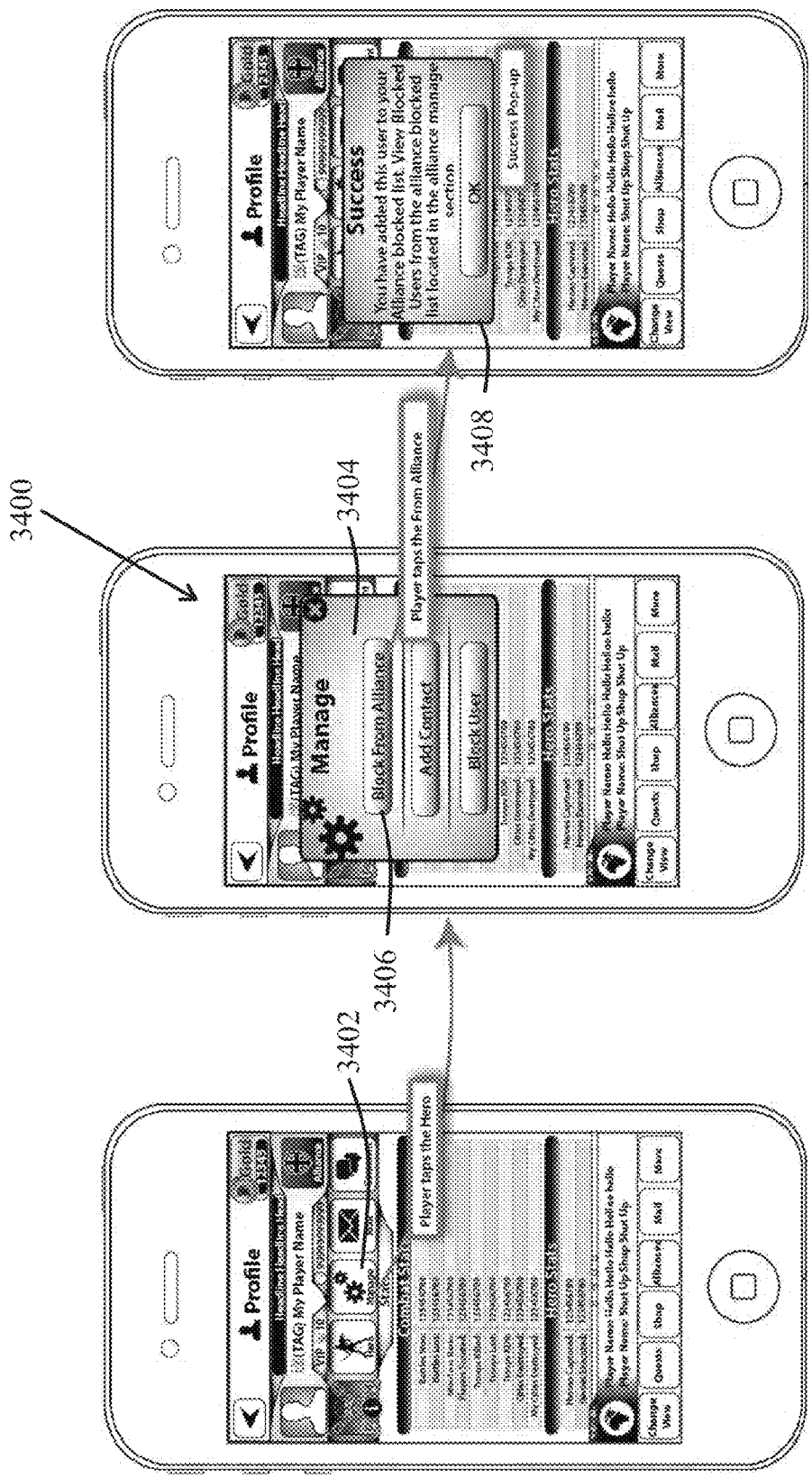
FIG. 34A includes screenshots of a user interface for blocking one or more users of a chat session, in accordance with various embodiments.
Figure 34B:
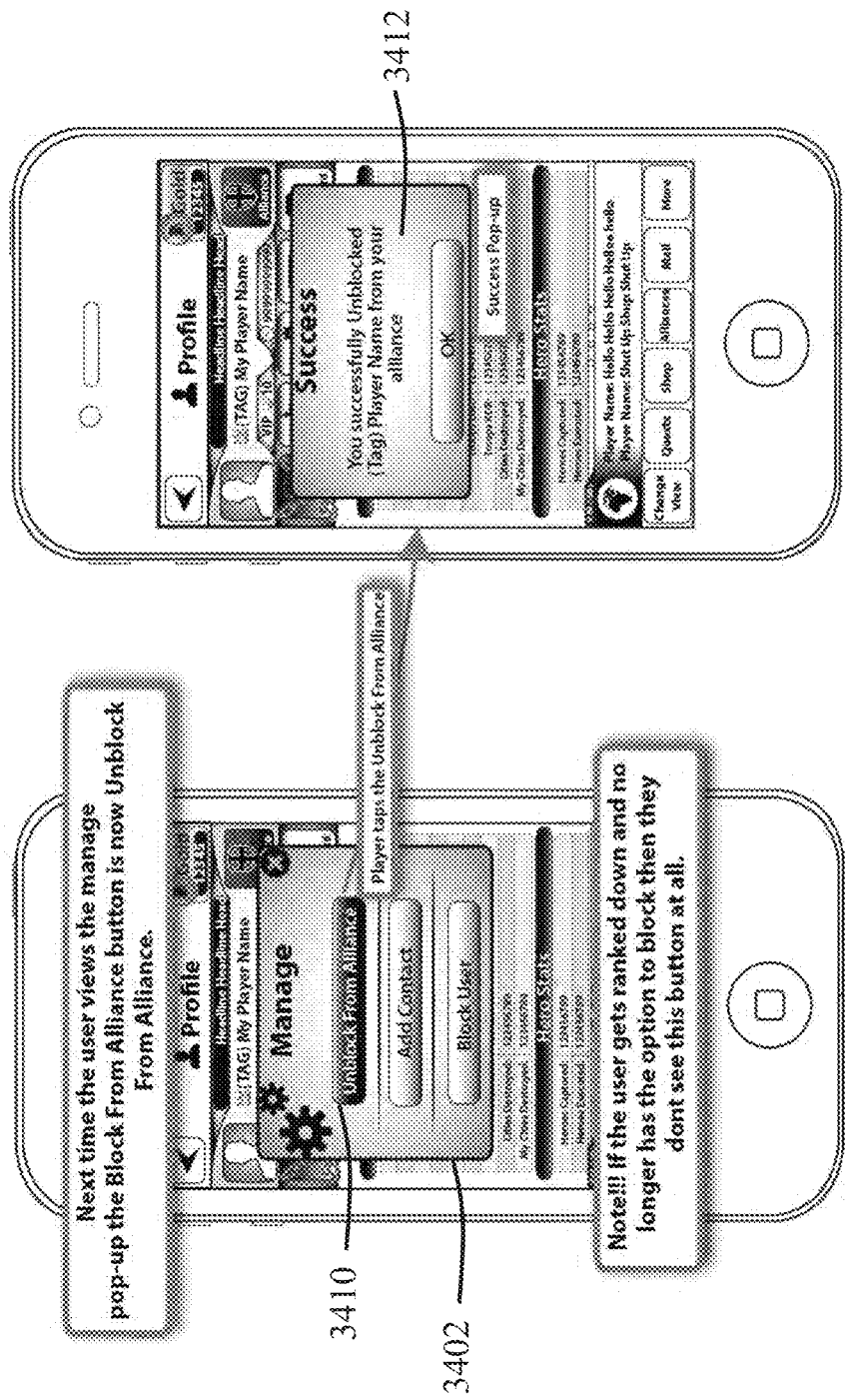
FIG. 34B includes screenshots of a user interface for unblocking one or more users of a chat session, in accordance with various embodiments.

FIG. 34A includes screenshots of a user interface 3400 that allows a first user of a gaming system to block communications from a second user of the gaming system, in accordance with certain embodiments. As depicted, the first user selects (e.g., by tapping a touch screen) a manage settings icon 3402, which opens a settings window 3404. The first user then selects a "block from alliance" button 3406 on the settings window 3404. A message window 3408 appears informing the first user that future communications from the second user will be blocked. The second user may be added to a list of other users who have been blocked by the first user. The first user may have the option of editing this list to add or remove users to or from the list. For example, referring to FIG. 34B, the next time the user selects the manage settings icon 3402, the settings window 3404 may include an unblock from alliance button 3410. When the first user selects the unblock from alliance button 3410, future communications from the second user may be unblocked, and a message window 3412 may appear informing the first user that such communications have been unblocked.

In some instances, the complexity of the system is brought in or reduced by the scale at which blocking and unblocking is executed. Parallel computation may provide the flexibility to execute the blocking and unblocking at real-time, without the disadvantages of time lag seen in traditional systems. For example, parallel processing may be used to translate and/or transform text messages in a text message chat system. A separate parallel process may be assigned to each user of a chat session and/or each language being used in the chat session. Such parallel processing may simplify the task of blocking and unblocking users. For example, separate parallel processes may be removed or added from the chat system as users are blocked or unblocked, respectively.

Figure 35:
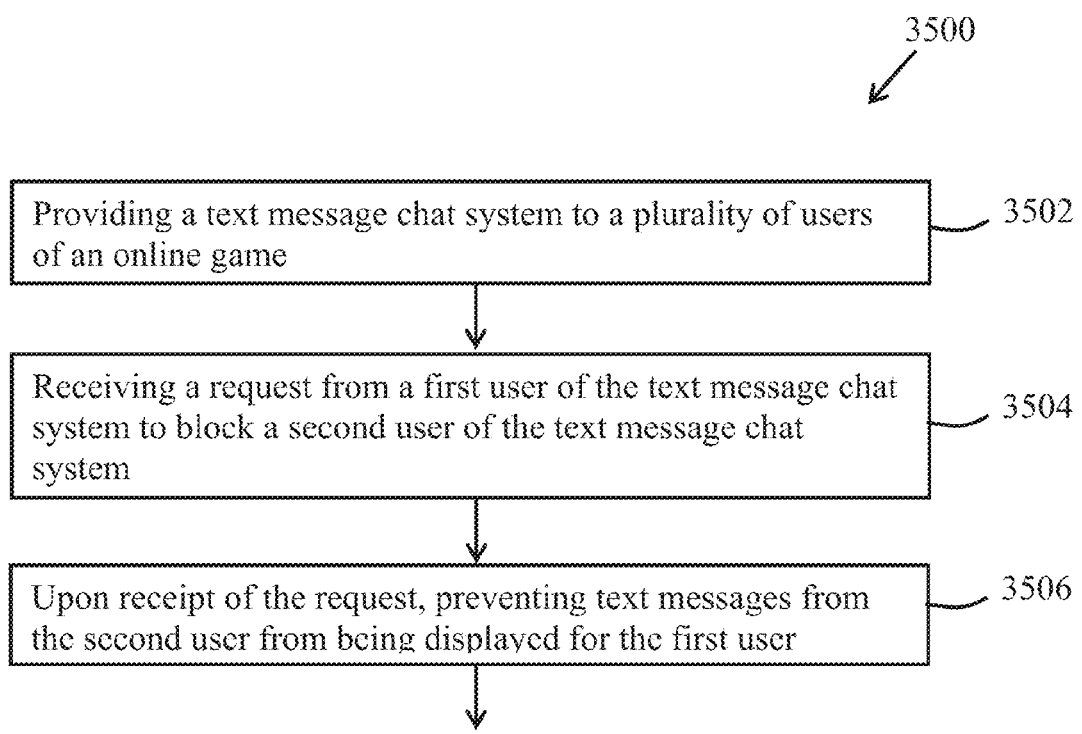
FIG. 35 includes a flowchart of a method of blocking one or more users of a chat session, in accordance with various embodiments.

FIG. 35 is a flowchart of a method 3500 of blocking a user from a chat session, the method 3500 includes providing (step 3502) a text message chat system to a plurality of users of an online game. A request is received (step 3504) from a first user of the text message chat system to block a second user of the text message chat system. Following receipt of the request, preventing (step 3506) text messages from the second user from being displayed for the first user. In some instances, the text messages in the chat session are translated and/or transformed using the systems and methods described herein. Parallel processes may be used to perform the translation and/or transformation of the text messages. For example a separate parallel process may be assigned to handle translation and/or transformation of text messages for each particular user of the chat session and/or for each language involved in the chat session.

Automated translation services are not always accurate and may benefit occasionally from human intervention to correct certain errors. In some implementations, the translation systems and methods described herein allow users to identify translation errors and offer corrections to fix these errors. For example, a bilingual or foreign language user (e.g., a French player of an online game) may view a chat window and see a translation (e.g., to or from French) that is incorrect. The user may submit a suggested correction for the erroneous translation, and the user may be rewarded (e.g., with in-game currency or virtual items) for submitting the correction.

In certain implementations, an original text message and a corresponding translation are displayed on a single screen, which provides an opportunity for someone experienced in the languages to provide feedback on the translation instantly. For example, a user may recognize a translation error and select an option to submit a corrected translation. The user may then enter and submit the corrected translation and may receive a reward if and when the corrected translation is approved. Upon submitting the corrected translation, the user may be prevented from submitting an additional corrected translation for the original message. A user may therefore be unable to earn multiple rewards from a single erroneous translation.

Figure 36B:
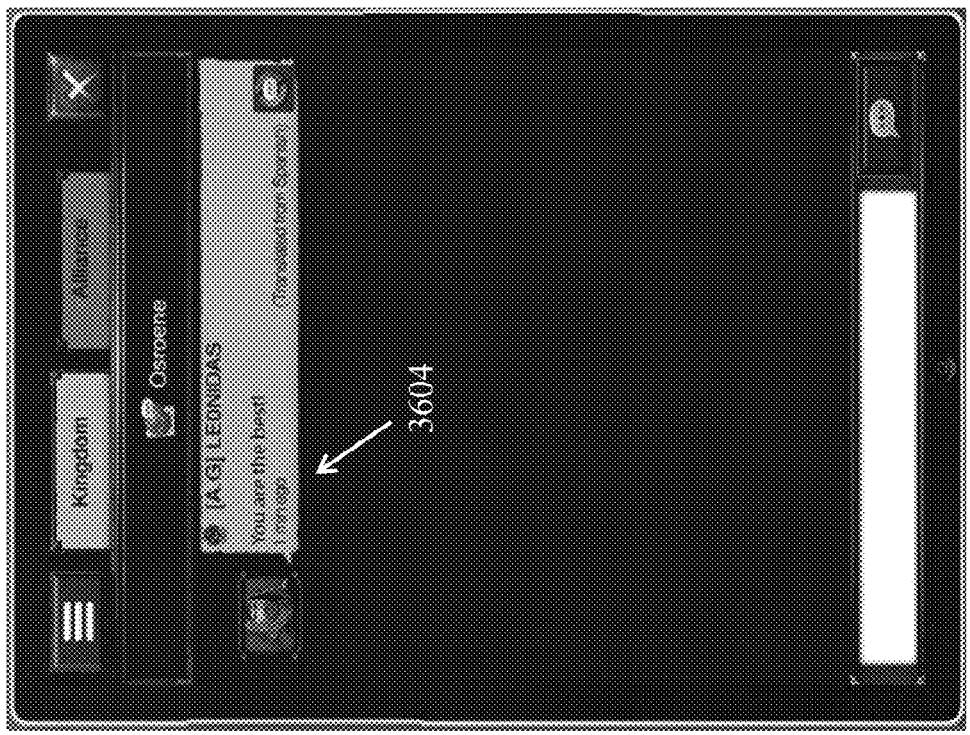
FIGS. 36A, 36F include screenshots of a user interface that allows a user to correct a language translation of an original message, in accordance with various embodiments.
Figure 36A:
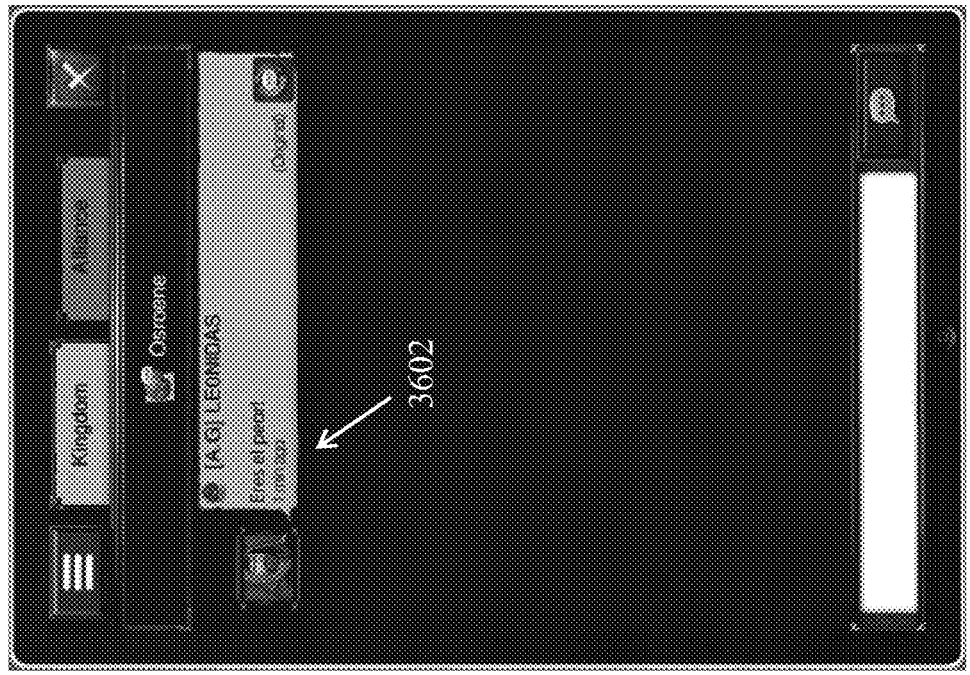
Figure 36D:
Figure 36C:
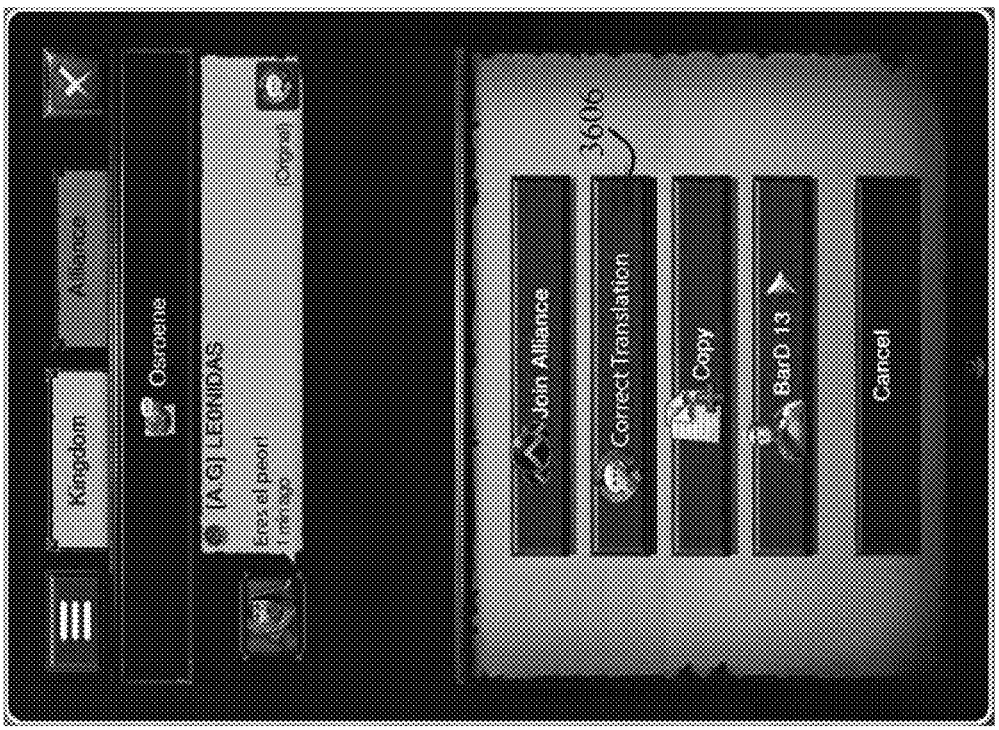
Figure 36F:
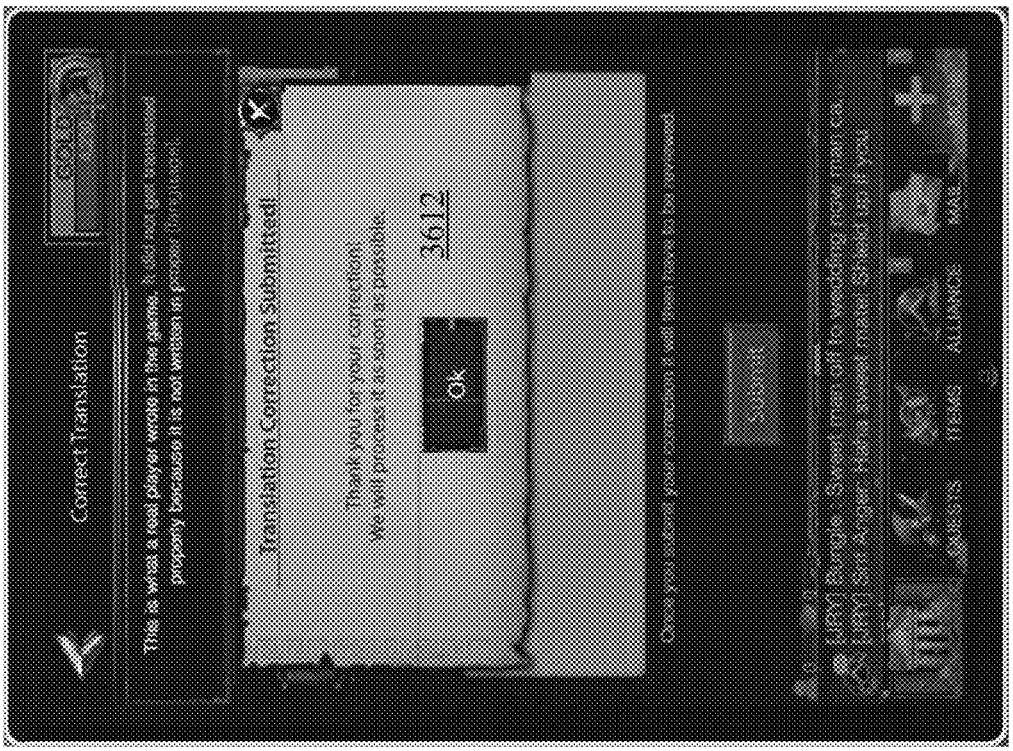
Figure 36E:

In some instances, the systems and methods are unable to translate an original message because the original message was not entered correctly by a user. For example, FIG. 36A shows an original Spanish message 3602 that recites "Eres el peor!" An automated English translation 3604 of this message is shown in FIG. 36B and recites "You are the best!" Referring to FIGS. 36C and 36D, a user may recognize that the original message was not entered in proper Spanish, which resulted in an incorrect translation. To address this error, the user may select a "correct translation button" 3606, which causes a correction window 3608 to open where the user may enter a correction for the original message. Referring to FIGS. 36E and 36F, in this case, the users enters "Ustedes son los mejores!" in the correction window 3608 and selects a submit button 3610. A confirmation window 3612 appears informing the user that the submission will be processed. Closing the confirmation window 3612 returns the user to the original chat page.

Figures 37A, 37B:
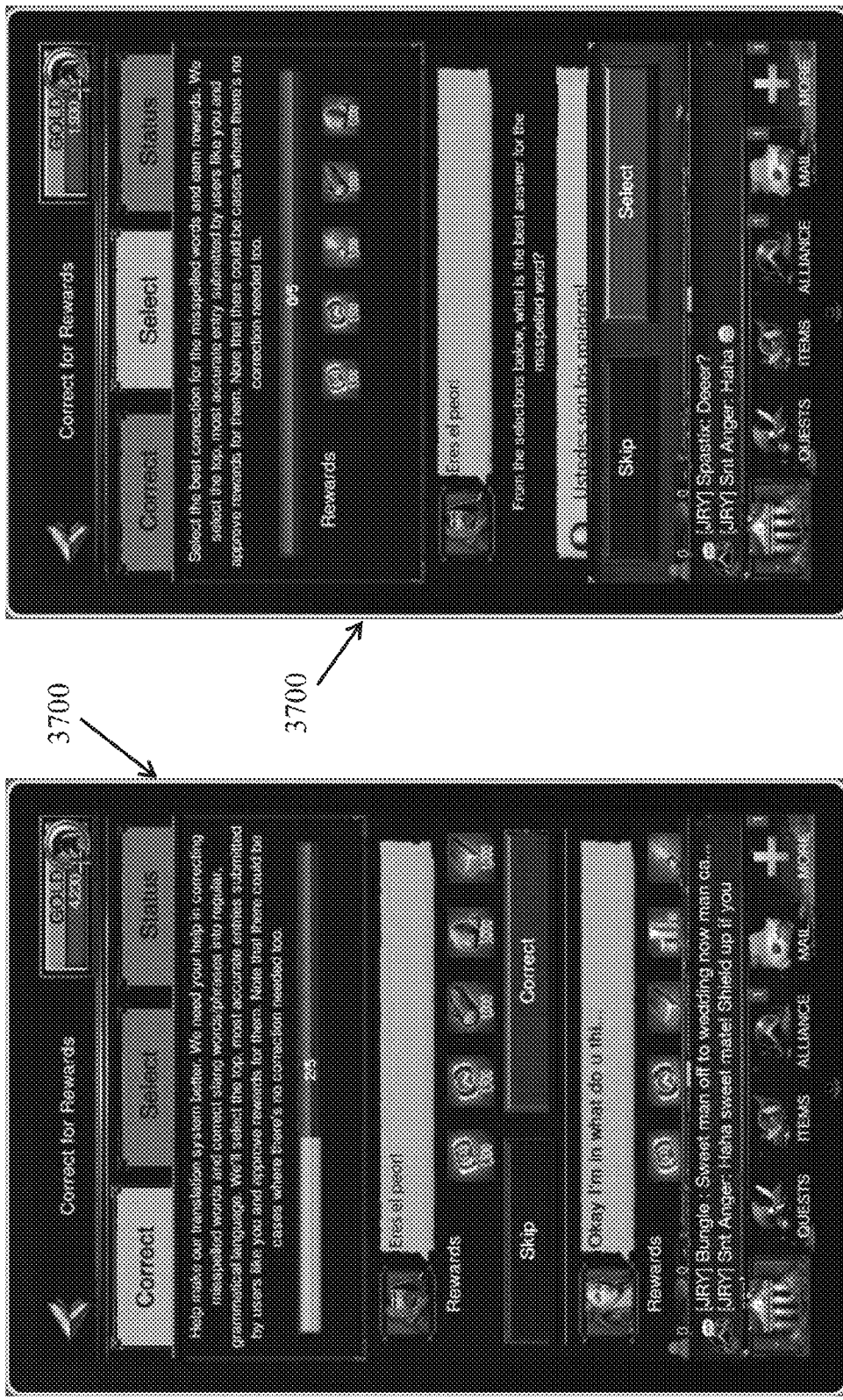
FIGS. 37A and 37B include screenshots of a user interface that allows users to judge translation corrections submitted by other users, in exchange for a possible a reward, in accordance with various embodiments.

Referring to FIGS. 37A and 37B, a user interface 3700 is provided that allows users to review translation corrections received from other users. Users who review the translation corrections may be rewarded for their efforts, and may be able to select the particular type of reward they receive (e.g., virtual goods or currency for an online game). In general, after a translation correction is submitted by a user, other users can decide whether the correction is better than the original translation and any other translation corrections that have been submitted by other users. When a user's translation is judged to be the best translation, that user may receive an award, and the user's translation may be added to the translation dictionary (e.g., the translation data store 210). Users who participate in judging the various translations may also receive a reward. Such rewards, however, may be given only to those users who select the translation correction that was chosen to be the best by all of the judges.

In general, by allowing users to submit suggested translation corrections and to judge other users' submissions, the systems and methods take advantage of feedback that users are willing to give freely. The data collected in this process, once approved, may be used to correct translation cache entries, thereby improving the overall translation capabilities of the systems and methods described herein. This may ensure that the correct translation is shown in the future, when the original message is submitted again for translation.

In a typical implementation, there are two types of users who may submit and/or judge translation corrections: users who are monolingual, and users who are bilingual. Bilingual users are generally able to understand the original language sentence and provide a more accurate translation in a different language. By contrast, monolingual users may not understand the original language phrase, but are nonetheless able to review the translation (which is presented in the user's device language) and submit a correction in exchange for a reward. The translations obtained from the two types of users tend to differ in content, with bilingual users generally providing a more accurate translation. The systems and methods are preferably able to determine or detect whether a user is monolingual or bilingual, and the user's feedback may be weighed according to that determination. For example, users may be able to identify themselves to the systems and methods as being either monolingual or bilingual.

In certain situations, most of the users are monolingual and speak the same language (English). With a large supply of speakers of one language, there are generally more users to submit translation corrections for that language, and there is generally less demand for translation corrections to or from that language. To stimulate the supply of translation corrections for other languages, users may be rewarded according to the demand for translation corrections. For example, when a majority of users speak one language and there is no shortage of translation corrections given in that language, such users may receive a smaller reward (e.g., 75% of the nominal amount) for submitting translation corrections. At the same time, a minority of users who speak a different language may receive a larger reward (e.g., 125% of the nominal amount), due to a great demand for translation corrections in that different language.

The number of translations a user may correct over a given time period (e.g., one day) may or may not be limited. There may be no limit on the number of translation corrections, for example, when no reward is given for submitting the corrections. On the other hand, when users are rewarded such submissions, a user may be allowed to submit a limited number of translation corrections during the time period. Such a limit may prevent users who are bilingual, or users who have a tendency to submit large numbers of translation corrections, from receiving excessive rewards and thereby obtaining an unfair advantage in an underlying game (e.g., a multi-player online game).

In certain instances, feedback on an incorrect translation may be received from only a small number of users (e.g., 2 or 3 users), which may make it difficult to determine correctness of translation submissions and to automatically generate rewards. For example, chats occur in a continuous stream, and many users may be more focused on chatting with other users and/or playing an underlying game, and less focused on submitting translation corrections. Users may also select chats based on what they see in their window, and few users may select the same chat. Accordingly, when more than one translation correction has been received, the proposed corrections may be made available for other users to judge, in an effort to gain consensus on the correct translation, in exchange for rewards.

Rewards for submitting translation corrections may be given to users according to a raffle system. In such a system, rewards are not given for every submission but may be given out randomly, with users who submit more corrections being more likely to earn a reward. Such an approach reduces the likelihood that certain players may achieve an unfair advantage over other users, due to their ability and/or desire to translate messages, rather than their ability or effort in the underlying game.

In addition to allowing users to correct bad translations, users may also be able to submit feedback regarding wrongly detected languages, unfiltered profanities, and names entity detection. For example, when viewing an original message and a translated message, a user may recognize that the automated translation system detected the original language improperly. The user may then inform the system about this language detection mistake, in exchange for a possible reward. Likewise, a user may be able to inform the system about any profanity that appears in messages, thereby allowing the system to filter or delete such profanity from future messages. Users may also be able to inform the system about names entities, such as companies, brands, trademarks, etc., that appear in messages. This may allow the systems and methods to recognize when named entities appear in messages and to ensure such entities are names and/or identified appropriately.

In general, translation corrections submitted by users need careful evaluation to ensure users are rewarded only for accurate corrections. This will improve overall accuracy of the system and prevent users from cheating by submitting fraudulent corrections. In some implementations, the accuracy of translation corrections is automatically evaluated using word-based features, language-based features, and other features (e.g., a word alignment match feature), to prevent users from exploiting the system. A part of speech (POS) based language model may be used to check sentences for grammatical correctness. Additionally, some users may submit translation corrections that are grammatically correct but have nothing to do with the original message. For such cases, a word alignment match analysis feature may be useful and may be run as periodic process to approve and/or reject user submissions. A machine learning approach may be used to validate sparse user feedback in the translation systems and methods described herein.

Table 2 presents examples of suggested translation corrections submitted by users in accordance with certain embodiments of the invention. In these examples, the original message in the source language is "aaa bbb ccc," and the correct translation in the target language is "xxx yyy zzz." The column labeled "Shown Translation" includes examples of initial translations proposed by the automated systems described herein.

TABLE 2

Examples of user corrections and preferred outcomes.

| Original Message | Shown Translation | User Correction | Description | Status |
|---|---|---|---|---|
| aaa bbb ccc | ;$@#! | xxx yyy zzz | User has corrected an incorrect translation. | Approved |
| | xxx yyy | xxx yyy zzz | User has improved the quality of existing machine translation which is partially correct. | Approved |
| | aaa xxx uuu | xxx' yyy' zzz' | User does not know target language but simply uses online translation services. | Approved |
| | xxx yyy zzz | xxx zzz yyy | User wants to exploit system for rewards by slightly rearranging words in shown translation. | Denied |
| | xxx yyy zzz | xxx yyy zzz | Copy pasting the same translation for cheating. | Denied |
| | xxx yyy zzz | $@%^&/dsc reyyfwf | Typing a random message/junk for cheating if copy pasted translations were denied. | Denied |
| | xxx yyy zzz | sss ddd fff | User submits a grammatically correct message in target language but translation is irrelevant (Copy pasting the translation of previous msg). | Denied |
| | xxx yyy zzz | XXX yyY zzz | User attempts to submit a genuine translation but his correction is not better (poor quality) than the shown translation. | Denied |

As shown in Table 2, when a user submits a correct and improved translation, the user submission should be approved, and the user may receive an appropriate reward. When the user submits a poor quality or fraudulent translation (e.g., a random message), however, the user submission should be denied, and no reward should be given in the user. The systems and methods preferably approve or reject such examples as shown in the "Status" column of this table.

In certain embodiments, a translation of an original message is classified according to whether the translation is appropriate for the original message. The classification may treated as a binary classification task in which features are extracted from the translation and the original message. The classification technique may be used to ensure translation corrections submitted by users are accurate. For example, in some instances, the majority-based validation described herein is not suitable due to the small number of responses (e.g., one to three) that may be received per incorrect translation. The classification technique may also be used to identify and/or address hash collisions that appear in cached translation data. For example, about 10% or more of the translation entries in a data table may be corrupt due to hash collisions.

Figure 38:
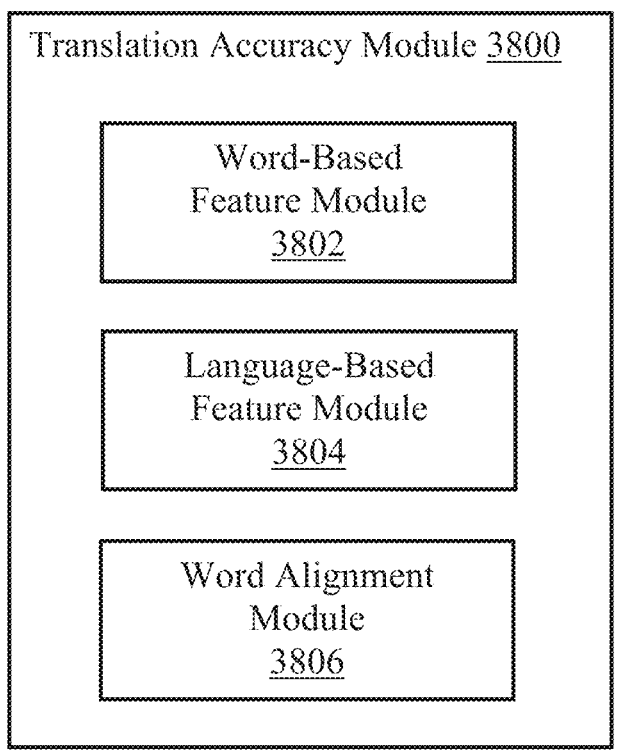
FIG. 38 is a schematic diagram of a translation accuracy module for evaluating the accuracy of translations, in accordance with various embodiments.

Referring to FIG. 38, in various implementations, the accuracy of translations is evaluated using a translation accuracy module 3800 that includes a word-based feature module 3802, a language-based feature module 3804, and a word alignment module 3806. The word-based feature module 3802 is used to assess word-based features, such as word counts, character counts, emojis, numbers, and/or punctuation marks. For example, when a translation is correct, the number of words in the original message and the number of words in the translation are generally about the same. Accordingly, if the number of words in the two message differs by more than a threshold amount (e.g., a factor or two), the translation may be regarded as being incorrect or more likely incorrect. In one example, if the number of words in one of the messages (e.g., the translation) is ½ (or fewer than ½) of the number of words in the other message (e.g., the original message), the word-based feature module 3802 may conclude that the translation is incorrect or more likely incorrect.

Another word-based feature that may be used to assess the accuracy of a translation is the number of characters (e.g., letters and numbers) in the original message and in the translation. In general, when the number of characters the original message is about the same as the number of characters in the translation, the translation is more likely to be accurate. A threshold amount may be used to determine when the character counts in the two messages differ excessively. For example, if the translation has more than 3/2 as many characters as the original message, the word-based feature module 3802 may conclude that the translation is incorrect or more likely incorrect.

Another word-based feature that may be used to assess the accuracy of a translation is the count and order of emojis (e.g., ideograms or smileys used in Japanese electronic messages), which generally remain unchanged between the original message and the translation. Emojis tend to fall under a certain Unicode text range that could be used to detect them in a given sentence. A regular expression may be used to identify or extract emojis from both of the messages using this Unicode range. For example if the input contains 3 emojis consecutively, and the output contains just one emoji, it indicates a disparity between input and output. If the count and/or order of the emojis is different between the two messages, the word-based feature module 3802 may conclude that the translation is incorrect or more likely incorrect.

An additional word-based feature that may be used to assess translation accuracy is the count of any numbers and punctuation marks in the two messages. For example, numbers and punctuation marks, if any, may be identified or extracted in the original message and the translation, and the length of the longest common subsequence (LCS) may be found between them, after sorting. This length, divided by the maximum of the lengths of the two messages, gives a real numbered value for this word-based feature. In general, the real numbered value provides an indication of a percentage of the numbers and punctuations in the two messages that overlap. Experimental results show that better results are obtained using a real numbered value rather than a binary value, for this particular feature. For example, an input sentence of "I am going to meet you at 4:30 Cya!!" in English could have an equivalent output of "Je vais vous recomrer a 4:30 Au revoir!!" On extracting the punctuation and numbers we get "4:30!!" for both the English and French versions. The LCS in this case would be 6 (by character) and the maximum of lengths from among the English and French versions is 36 (by character). The resultant real numbered value for this word-based feature is 6/36=0.167.

Relying on word-based features alone may be insufficient for assessing translation accuracy. For example, users may be able to fool at least some of the word-based features by submitting a translation correction in which each word of the original message is replaced with a dummy word (e.g., "xxx"), to produce a fraudulent correction having the same number of words and characters present in the original message.

To avoid this issue, the translation accuracy module 3800 may use the language-based feature module 3804 to evaluate language-based features, in addition to or instead of the word-based features. For example, in one embodiment, the words present in the original message and in the translation are tagged (e.g., using open source POS tagger) to identify parts of speech (POS) (e.g., verbs, nouns, adjectives, etc.) in the two messages. Each word in the messages may be tagged according to the parts of speech, using a different tag set for each language, with a different number of tags. For example a sample sentence of "The device is easy to use" can be tagged by a POS tagger as "The_DT device_NP is_VBZ easy_JJ to_TO use_VB," showing the part of speech of each word in the sentence. In this case, the tags are Determiner (DT), Noun phrase (NP), Singular present tense verb (VBZ), Adjective (JJ), to (TO), and Simple verb (VB). The tags or primary interest for this purpose are typically verbs, followed by adjectives and adverbs.

In certain instances, the original message and the translation are tagged separately (e.g., using POS tagger), and the resulting tags for each message are counted to identify the number of verbs, adjectives, adverbs, etc., in each message. Due to the different types of verbs used in each language (e.g., modal verbs, infinite verbs, past tense verbs, future tense verbs, etc.), a simplified verb tag VB may be obtained using a map for all types of verbs in each language. For example, English verb part of speech tags may be mapped to a single verb tag VB, as follows: 'VBD' (Verb, past tense)=>'VB,' 'VBG' (Verb, Gerund)=>'VB,' 'VBN' (Verb, past participle) =>'VB,' 'VPB' (Verb, non third person singular present) =>'VB,' and 'VBZ' (Verb, third person singular present) =>'VB,' The POS tags in the tagged messages may be replaced with this simplified POS tag set.

After simplifying the POS tabs, the number of verb tags VB may be counted in both the original message and in the translation. Ideally, the number of verbs in each message should be the same, but there are some exceptions. For example, "was sleeping" in English translates to "domains" in French. The English POS tagger may tag "was" and "sleeping" as two different verbs, whereas the French POS tagger may tag "domains" as a single verb. Verbs such as "is," "was," and "can" are known as auxiliary verbs in English. Other languages may not have an equivalent for these auxiliary verbs and may instead use a single verb as a replacement. To account for such differences in verb use among the languages, the systems and methods may use a threshold value (e.g., 2 or 3) for difference in the number of verbs between the original message and the translation. For example, when the difference between the numbers of verbs in the two messages is greater than two, the language-based feature module 3804 may consider the translation to be incorrect or more likely incorrect. This threshold value of two was found to produce reasonable results through trial and error. Other parts of speech (e.g., adjectives and adverbs) may be counted and compared between the two messages, using one or more additional threshold values.

In some instances, however, a user may fool this translation accuracy check by simply copying and submitting the existing translation as a correction for the translation. In that case, the submission may be classified as a valid correction, but the user may not be rewarded for the submission. In some cases, a user may also simply change the case of some words in the existing translation to produce and submit a valid correction, and the user may deserve a reward and be rewarded for the submission. Accordingly, in some embodiments, the systems and methods determine whether the existing translation and the user submission are the same or not. If the existing translation and the user submission are the same (e.g., including case and capitalization), no reward may be given to the user.

In certain embodiments, the POS tags check is used to identify instances when an automated translation system failed to correctly identify the language of the original message. For example, the language of the original message may have been detected incorrectly when a user's translation correction passes the word count check but fails in the POS tags check. Incorrect language detection is also likely when the number of verbs is equal to zero or all tags are nouns in one message and not in other. For example, an original Spanish message may recite: "Pizt te enviÃ ran pronto regrese una marcha." If the language is detected as being English, however, the English POS tagger will likely be unable to tag the message and, as a default, may tag all words as nouns. The English POS tagger's output may be, for example: [{"tag": "NP", "word": "Pizt", "stem": "<unknown>"}, {"tag": "NN", "word": "te", "stem": "te"}, {"tag": "NN", "word": "envi\u00c3\u00b3", "stem" "<unknown>"}, {"tag": "NN", "word": "tan", "stem": "tan"}, {"tag": "RB", "word": "pronto", "stem": "pronto"}, {"tag", "JJ", "word": "regrese", "stem": "<unknown>"}, {"tag": "NN", "word": "una", "stem"; "<unknown>"}, {"tag": "NN", "word": "marcha", "stem": "<unknown>"}]. By comparison, the Spanish tagger's output for the same original message may be: [{"tag": "NP", "word": "Pizt", "stem": "<unknown>"}, {"tag": "PPX", "word": "tc", "stem": "t\u00fa"}, {"tag": "VLfin", "word": "envi\u00c3\u00b3", "stem": "<unknown>"}, {"tag": "ADV", "word": "tan", "stem": "tan"}, {"tag": "ADV", "word": "pronto", "stem": "pronto"}, {"tag"; "VLfin", "word": "regrese", "stem": "regresar"}, {"tag": "ART", "word": "una", "stem": "un"}, {"tag"; "NC", "word": "marcha", "stem": "marcha"}]. The tags "NN," "RB," and "PPX" refer to Noun (singular or mass), Adverb, and Possessive pronoun, respectively.

Accordingly, in certain instances, the parts of speech of the original message and a translation are compared to determine whether the language was properly identified in the original message. In general, a language detection failure is more likely to have occurred when one of the messages (e.g., the original message) is tagged has having non-zero number of verbs and the other message (e.g., the original message) is tagged has having no verbs. Language detection failure is also more likely when all words in one message are tagged as nouns while the other message has several types of POS tags (e.g., nouns, verbs, and adjectives).

In various embodiments, translation accuracy is assessed by identifying and reviewing the proper nouns in the original message and in the translation. In general, when a translation is accurate, the proper nouns (e.g., names of people and cities) are the same in translation and in the original message. Comparing the two messages and filtering common words that were left untranslated may therefore be useful as a feature for identifying genuine translations. In some instances, the presence of such untranslated proper nouns may help improve translation precision, but the absence of any untranslated proper nouns may not give any information about translation precision. If proper nouns are identified in the original message but not in the translation, the accuracy of the translation may be considered to be incorrect or more likely incorrect. A penalty may be added to a real valued score returned for this proper noun feature, which helps identify any bad translations and improve translation accuracy. For example, when the proper nouns are inconsistent between the two messages, an accuracy score for the translation may be reduced by the penalty.

Alternatively or additionally, translation accuracy may be evaluated by analyzing and comparing the grammar in the original message and the translation. Working with multiple languages may make it difficult to parse trees for all languages to understand the grammar of the sentence. The messages are also often written in chat language, which follows a different grammar compared to plain or formal speech in the native language.

Accordingly, to recognize a pattern among the grammar of the chat language, the sentence may be tagged with POS tags to build an N-gram language model on the POS tags, thereby, providing an approximation of the underlying grammatical structure. An n-gram may be defined as a collection of n-consecutive words. A model of these n-grams may be typical for a given language and/or may be used to represent n consecutive words in the given language. In certain implementations, the method of word-based n-grams is extended to a Part of Speech-based n-grams. In other words, a shallow method or parsing sentences may be used where words in a sentence are tagged with a POS tagger. In one approach, a BLEU score is computed on POS tags rather than on actual text.

A trigram (3-gram) language model may be created on the POS tagged sentences for each language. For example, the sentence "The device is easy to use" has a POS tagged output of "The_DT device_NP is_VBZ easy_JJ to_TO use_VB." Word-based trigrams in this sentence would be {The, device, is}, {device, is, easy}, {is, easy, to}, {easy, to, use}. The corresponding POS based trigrams would be {DT. NP, VBZ}, {NP, VBZ, JJ}, {VBZ, JJ, TO}, {JJ, TO, VB}.

Trigrams with higher probabilities may be used to infer partial structures of the grammar. For example, a trigram language model built of POS tags may have a probability associated with each trigram. The probability may be computed as the ratio of the number of times a given trigram has occurred in a text corpus compared to all the trigrams in the same text. A grammatical trigram tends to be repeated often and hence will have a higher probability (also known as a language model score). Hence, when a message receives a higher score on this language model, the message is more likely to be grammatically correct. This score may be useful to detect instances when a user types a spam message to get rewards. The score may also be useful to determine when the language detection has failed. For example, since separate models may be used for each language, the score of a sentence in the wrong language may be much lower. The score may also be useful for detecting when the quality of a translation is good. Separate models may be trained for human and machine translations for this purpose.

In certain embodiments, the language model is trained using translations that have been verified as being accurate. A trigram model may be built on the POS tags.

An inherent problem with n-grams of any size is a lack of all possible hypotheses. In such cases, a backoff method is followed where n−1-grams and n−2-grams are identified. For example, if an unknown POS trigram is seen, such as {DT, NP, JJ}, the model may retroactively check to see if the bigrams {DT, NP} and {NP, JJ} have a language model score indicating grammatically. If the bigrams do not have probabilities (or if the probabilities are too low), another backoff may be done to check unigram language model scores for {DT}, {NP}, {JJ}. All three models can also be grouped by linear interpolation with more weights or trigram models, fewer weights on bigram models, and even fewer weights on unigram models.

The most frequently occurring trigrams of POS tags for chat English are as follows: <IN><VBD><PP>=1.0; <FW><NN><IN>=1.0; <DT><WP><VBP>=1.0; and <RB></S1></S2>=1.0. A score of 1.0 indicates a 100% probability that a given trigram sequence is grammatical at all times it occurs. In general, chat language uses more pronouns beginning with "Wh," followed by a verb, which is captured by <DT><WP><VBP>. People also tend to end chat language sentences with adverbs or adjectives, as in "You are Cool" "This is awesome," which is captured by <RB></S1></S2>, where S1 and S2 are end of sentence tags. These trigrams may therefore be used to recognize at least some structure of the underlying grammar in each language. With the language model built for all languages of interest, the models may be saved on JSON format and may be loaded instantly at any time.

In some implementations, after a message has been POS tagged, the systems and methods may count the number of trigrams in the message that match with an existing trigram language model. Each trigram in the model may have a probability score associated with it and, for each trigram in the message, the corresponding score of the trigram is identified in the model. In some instances, if the score is higher than a threshold value (e.g., 0.05), the trigram is counted as a match. Otherwise, the trigram is not counted as a match. The systems and methods may compute the number of matches of trigrams to a total number of trigrams in the sentence, and this ratio may be used as real valued feature for assessing translation accuracy. For example, a trigram of {easy, to, use} which may occur frequently in grammatical text can have a high probability score (language model score) of around 0.68. By contrast, an ungrammatical trigram of {easy, use, to} could have a smaller probability of occurrence of around 0.04. When compared with a defined threshold of 0.05, the ungrammatical trigrams may be filtered out, and the number of trigrams above the threshold may provide a quantitative value for the grammaticality of the text.

After obtaining a POS tagged message, the probability of the sentence may be computed using the trigram language model. In one embodiment, the log probability of each trigram in the sentence is determined, and the sum of the log probabilities is computed. This sum is then divided by the number of words in the sentence, to obtain a score for the sentence. The score may be used as a real valued feature for assessing translation accuracy. The log probability of a trigram is preferably calculated as a linear interpolation of trigram, bigram, and unigram probabilities. For example, in the sentence "The device is easy to use," the POS tagged output is "The_DT device_NP is_VBZ easy_JJ to_VB." The POS based trigrams for the sentence are {DT, NP, VBZ}, {NP, VBZ}, {VBZ, JJ, TO}, and {JJ, TO, VB}. Each of these trigrams has a probability of occurrence in a given language corpus. Assuming these probabilities are 0.12, 0.44, 0.32, and 0.89 for the respective trigrams, a combined score for grammatically of the sentence may be computed as a log probability. In this case, the log probability is computed as log(0.12)+log(0.44)+log(0.32)+log(0.89), which is equal to −1.82. On a relative scale, the log probability provides a numerical indication of the grammaticality of the sentence.

In addition to or instead of the word-based and language-based features described above, the translation accuracy module 3800 may use the word-alignment module 3806 to assess an alignment of words between the original message and the translation. To generate a listing of potential word alignment pairs, a translation accuracy checking algorithm was run with word-based features alone on a database and parallel corpus was extracted with translation pairs having probability values >0.90. This indicates that only good quality translation message pairs were filtered to create the parallel corpus. 100K sentences were collected for English and French pairs and English and Spanish pairs. The parallel corpus for these 100K sentences was fed to a statistical machine translation toolkit (i.e., GIZA++) to extract word alignments. The toolkit extracted approximately 25-30K word alignment pairs and the associated probability scores for these pairs.

Given that there are usually multiple word alignments per word, it may be beneficial to select only alignments that have a probability score greater than a certain threshold (e.g., 0.01). Even with the threshold, however, more than one alignment may be obtained per word, most of which are typically due to spelling errors or the same word in a different tense (e.g., past tense or future tense). Sample word alignments between English and French are shown in Table 3. Separate word alignments may be obtained for both possible orders of two languages (e.g., English to French and French to English). Two word alignment files may therefore be extracted per language pair. The word alignments for the source language (i.e., the language of the original message) to the target language (i.e., the language of the translation) may be referred to as source alignments, while the word alignments for the target language to the source language may be referred to as target alignments.

TABLE 3

Example word alignments between English and French.

| English | French |
|---------|--------|
| Troops  | troupes troupe |
| Attacks | attaques attaque |
| Smoke   | fumée fumé fumez fumee |

The source alignments and the target alignments may be loaded into two separate files. For each word in the original message that is also present in the source alignments, the systems and methods determine if at least one corresponding word is present in the translation and also in the target alignments. The same process is then applied to the translation sentence. Finally, the percentage of words that were found in the word alignments file is returned as a feature for assessing translation accuracy.

In certain implementations, word alignments are extracted for language pairs that include English as one of the languages. For example, the language pairs may be English coupled with one of Spanish, French, Polish, Portuguese, Dutch, German, Danish, Swedish, Turkish, Italian, and Russian, for a total of 11 language pairs and 11×2=22 word alignment files. For language pairs that do not include English (e.g., translating French to Russian). English may be used as an intermediate language to extract alignments. For example, when validating a translation from French to Russian, French to English may be used to extract word alignments from the original message, and Russian to English may be used to extract word alignments from the translation. The intersection of these two sets gives a percentage of match among the word alignments in both messages. This method may be extended to all pairs of languages.

In various embodiments, user confidence is calculated to provide an indication of whether a user's translation submissions may be trusted. Apart from other approaches discussed herein, a user may be trusted more or less based on the user's history of translation corrections. The number of translations corrected and the number of translations rewarded may be stored in a data table for various users. This allows a percentage of corrections done by the player to be calculated, and translation corrections may be approved, at least in part, based on the particular user's confidence threshold. This can easily separate out spammers from genuine players who correct translations.

Figure 39:
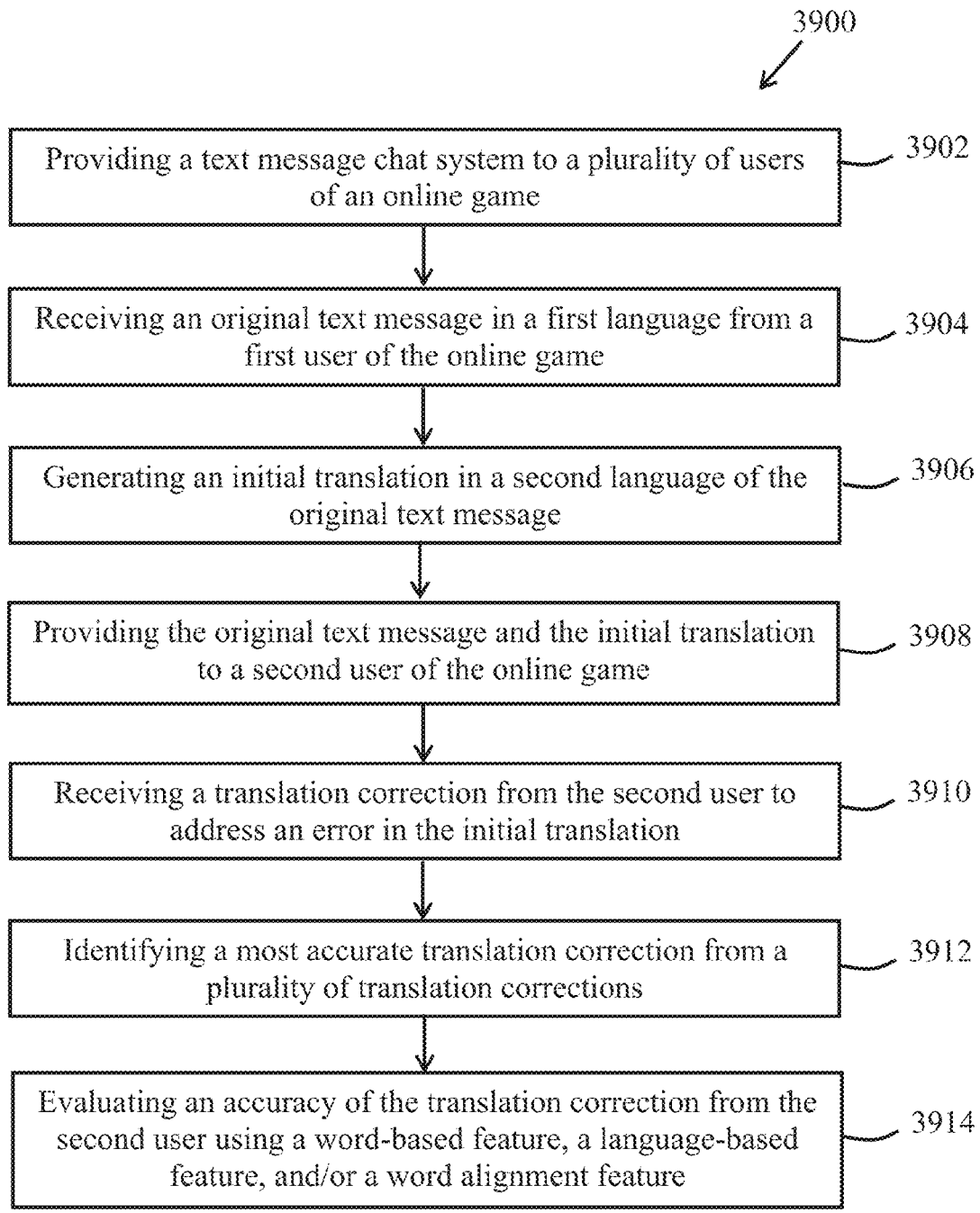
FIG. 39 is a flowchart of a method of evaluating the accuracy of translations, in accordance with various embodiments.

FIG. 39 is a flowchart of a method 3900 of correcting translation errors, in accordance with certain embodiments. The method 3900 includes providing (step 3902) a text message chat system to a plurality of users of an online game. An original text message is received (step 3904) in a first language from a first user of the online game. An initial translation is generated (step 3906) in a second language of the original text message. The original text message and the initial translation are provided (step 3908) to a second user of the online game. For example, the second user may view the two translations, either together or separately, on a display of a client device. A translation correction is received (step 3910) from the second user to address an error in the initial translation. The method 3900 may also include identifying (step 3912) a most accurate translation correction from a plurality of translation corrections (i.e., including the translation correction from the second user). Alternatively or additionally, the method 3900 includes evaluating (step 3914) an accuracy of the translation correction from the second user using at least one of a word-based feature, a language-based feature, and a word alignment feature.

The word-based and language based features described above (e.g., four word-based features and four language-based features) may be fit using a linear regression model. After training, the model preferably returns a real valued member for each translation pair, and a threshold value may be used to classify each translation pair as either good or bad. For example, if the features return numeric values of x1, x2, x3, . . . x8, a regression equation may be $y = a1*x1 + a2*x2 + \ldots + a8*x8$, where a1, a2, . . . a8 are coefficients obtained from modeling a linear regression equation and y is an output value. A preferred value for the threshold value y was found to be 0.65 after experiments with precision and recall using an ROC curve.

After adding the word alignment based feature described above, and re-running linear regression on the word-based and language-based features, the preferred threshold was changed to 0.76. Adding the word alignment based feature also increased the AUC value from 0.853 to 0.976.

Table 4 shows coefficients of regression obtained from training 13 k sentences for each of the word-based feature, language-based features, and word alignment feature. The results in the table indicate that the emojis feature and the character counts have small coefficients of regression, after normalization, which means these features were found to contribute little to the assessment of translation of accuracy.

TABLE 4

Coefficients of regression for translation accuracy features

| Feature | Coefficient |
| --- | --- |
| Numbers | 5.39E−01 |
| Emojis | 6.99E−20 |
| Character Counts | 1.76E−17 |
| Word Counts | 2.07E−01 |
| Count <VB> | 9.55E−02 |
| Trigram Match | 1.67E−02 |

TABLE 4-continued

Coefficients of regression for translation accuracy features

| Feature | Coefficient |
| --- | --- |
| Trigram Probs | −2.24E−02 |
| Untranslated nouns | 4.18E−02 |
| Word Alignment Match | 4.18E−01 |

The regression model was evaluated by 10-fold cross validation on 13 k sentences of French to English and Spanish to English pairs. The gold standard labels for the data were computed using BING translation with some human supervision. Table 5 presents the precision, recall, accuracy, and F-measure values in percentages for the evaluation. Precision represents a ratio of true positive translation pairs out of all translation pairs marked as true by our method. Recall is a ratio of the true positive translation pairs out of all translation pairs known to be true pairs. Accuracy is a ratio of a sum of outcomes marked as true positives and true negatives to the total test set size. F-measure is a harmonic mean of precision and recall. These metrics may be used in classification tasks to measure system performance and reliability. 13 k sentences were used as a training set, and 400 hand-annotated sentences were used for the test. Since the test set was small, the numbers for test were lower than the numbers for the 13 k sentences.

TABLE 5

Results from study of translation accuracy with 13,000 sentences.

| Measure | 13k sentences (10fold cv) | 400 sentences | 13k sentences (Word-based features) |
| --- | --- | --- | --- |
| Precision | 90 | 77 | 88.2 |
| Recall | 79.3 | 72 | 79.3 |
| F-Measure | 84.31 | 74.41 | 83.56 |
| Accuracy | 97.3 | 96 | 97 |

Table 6 shows the results of a 10-fold cross validation on a 13 k sentence data set, where W refers to the use of word-based features, L refers to the use of language-based features, and A refers to the use of the word alignment feature. The results show that word-based features help to improve precision, and the word alignment feature helps to improve recall significantly. Language-based features give a little boost to both precision and recall. In general, recall indicates how accurately bad decisions are detected from a total dataset. The results in the table show that adding word alignment-based features improves recall. Precision indicates how accurately good translations were predicted out of the total translations marked as correct by the system. The results in the table show that adding word-based features improves precision.

TABLE 6

Results of 10-fold cross validation on a 13,000 sentence data set.

| Method | Precision | Recall | F-Measure | Accuracy |
| --- | --- | --- | --- | --- |
| W | 88.2 | 79.3 | 83.56 | 97 |
| L | 51.9 | 26.6 | 35.17 | 92.5 |
| A | 55 | 96.7 | 70.11 | 93.9 |
| WL | 90 | 79.3 | 84.56 | 97.3 |
| WA | 80.5 | 96.6 | 87.81 | 97.7 |
| LA | 57.8 | 96.6 | 72.32 | 94.2 |
| WLA | 80.7 | 96.8 | 88.01 | 97.7 |

Table 7 shows the results of fitting the various word-based language-based, and word alignment features with other machine algorithms, in accordance with certain embodiments. Results until now have been illustrated using linear regression techniques for binding the different features together. Machine Learning algorithms exist that can be used to bind together variable (features in this context) to produce an ensemble outcome that is better than the individual parts. Linear regression presents a uni-dimensional method for combining variables. Two-dimensional and multi-dimensional methods for combining variable exist in Machine Learning algorithm literature. These algorithms were employed to find a more optimal way of combining the features used in the task of predicting good translation pairs.

The results in Table 7 were obtained by combining the features with various Machine Learning algorithms. The dataset used included 13 k sentences, and the parameters were tuned using a gridSearch algorithm. From the methods listed in the table, the gradient boosting classifier and the random forest methods are ensemble based methods, which explains why these methods gave better results. Gradient Boosting Machines (GBM) and Random Forests give very good results, through GBM took a longer time for training. Since the model needs to be trained only once, however, training time is largely irrelevant.

TABLE 7

Results of fitting translation accuracy features with machine algorithms.

| ML Algoritm | Params | Precision | Recall | Accuracy |
|---|---|---|---|---|
| Linear Regression | (Least Squares) | 80.7 | 96.8 | 97.8 |
| Perceptron | | 98.8 | 74.3 | 97.8 |
| Ridge Classifier | | 96.1 | 71.6 | 97.3 |
| Gaussian Naive Bayes | | 80.7 | 90.3 | 97.4 |
| Decision Tree | | 91.3 | 90.9 | 98.2 |
| Logistic Regression | L1 norm, C = 100, tol = 0.001 | 92.1 | 91.4 | 98.4 |
| SVM | C = 1000, gamma = 0.001 | 91.3 | 92.8 | 98.5 |
| Gradient Boosting Machines | n_estimators = 100 | 92.4 | 93 | 98.8 |
| Random Forests | n_estimators = 100 | 93.3 | 92.8 | 98.8 |

The final translation accuracy checking algorithm was tested on a held out test set of 3045 English-French sentence pairs. The results are shown in Table 8. WLA plain features perform poorly due to the fact that word alignments were extracted from plain speak databases. Since the messages are modified after a series of transformations, a sharp drop in the results can be found. Word alignment were extracted from chat speak databases and some smoothing was done for smaller sentences to avoid a zero score in features. WLA shows the result for the chatspeak databases. Bad precision with WLA features indicate many correct translations were denied. The features were fit with linear regression as Random Forest was overfitting the results. In general, these results may be used as a basis for selecting a final set of features to be used for an algorithm. A higher accuracy is generally preferred, whereas a higher precision rewards more true translation pairs entered by users, and a high recall ensures fewer wrong entries being misclassified as correct. The WLA feature set is desirable according to the results in the table. A threshold of 0.75 may be selected for a higher recall (e.g., to obtain the fewest possible malicious entries being marked as correct), and a threshold of 0.68 may be selected in cases when higher precision is desired.

TABLE 8

Results from translation accuracy checking algorithm.

| Features | Threshold | Precision | Recall | F-Measure | Accuracy | Area under ROC |
|---|---|---|---|---|---|---|
| WL | 0.75 | 85 | 59 | 69.65 | 96 | 0.723 |
| WLAplain | 0.75 | 19 | 79 | 30.63 | 80 | 0.631 |
| WLA | 0.75 | 65 | 93 | 76.51 | 95 | 0.883 |
| WLA | 0.68 | 76 | 85 | 80.24 | 96 | 0.853 |

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a comparison of a word-based feature of the original text and the translation correction, wherein calculating the at least one metric comprises determining a difference in a number of words, characters, emojis, numbers, or punctuation marks between the original text and the translation correction; and
determining an accuracy of the translation correction based on the at least one metric.

2. The method of claim 1, further comprising updating a confidence score for the second user based on the accuracy of the translation correction, the confidence score representing a likelihood that the second user will provide an accurate translation of a text message at a later time.

3. The method of claim 2, further comprising revoking the second user's translation privileges when the confidence score falls below a threshold value.

4. The method of claim 1, further comprising:
offering an incentive to the second user to provide the translation correction; and rewarding the second user with the respective incentive when the translation correction is determined to be accurate.

5. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a comparison of a word-based feature of the original text and the translation correction, wherein calculating the metric comprises:
identifying a longest common subsequence of characters that occurs in the original text and the translation correction wherein each character in the subsequence is a number or a punctuation mark; and
calculating the metric as a quotient of a length of the subsequence and a maximum of a
length of the original text and a length of the translation correction; and
determining an accuracy of the translation correction based on the at least one metric.

6. The method of claim 5, further comprising updating a confidence score for the second user based on the accuracy of the translation correction, the confidence score representing a likelihood that the second user will provide an accurate translation of a text message at a later time.

7. The method of claim 6, further comprising revoking the second user's translation privileges when the confidence score falls below a threshold value.

8. The method of claim 5, further comprising:
offering an incentive to the second user to provide the translation correction; and
rewarding the second user with the respective incentive when the translation correction is determined to be accurate.

9. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a comparison of a language-based feature of the original text and the translation correction, wherein the at least one metric is based on the comparison of the language-based feature, and wherein calculating the at least one metric comprises determining a difference in a number of occurrences of a part of speech in the original text and in the translation correction; and
determining an accuracy of the translation correction based on the at least one metric.

10. The method of claim 9, wherein the part of speech is a verb, an adjective, an adverb, a noun, or a proper noun, and wherein the verb part of speech comprises a verb form selected from the group consisting of past tense, gerund, past participle, non-third person singular present, and third person singular present.

11. The method of claim 9, further comprising updating a confidence score for the second user based on the accuracy of the translation correction, the confidence score representing a likelihood that the second user will provide an accurate translation of a text message at a later time.

12. The method of claim 11, further comprising revoking the second user's translation privileges when the confidence score falls below a threshold value.

13. The method of claim 9, further comprising:
offering an incentive to the second user to provide the translation correction; and
rewarding the second user with the respective incentive when the translation correction is determined to be accurate.

14. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a comparison of a word-alignment feature of the original text and the translation correction, wherein calculating the at least one metric comprises determining an alignment of at least one word in the translation correction and a corresponding at least one word in the original message; and
determining an accuracy of the translation correction based on the at least one metric.

15. The method of claim 14, further comprising updating a confidence score for the second user based on the accuracy of the translation correction, the confidence score representing a likelihood that the second user will provide an accurate translation of a text message at a later time.

16. The method of claim 15, further comprising revoking the second user's translation privileges when the confidence score falls below a threshold value.

17. The method of claim 14, further comprising:
offering an incentive to the second user to provide the translation correction; and
rewarding the second user with the respective incentive when the translation correction is determined to be accurate.

18. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a grammar-based feature of the translation correction, wherein calculating the at least one metric comprises:
generating a part-of-speech n-gram representation of the translation correction; and computing a probability of the n-gram representation for the second language; and
determining an accuracy of the translation correction based on the at least one metric.

19. The method of claim 18, further comprising updating a confidence score for the second user based on the accuracy of the translation correction, the confidence score representing a likelihood that the second user will provide an accurate translation of a text message at a later time.

20. The method of claim 19, further comprising revoking the second user's translation privileges when the confidence score falls below a threshold value.

21. The method of claim 18, further comprising:
offering an incentive to the second user to provide the translation correction; and
rewarding the second user with the respective incentive when the translation correction is determined to be accurate.

22. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based a comparison of a word-based feature of the original text and the translation correction and a comparison of a language-based feature of the original text and the translation correction;
determining an accuracy of the translation correction based on the at least one metric, wherein determining the accuracy of the translation correction comprises:
multiplying each of the first metric and the second metric by a respective coefficient; and
determining the accuracy of the translation based on whether a combination of the multiplied metrics exceeds a first threshold.

23. The method of claim 22, further comprising updating a confidence score for the second user based on the accuracy of the translation correction, the confidence score representing a likelihood that the second user will provide an accurate translation of a text message at a later time.

24. The method of claim 23, further comprising revoking the second user's translation privileges when the confidence score falls below a threshold value.

25. The method of claim 22, further comprising:
offering an incentive to the second user to provide the translation correction; and
rewarding the second user with the respective incentive when the translation correction is determined to be accurate.

26. A method comprising:
performing by one or more computer processors:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on one or more of:

(a) a comparison of a word-based feature of the original text and the translation correction;
(b) a comparison of a language-based feature of the original text and the translation correction;
(c) a comparison of a word-alignment feature of the original text and the translation correction; and
(d) a grammar-based feature of the translation correction; and
determining an accuracy of the translation correction based on the at least one metric wherein the at least one metric further comprises a third metric based on the comparison of the word-alignment feature, and wherein determining the accuracy of the translation correction further comprises:
multiplying the third metric by a respective coefficient;
combining the multiplied third metric with the multiplied first metric and the multiplied second metric; and
comparing the combination of multiplied metrics with a second threshold.

27. The method of claim 26, further comprising updating a confidence score for the second user based on the accuracy of the translation correction, the confidence score representing a likelihood that the second user will provide an accurate translation of a text message at a later time.

28. The method of claim 27, further comprising revoking the second user's translation privileges when the confidence score falls below a threshold value.

29. The method of claim 26, further comprising:
offering an incentive to the second user to provide the translation correction; and
rewarding the second user with the respective incentive when the translation correction is determined to be accurate.

30. A system comprising:
one or more computer processors programmed to perform operations comprising:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a comparison of a word-based feature of the original text and the translation correction, wherein calculating the at least one metric comprises determining a difference in a number of words, characters, emojis, numbers, or punctuation marks between the original text and the translation correction; and
determining an accuracy of the translation correction based on the at least one metric.

31. The system of claim 30 wherein the operations further comprise:
updating a confidence score for the second user based on the accuracy of the translation correction, the confidence score representing a likelihood that the second user will provide an accurate translation of a text message at a later time.

32. The system of claim 31 wherein the operations further comprise:
revoking the second user's translation privileges when the confidence score falls below a threshold value.

33. The system of claim 30 wherein the operations further comprise:

offering an incentive to the second user to provide the translation correction; and rewarding the second user with the respective incentive when the translation correction is determined to be accurate.

34. A system comprising:
one or more computer processors programmed to perform operations comprising:
  obtaining an original text message in a first language authored by a first user:
  obtaining an initial translation of the original text message in a second language;
  obtaining a translation correction of the initial translation, wherein the translation correction is authored by a second user;
  calculating at least one metric associated with the translation correction, the at least one metric being based on a comparison of a word-based feature of the original text and the translation correction, wherein calculating the metric comprises:
    identifying a longest common subsequence of characters that occurs in the original text and the translation correction wherein each character in the subsequence is a number or a punctuation mark; and
    calculating the metric as a quotient of a length of the subsequence and a maximum of a length of the original text and a length of the translation correction; and
  determining an accuracy of the translation correction based on the at least one metric.

35. The system of claim 34 wherein the operations further comprise:
updating a confidence score for the second user based on the accuracy of the translation correction, the confidence score representing a likelihood that the second user will provide an accurate translation of a text message at a later time.

36. The system of claim 35 wherein the operations further comprise:
revoking the second user's translation privileges when the confidence score falls below a threshold value.

37. The system of claim 34 wherein the operations further comprise:
offering an incentive to the second user to provide the translation correction; and
rewarding the second user with the respective incentive when the translation correction is determined to be accurate.

38. A method comprising:
one or more computer processors programmed to perform operations comprising:
  obtaining an original text message in a first language authored by a first user:
  obtaining an initial translation of the original text message in a second language;
  obtaining a translation correction of the initial translation, wherein the translation correction is authored by a second user;
  calculating at least one metric associated with the translation correction, the at least one metric being based on a comparison of a language-based feature of the original text and the translation correction, wherein the at least one metric is based on the comparison of the language-based feature, and wherein calculating the at least one metric comprises determining a difference in a number of occurrences of a part of speech in the original text and in the translation correction; and
  determining an accuracy of the translation correction based on the at least one metric.

39. The system of claim 38 wherein the operations further comprise:
updating a confidence score for the second user based on the accuracy of the translation correction, the confidence score representing a likelihood that the second user will provide an accurate translation of a text message at a later time.

40. The system of claim 39 wherein the operations further comprise:
revoking the second user's translation privileges when the confidence score falls below a threshold value.

41. The system of claim 38 wherein the operations further comprise:
offering an incentive to the second user to provide the translation correction; and
rewarding the second user with the respective incentive when the translation correction is determined to be accurate.

42. The system of claim 38, wherein the part of speech is a verb, an adjective, an adverb, a noun, or a proper noun, and wherein the verb part of speech comprises a verb form selected from the group consisting of past tense, gerund, past participle, non-third person singular present, and third person singular present.

43. A system comprising:
one or more computer processors programmed to perform operations comprising:
  obtaining an original text message in a first language authored by a first user:
  obtaining an initial translation of the original text message in a second language;
  obtaining a translation correction of the initial translation, wherein the translation correction is authored by a second user;
  calculating at least one metric associated with the translation correction, the at least one metric being based on a comparison of a word-alignment feature of the original text and the translation correction, wherein calculating the at least one metric comprises determining an alignment of at least one word in the translation correction and a corresponding at least one word in the original message; and
  determining an accuracy of the translation correction based on the at least one metric.

44. The system of claim 43 wherein the operations further comprise:
updating a confidence score for the second user based on the accuracy of the translation correction, the confidence score representing a likelihood that the second user will provide an accurate translation of a text message at a later time.

45. The system of claim 44 wherein the operations further comprise:
revoking the second user's translation privileges when the confidence score falls below a threshold value.

46. The system of claim 43 wherein the operations further comprise:
offering an incentive to the second user to provide the translation correction; and
rewarding the second user with the respective incentive when the translation correction is determined to be accurate.

47. A system comprising:
one or more computer processors programmed to perform operations comprising:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on a grammar-based feature of the translation correction, wherein calculating the at least one metric comprises:
generating a part-of-speech n-gram representation of the translation correction; and
computing a probability of the n-gram representation for the second language; and
determining an accuracy of the translation correction based on the at least one metric.

48. The system of claim 47 wherein the operations further comprise:
updating a confidence score for the second user based on the accuracy of the translation correction, the confidence score representing a likelihood that the second user will provide an accurate translation of a text message at a later time.

49. The system of claim 48 wherein the operations further comprise:
revoking the second user's translation privileges when the confidence score falls below a threshold value.

50. The system of claim 47 wherein the operations further comprise:
offering an incentive to the second user to provide the translation correction; and
rewarding the second user with the respective incentive when the translation correction is determined to be accurate.

51. A system comprising:
one or more computer processors programmed to perform operations comprising:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based a comparison of a word-based feature of the original text and the translation correction and a comparison of a language-based feature of the original text and the translation correction;
determining an accuracy of the translation correction based on the at least one metric, wherein determining the accuracy of the translation correction comprises:
multiplying each of the first metric and the second metric by a respective coefficient; and
determining the accuracy of the translation based on whether a combination of the multiplied metrics exceeds a first threshold.

52. The system of claim 51 wherein the operations further comprise:
updating a confidence score for the second user based on the accuracy of the translation correction, the confidence score representing a likelihood that the second user will provide an accurate translation of a text message at a later time.

53. The system of claim 52 wherein the operations further comprise:
revoking the second user's translation privileges when the confidence score falls below a threshold value.

54. The system of claim 51 wherein the operations further comprise:
offering an incentive to the second user to provide the translation correction; and
rewarding the second user with the respective incentive when the translation correction is determined to be accurate.

55. A system comprising:
one or more computer processors programmed to perform operations comprising:
obtaining an original text message in a first language authored by a first user:
obtaining an initial translation of the original text message in a second language;
obtaining a translation correction of the initial translation, wherein the translation correction is authored by a second user;
calculating at least one metric associated with the translation correction, the at least one metric being based on one or more of:
(a) a comparison of a word-based feature of the original text and the translation correction;
(b) a comparison of a language-based feature of the original text and the translation correction;
(c) a comparison of a word-alignment feature of the original text and the translation correction; and
(d) a grammar-based feature of the translation correction; and
determining an accuracy of the translation correction based on the at least one metric wherein the at least one metric further comprises a third metric based on the comparison of the word-alignment feature, and wherein determining the accuracy of the translation correction further comprises:
multiplying the third metric by a respective coefficient;
combining the multiplied third metric with the multiplied first metric and the multiplied second metric; and
comparing the combination of multiplied metrics with a second threshold.

56. The system of claim 55 wherein the operations further comprise:
updating a confidence score for the second user based on the accuracy of the translation correction, the confidence score representing a likelihood that the second user will provide an accurate translation of a text message at a later time.

57. The system of claim 56 wherein the operations further comprise:
revoking the second user's translation privileges when the confidence score falls below a threshold value.

58. The system of claim 55 wherein the operations further comprise:
offering an incentive to the second user to provide the translation correction; and
rewarding the second user with the respective incentive when the translation correction is determined to be accurate.

* * * * *